(12) United States Patent
Otani et al.

(10) Patent No.: US 10,367,988 B2
(45) Date of Patent: Jul. 30, 2019

(54) DATA PROCESSING SYSTEM EXECUTING PREDETERMINED DATA PROCESSING BY PLURALITY OF APPARATUSES LINKING

(71) Applicant: CASIO COMPUTER CO., LTD., Shibuya-ku, Tokyo (JP)

(72) Inventors: Daisuke Otani, Tokyo (JP); Jun Hosoda, Saitama (JP); Kazuya Nara, Tokyo (JP); Yuji Kuriyama, Tokyo (JP); Yoshinori Tomidokoro, Tokyo (JP); Toshiya Kiso, Tokyo (JP); Takuya Yamada, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 54 days.

(21) Appl. No.: 15/010,484

(22) Filed: Jan. 29, 2016

(65) Prior Publication Data

US 2016/0227596 A1    Aug. 4, 2016

(30) Foreign Application Priority Data

Feb. 4, 2015   (JP) ................................ 2015-020704
Mar. 19, 2015  (JP) ................................ 2015-056242
(Continued)

(51) Int. Cl.
*H04N 5/232*     (2006.01)
*H04N 1/00*      (2006.01)
(Continued)

(52) U.S. Cl.
CPC ..... *H04N 5/23206* (2013.01); *H04N 1/00103* (2013.01); *H04N 1/00204* (2013.01);
(Continued)

(58) Field of Classification Search
CPC .... H04N 5/23206; H04N 5/44; H04N 1/2112; H04N 1/00103; H04N 1/00244;
(Continued)

(56) References Cited

U.S. PATENT DOCUMENTS 7,380,145 B2    5/2008 Albulet
7,787,821 B2    8/2010 Hamaguchi
(Continued)

FOREIGN PATENT DOCUMENTS

CN          1627231 A       6/2005
CN          102917113 A     2/2013
(Continued)

OTHER PUBLICATIONS

Japanese Office Action (and English translation thereof) dated Jun. 20, 2017 issued in counterpart Japanese Application No. 2015-216558.
(Continued)

*Primary Examiner* — Albert H Cutler
(74) *Attorney, Agent, or Firm* — Holtz, Holtz & Volek PC

(57) ABSTRACT

A data processing system (S) is configured so as mutually register transmission destinations between devices performing communication. In addition, the data processing system (S) performs a predetermined communication procedure for communicating predetermined information to transition to a communication connection state establishing a mutual communication connection, and in the communication connection state, performs intermittent periodic communication every predetermined interval, where the communication connection state is maintained while periodic communication is maintained, and the communication connection state is released in a case of the periodic communication being interrupted, and in the state in which the communication connection state is released, controls the allowance of tran-
(Continued)

sition to the communication connection state again, according to a change state of contents of the predetermined information sent upon transitioning to the communication connection state, and the presence of a transmission destination recorded.

27 Claims, 30 Drawing Sheets

(30) Foreign Application Priority Data

| | | |
|---|---|---|
| Mar. 19, 2015 | (JP) | 2015-056243 |
| Nov. 4, 2015 | (JP) | 2015-216558 |
| Nov. 4, 2015 | (JP) | 2015-216559 |

(51) Int. Cl.

| | |
|---|---|
| *H04W 76/14* | (2018.01) |
| *H04W 76/19* | (2018.01) |
| *H04N 5/44* | (2011.01) |
| *H04W 8/00* | (2009.01) |
| *H04N 1/21* | (2006.01) |

(52) U.S. Cl.
CPC ..... *H04N 1/00244* (2013.01); *H04N 1/00307* (2013.01); *H04N 1/2112* (2013.01); *H04N 5/44* (2013.01); *H04W 8/005* (2013.01); *H04W 76/14* (2018.02); *H04W 76/19* (2018.02); *H04N 2201/0075* (2013.01); *H04N 2201/0084* (2013.01); *H04N 2201/0094* (2013.01)

(58) Field of Classification Search
CPC ....... H04N 1/00307; H04N 2201/0075; H04N 2201/0084; H04N 1/00204; H04N 2201/0094; H04W 76/028; H04W 8/005; H04W 76/023; H04W 76/14; H04W 76/19
USPC .............................. 348/14.02, 211.99–211.3
See application file for complete search history.

(56) References Cited

U.S. PATENT DOCUMENTS

| | | | | |
|---|---|---|---|---|
| 8,085,310 B2* | 12/2011 | Matsumoto | ............ | H04N 5/232 348/207.11 |
| 8,937,667 B2 | 1/2015 | Okazaki | | |
| 9,060,082 B2 | 6/2015 | Watanabe | | |
| 9,548,849 B1 | 1/2017 | Redding | | |
| 9,548,869 B2 | 1/2017 | Redding | | |
| 9,668,297 B2 | 5/2017 | Kamath et al. | | |
| 2007/0265009 A1 | 11/2007 | Hamaguchi | | |
| 2009/0128634 A1* | 5/2009 | Miura | .................... | H04N 5/765 348/207.1 |
| 2012/0257561 A1 | 10/2012 | Redding | | |
| 2012/0322376 A1 | 12/2012 | Couse | | |
| 2014/0098248 A1 | 4/2014 | Okazaki | | |
| 2014/0118778 A1 | 5/2014 | Lee et al. | | |
| 2014/0184830 A1 | 7/2014 | Eom | | |
| 2014/0298054 A1* | 10/2014 | Hasui | .................... | G06F 1/3243 713/320 |
| 2014/0323048 A1* | 10/2014 | Kang | .................... | H04W 4/008 455/41.2 |
| 2014/0347503 A1 | 11/2014 | Endo | | |
| 2014/0355582 A1 | 12/2014 | Kamath et al. | | |
| 2014/0375831 A1 | 12/2014 | Kato | | |
| 2015/0049206 A1 | 2/2015 | Eshita | | |
| 2015/0186082 A1 | 7/2015 | Lee et al. | | |
| 2015/0230285 A1* | 8/2015 | Park | .................... | H04W 76/028 455/41.2 |
| 2015/0365986 A1 | 12/2015 | Lee et al. | | |
| 2016/0066248 A1* | 3/2016 | Sato | ....................... | H04W 76/02 370/315 |
| 2017/0265134 A1 | 9/2017 | Kamath et al. | | |

FOREIGN PATENT DOCUMENTS

| | | |
|---|---|---|
| CN | 102984393 A | 3/2013 |
| CN | 103795882 A | 5/2014 |
| CN | 104219744 A | 12/2014 |
| JP | 2003244516 A | 8/2003 |
| JP | 2007306201 A | 11/2007 |
| JP | 2007531456 A | 11/2007 |
| JP | 2011211391 A | 10/2011 |
| JP | 2011221995 A | 11/2011 |
| JP | 2014514847 A | 6/2014 |
| JP | 2014127911 A | 7/2014 |
| JP | 2014131328 A | 7/2014 |
| JP | 2014230024 A | 12/2014 |
| JP | 2015005889 A | 1/2015 |
| JP | 2015033084 A | 2/2015 |
| WO | 2013118487 A1 | 8/2013 |

OTHER PUBLICATIONS

U.S. Appl. No. 15/010,292, filed Jan. 29, 2016, Title: Data Processing Device That Executes Predetermined Data Processing By Linking With Other Apparatus, First Named Inventor: Hitoshi Tanaka.
USPTO Office Action dated Sep. 8, 2017 issued in related U.S. Appl. No. 15/010,292.
Japanese Office Action dated Sep. 12, 2017 issued in counterpart Japanese Application No. 2015-216559.
Office Action (Final Rejection) dated Apr. 12, 2018 issued in related U.S. Appl. No. 15/010,292.
Chinese Office Action (and English language translation thereof) dated Jun. 4, 2018 issued in Chinese Application No. 20160073581.0.
Chinese Office Action (and English language translation thereof) dated Jun. 4, 2018 issued in Chinese Application No. 201610073581.0.
Office Action (Final Rejection) dated Dec. 20, 2018 issued in related U.S. Appl. No. 15/010,292.
Chinese Office Action (and English language translation thereof) dated Apr. 25, 2019 issued in Chinese Application No. 201610073256.4.
Chinese Office Action (and English language translation thereof) dated Apr. 26, 2019 issued in Chinese Application No. 201610073581.0.

* cited by examiner

FIG. 7
BASE UNIT: COMMUNICATION STATUS DISPLAY OF IMAGING DEVICE SIDE
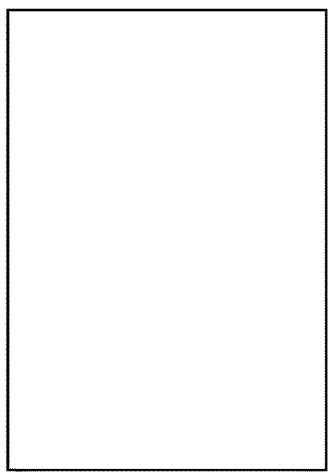 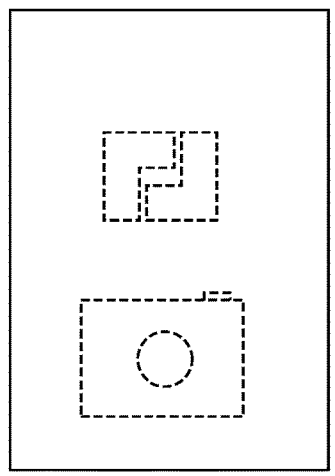 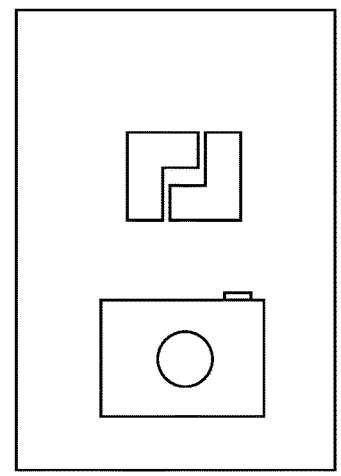
<PAIRING: NONE>　　<PAIRING: DONE>　　<PAIRING: DONE>
<CONNECTION: NO>　<CONNECTION: NO>　<CONNECTION: YES>
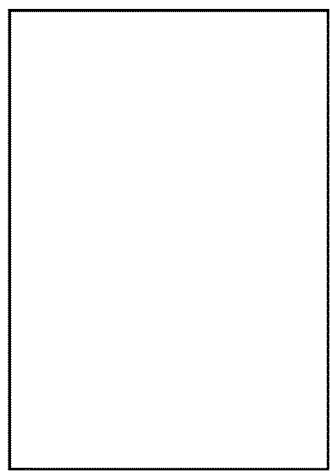 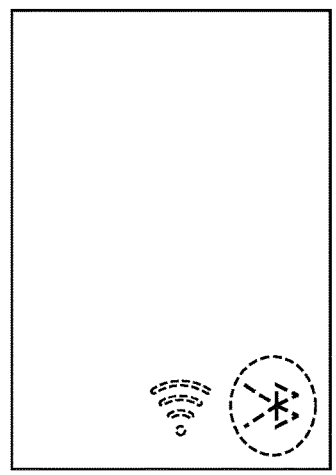 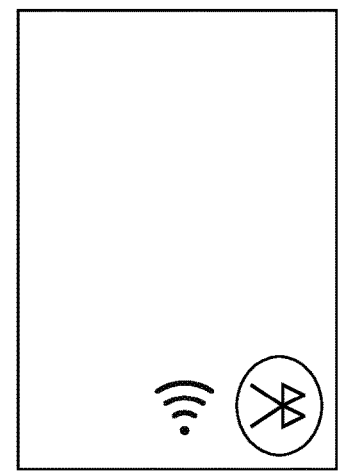
[EXTENSION UNIT: COMMUNICATION STATUS DISPLAY OF PORTABLE TERMINAL SIDE]

FIG. 11
[BASE UNIT: COMMUNICATION STATUS DISPLAY OF IMAGING DEVICE SIDE]
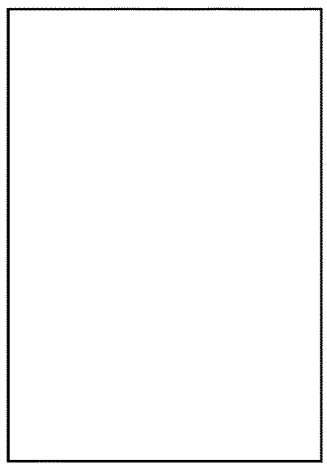 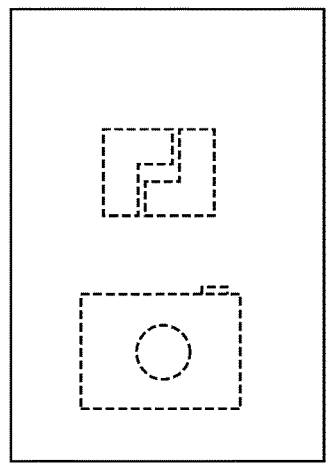 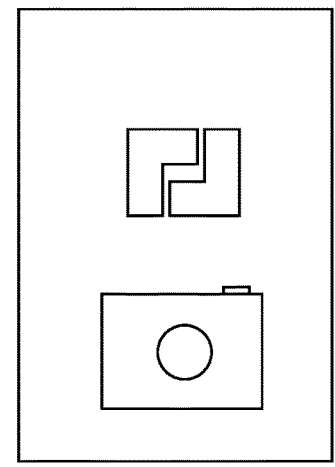
<PAIRING: NONE>  <PAIRING: DONE>  <PAIRING: DONE>
<CONNECTION: NO>  <CONNECTION: NO>  <CONNECTION: YES>
 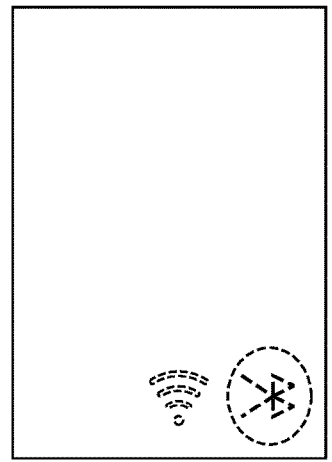 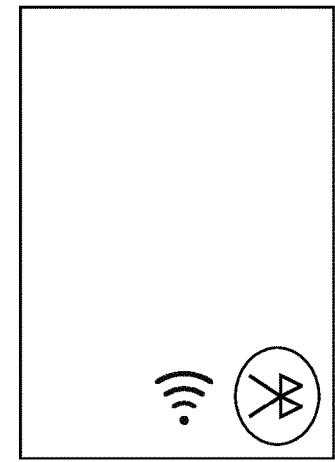
[EXTENSION UNIT: COMMUNICATION STATUS DISPLAY OF PORTABLE TERMINAL SIDE]

FIG. 21
IMAGING DEVICE: ALBUM SETTING SCREEN
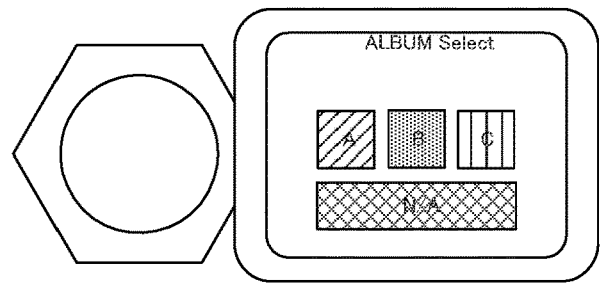
REC SCREEN: SELECTED ALBUM BEING DISPLAYED
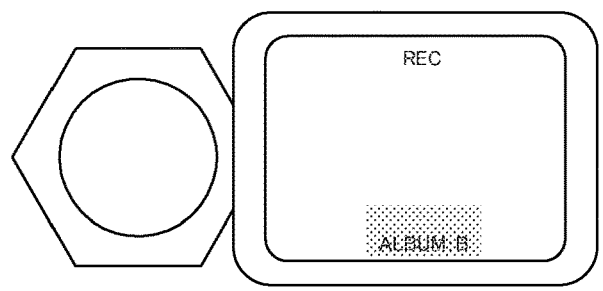
FIG. 22
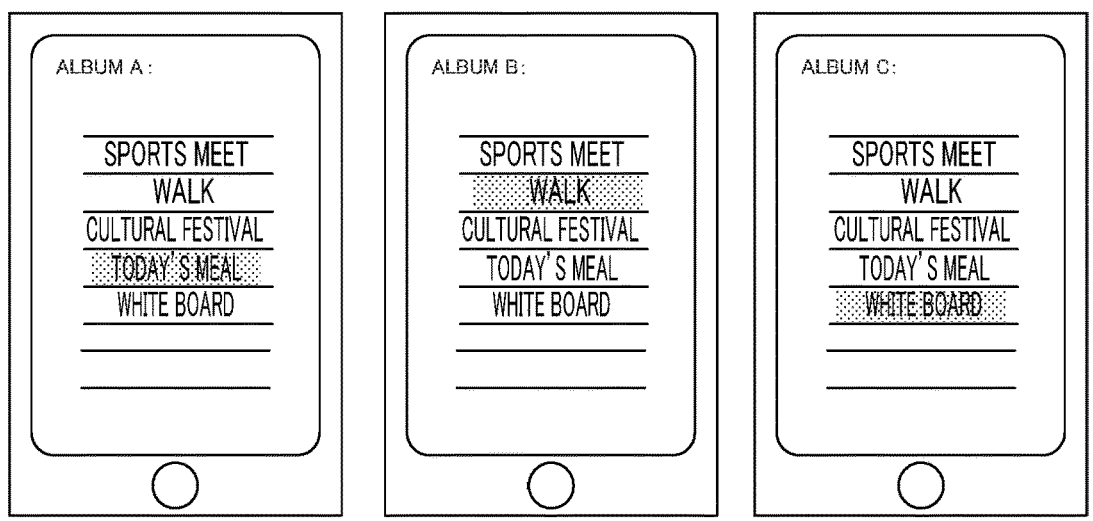

DATA PROCESSING SYSTEM EXECUTING PREDETERMINED DATA PROCESSING BY PLURALITY OF APPARATUSES LINKING

This application is based on and claims the benefit of priority from Japanese Patent Application Nos. 2015-020704, 2015-056243, 2015-056242, 2015-216558 and 2015-216559, respectively filed on 4 Feb. 2015, 19 Mar. 2015, 19 Mar. 2015, 4 Nov. 2015 and 4 Nov. 2015, the contents of which are incorporated herein by reference.

BACKGROUND OF THE INVENTION

Field of the Invention

The present invention relates to a data processing system that executes a predetermined data processing by a plurality of devices linking, and a data processing device.

Related Art

Conventionally, technology has been known that uses Wi-Fi communication or Bluetooth (registered trademark) communication in the case of sending image data formed by photographing with an imaging device such as a digital camera to a portable terminal such as a smartphone, and sending instruction information related to photography from the portable terminal to the imaging device (refer to Patent Document 1).

In addition, in recent years, it has become possible to also use the technology of BLE (Bluetooth Low Energy) (trademark) enabling to perform communication with lower electric power consumption.

In various communication technologies, characteristics such as communication speed, electric power consumption, and convenience when using differ, and it has been necessary to perform communication following protocols (restrictions) according to each characteristic.

Patent Document 1: Japanese Unexamined Patent Application, Publication No. 2014-230024

SUMMARY OF THE INVENTION

One aspect of the present invention provides a data processing system which executes predetermined data processing by a peripheral apparatus that is an apparatus providing a predetermined function and a central apparatus that is an apparatus utilizing the function provided by the peripheral apparatus linking, wherein the peripheral apparatus including:

a first communication unit which, in a case of not establishing a communication connection with any central apparatus, sends an advertising signal that is a signal notifying other apparatuses of its own existence and its own function provided by way of broadcast communication, establishes a communication connection with a central apparatus having responded the advertising signal, and performs communication control by way of a first communication method that maintains a communication connection by performing communication periodically with the central apparatus having established the communication connection; and a control unit that executes the predetermined data processing by linking with the central apparatus, wherein the central apparatus comprises:

a first communication unit which detects an advertising signal sent by the peripheral apparatus, establishes a communication connection by way of the first communication method with the peripheral apparatus in a case of the function indicated by the advertising signal being its own desired function, and performs communication control by way of the first communication method to maintain a communication connection by performing communication periodically with the peripheral apparatus having established the communication connection; and a control unit which executes the predetermined data processing by linking with the peripheral apparatus, wherein the first communication unit of the peripheral apparatus and the first communication unit of the central apparatus maintain a communication connection by performing communication periodically, even in a case of the peripheral apparatus and the central apparatus not being in a predetermined operation state capable of executing the predetermined data processing, wherein the control unit of the peripheral apparatus and the control unit of the central apparatus, in a case of not being in the predetermined operation state, cause the peripheral apparatus and the central apparatus to link and cause execution of the predetermined data processing to start, after causing to transition to the predetermined operation state, by transmitting predetermined signals via the first communication units between the peripheral apparatus and the central apparatus.

In addition, another aspect of the present invention provides a data processing method executed by a data processing system which exchanges data between a plurality of devices, wherein the data processing system is configured so as to mutually register transmission destinations between devices performing communication, the method including:

transitioning to a communication connection state establishing a communication connection with each other by performing a predetermined communication procedure to communicate predetermined information;

performing intermittent periodic communication every predetermined interval in the communication connection state; and controlling allowance of transitioning to the communication connection state again according to a change state of contents of the predetermined information that is sent upon transitioning to the communication connect state, and presence of the transmission destination registered, in a state in which the communication connection state is maintained while the periodic communication is being maintained, and the communication connection state is released in a case of the periodic communication being interrupted.

Furthermore, yet another aspect of the present invention provides non-transitory recording medium encoded with a program for enabling a computer, which controls a data processing device functioning as a central apparatus that executes predetermined data processing by linking with a peripheral apparatus providing a predetermined function, to execute:

a first communication function of detecting an advertising signal sent by the peripheral apparatus, establishing a communication connection by way of a first communication method with the peripheral device in a case of the function indicated by the advertising signal being a desired function thereof, and performing communication control by way of the first communication method to maintain the communication connection by performing periodic communication with the peripheral apparatus having established the communication connection; and a control function of executing the predetermined data processing by linking with the peripheral apparatus, wherein the first communication function maintains a communication connection by performing periodic communication, even in a case of the peripheral apparatus and the central apparatus not being in a predetermined operation state capable of executing the predetermined data processing, and wherein the control function, in a case of not being in the predetermined operation state, causes to transition to the predetermined operation state, by sending a predetermined signal via the first communication unit between the peripheral apparatus and the central apparatus, and then causes to start execution of the predetermined data processing by linking with the peripheral apparatus.

BRIEF DESCRIPTION OF THE DRAWINGS

FIG. 7 is a schematic view showing a display of the communication status of the imaging device and portable terminal;

FIG. 11 is a schematic view showing a display of the communication status of the imaging device and portable terminal;

FIG. 21 is a schematic view showing a screen display example of the imaging device;

FIG. 22 is a schematic view showing a screen display example of the imaging device;

DETAILED DESCRIPTION OF THE INVENTION

Hereinafter, embodiments of the present invention will be explained using the drawings.

First Embodiment

Figure 1:
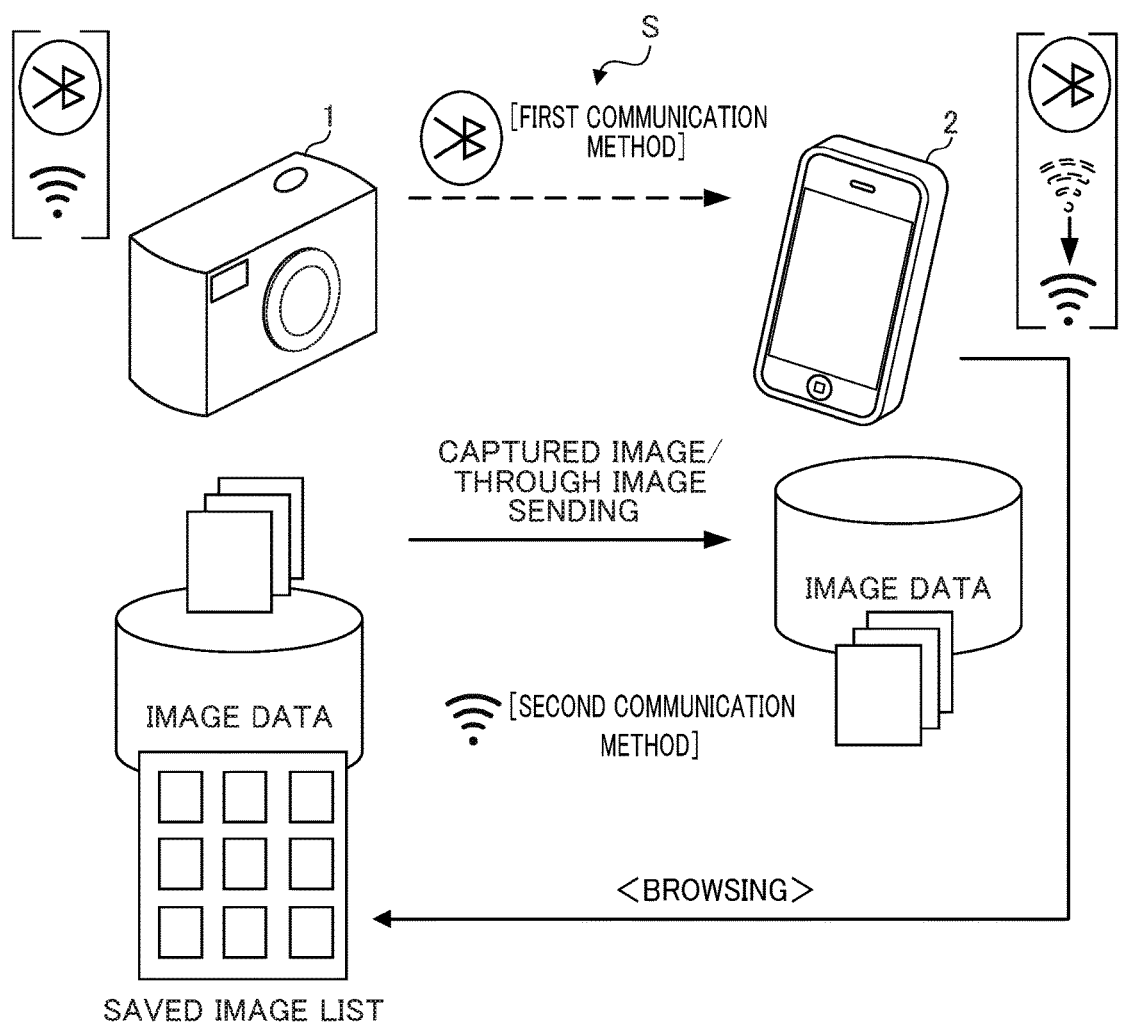
FIG. 1 is a system configuration diagram showing the system configuration of a communication system according to an embodiment of the present invention.

FIG. 1 is a system configuration diagram showing the system configuration of a communication system according to an embodiment of the present invention.

A communication system S includes an imaging device 1 having at least an image capture/communication function; and a portable terminal 2 that is an information terminal having at least an image display/communication function, as shown in FIG. 1.

The communication system S, by a user operating either apparatus among the imaging device 1 and portable terminal 2, performs a request for a communication connection by a communication method by which data communication of image file level is possible to the other apparatus from the one operated apparatus that is being operated by the user, and in a state establishing a communication connection between the imaging device 1 and portable terminal 2, has a function of performing transmission of image files with the other apparatus and monitoring of image data retained by the other apparatus, according to operations on the operation apparatus. It should be noted that, in the present embodiment, "establishing" a communication connection is the matter of recognizing a mutual communicating partner by designating a mutual communicating partner and performing a predetermined procedure (negotiation), and thereafter, entering a state in which communication is always possible, without performing the predetermined procedure every time performing communication. This state is maintained until performing a procedure to release the communication connection. In addition, a state in which communication connection is "established" is maintained even in a case of the radio wave status worsening and becoming a state in which communication is temporarily impossible, and the electric power source of the apparatus being turned OFF.

In the communication system S of the present embodiment, a communication connection between the imaging device 1 and portable terminal 1 is established in a state in which data communication is possible, using two communication methods. The communication system S configures so as to perform communication by the communication methods of a wireless communication method that is low speed but is power saving and suited to a constant connection (hereinafter referred to as "first communication method"); and a wireless communication method that is high speed and suited to file transmission (hereinafter referred to as "second communication method").

It should be noted that, in the present embodiment, the first communication method employs a communication method based on a communication standard of Bluetooth low energy/Bluetooth LE (tradename) (hereinafter referred to as "BLE"). In addition, the second communication method employs a communication method based on the communication standard of Wi-Fi (Wireless Fidelity) of wireless LAN (Local Area Network). It should be noted that, in the present embodiment, Wi-Fi that is the second communication method has large electrical power consumption in a state establishing a communication connection; therefore, in the case of being able to estimate that the waiting time until performing subsequent data transfer will be long, the electrical power consumption is reduced by releasing the communication connection each time. In addition, in a state in which a communication connection is not established, it is not possible to turn ON the electric power supply of the apparatus on the partner side automatically by way of communication by Wi-Fi, which is the second communication method, or launch an application. For this reason, the communication system S of the present embodiment makes a constant connection of BLE, which is the first communication method with low electric power consumption, and establishes a communication connection of Wi-Fi, which is the second communication method, according to the situation.

This constant connection by BLE that is the first communication method arbitrarily selects a combination of the imaging device 1 and portable terminal 2 actually using an external link function from among a plurality of apparatuses, in the case of a plurality of each of the imaging devices and portable terminals using external link function being present within a distance range in which a communication connection is possible, and enables this combination of the selected imaging device 1 and portable terminal 2 to be maintained until the external link function is released.

The method of initiating a constant connection by BLE, which is the first communication method, by selecting a combination of the imaging device 1 and portable terminal 2 from among a plurality of devices (pairing processing) will be described later.

Herein, an example of sending an image file to the portable terminal 2 from the image device 1, which are in a state constantly connected by BLE, which is the first communication method, will be explained.

Figure 2:
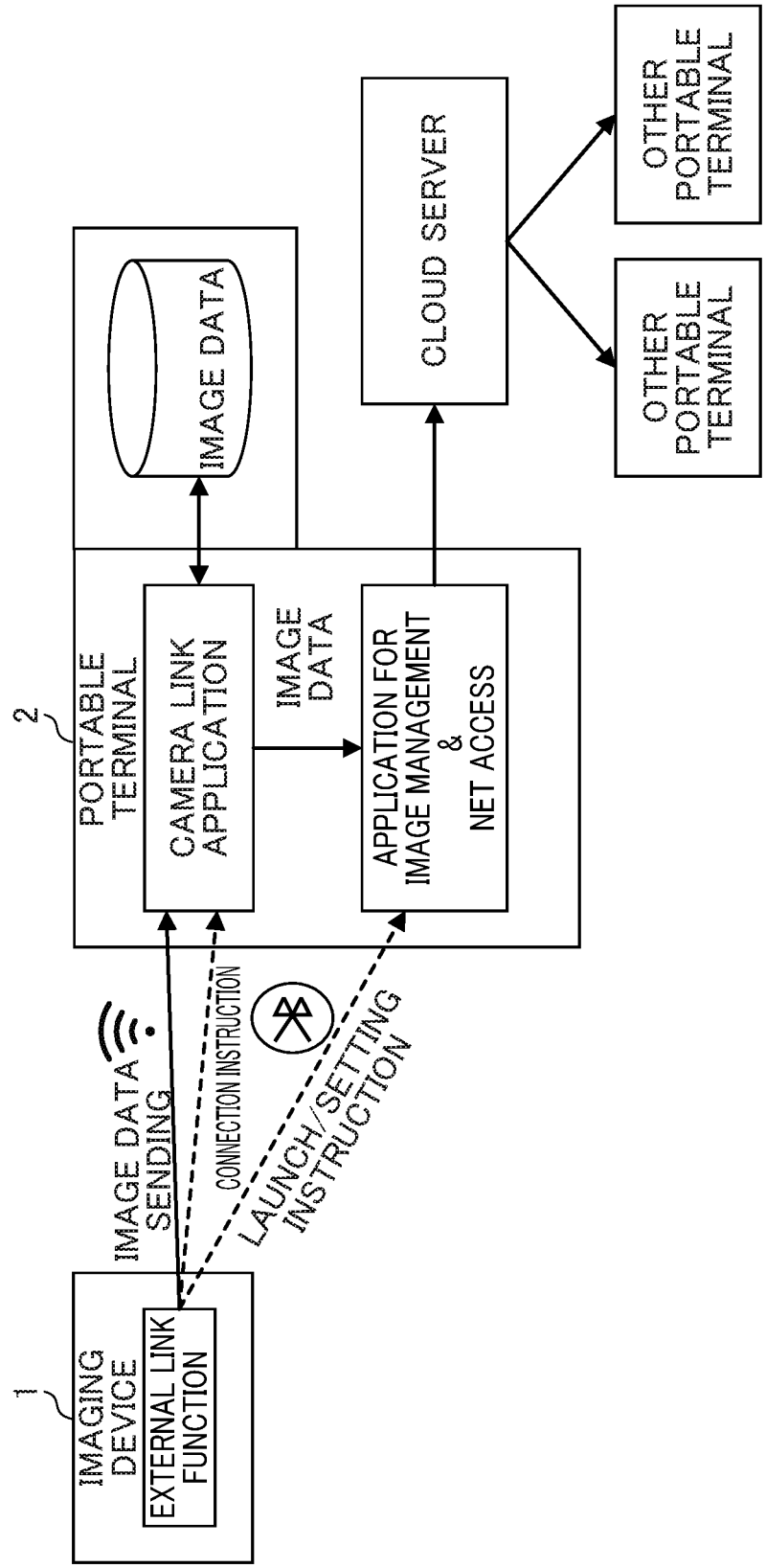
FIG. 2 is a schematic view showing an example of data communication performed by the communication system.

FIG. 2 is a schematic view showing an example of data communication performed by the communication system S.

More specifically, in the example of FIG. 2, by the user operating the imaging device 1 serving as one apparatus, the external link function on the imaging device 1 side is exhibited, and an instruction to establish a communication connection by the second communication method suited to the transmission of image files (connect instruction) is sent to the portable terminal 2 via communication of the first communication method.

Via the communication of the first communication method, the function of a camera link application is exhibited in the portable terminal 2 having received the connection instruction, the processing for establishing communication by the second communication method is performed, and a communication connection by the second communication method is established between the imaging device 1 and portable terminal 2.

In detail, according to the connection instruction via communication of the first communication method from the imaging device 1, a program for exhibiting the function of the camera-link application on the portable terminal 2 side is activated, and establishment of communication by the second communication method between the imaging device 1 and portable terminal 2 is performed according to the external link function on the imaging device 1 side and the function of the camera-link application on the portable terminal 2 side.

The first communication method is power saving, and even in the case of the main electric power source of either one or both of the imaging device 1 and portable terminal 2 being turned off (or being in a low electric power consumption state), is constantly connected, and the apparatus for which the main electric power source is turned off (or in a low electric power consumption state) has a function of turning on the main electric power source (or releasing the low electric power consumption state) so as to enter a state in which communication by way of at least the second communication method and execution of an application program is possible according to communication via the first communication method from the other one, and a function of causing the application program designated via the first communication method to launch (execute).

For this reason, for example, it is possible to perform the establishment of communication by the second communication method used in data communication in the case of an event such as sending images photographed by the imaging device 1 occurring, without the portable device 2 being operated.

It thereby becomes possible to perform data communication between the imaging device 1 and portable terminal 2, whereby image data can be automatically sent from the imaging device 1 to the portable terminal 2.

It should be noted that the received image data is temporarily stored in the storage of the portable terminal 2 by the exhibiting of the function of the camera-link application.

In addition, in the present embodiment, as an application of the image data automatically transmitted by the external link function on the imaging device 1 side and the function of the camera link application on the portable terminal 2 side, the image data captured by the imaging device 1 is made into a browsable state from a portable terminal, etc. possessed by another used automatically by using an image sharing server on the internet. More specifically, the imaging device 1 instructs to the portable terminal 2 so as to make sharing of images from the imaging device 1 to another portable terminal possible via communication by the first communication method, when photography is performed in a state in which link operating mode to perform image sharing automatically is set. With the portable terminal 2 having received the sharing instruction, after the function of camera link application is exhibited, receiving image data captured by the imaging device 1 and temporarily saving in the storage of the portable terminal 2, the function of an application for the image management & net-access is exhibited according to an instruction by the camera link application function (program for this function is activated), manages the image data temporarily saved in the storage of the portable terminal 2 with its own function application for image management & net access), as well as sending the image data to a cloud server linked in advance with the object of image sharing. The cloud server performs sharing of images captured by the imaging device 1 and received by the portable terminal 2, by establishing the image data in a state available to other portable terminals linked in advance.

It should be noted that, in the present embodiment, the imaging device 1 and portable terminal 2 are configured as devices realizing predetermined functions by linking with other apparatuses. The imaging device 1 and portable terminal 2 execute linked processing such as processing to transfer an image to the portable terminal 2 and acquire the image in the portable terminal 2 according to an operation on the imaging device 1, or processing to transfer an image from the imaging device 1 to the portable terminal 2 according to an operation on the portable terminal 2 (hereinafter referred to as "linked processing"), for example, by performing data exchange (data transfer) by Wi-Fi, which is the second communication method, between devices.

In addition, the imaging device 1 and portable terminal 2 are configured so as to turn ON Wi-Fi, which is the second communication method, of another device from a device at which an operation is performed, to establish a communication connection, via BLE, which is the first communication method whereby a connection is maintained (constant connection), in order to transition to a state in which linked processing can be executed, from a state without the communication connection by Wi-Fi, which is the second communication method, and linked processing is cannot be executed. In other words, with BLE that is the first communication method, even if a state in which predetermined linked processing cannot be executed due to a communication connection with another device not being established/a state in which preparation to execute predetermined linked processing is not possible, the communication connection with the other device is maintained (constant connection). Herein, "state in which preparation to execute predetermined linked processing is not possible" refers to a state in which the electric power source of the other device is OFF, a state in which the program for executing predetermined linked processing is not activated, or a state in which the communication connection by Wi-Fi that is the second communication method has not been established (state in which the electric power source is OFF referred to herein includes a low electric power consumption state in which communication is possible by the first communication method, but it is not possible to execute communication by the second communication method or predetermined linked processing). Therefore, the imaging device 1 and portable terminal 2 transition to a state in which preparation to execute predetermined linked processing is possible via BLE, which is the first communication method, even in the state in which the electric power source of the other device is OFF, a state in which the program for executing predetermined linked processing is not activated, or a state in which preparation for executing the predetermined linked processing is not possible that is a state in which a communication connection by Wi-Fi, which is the second communication method, is not established (non-functional state).

Herein, pairing processing will be explained.

Pairing processing is processing to perform a connection setting of two BLE devices (the imaging device 1 and portable terminal 2 in the present embodiment). After connection setting, the imaging device 1 and portable terminal 2 are connected in a communicable state based on this setting. In addition, according to pairing processing, partner-side pairing information required in connection is stored in each apparatus (imaging device 1 and portable terminal 2).

In BLE communication of the present embodiment, communication is performed between a peripheral and central having different roles. In the present embodiment, the peripheral is the imaging device 1, and the central is the portable terminal 2.

In contrast, in order to notify of its own existence, the peripheral outputs an advertising signal (BLE's advertising packet) to the surroundings using radio waves (broadcast transmitting advertising signal), and responds to a connection request from the central.

The central scans if there is a peripheral sharing necessary data, and if detecting a corresponding peripheral, requests a connection, and starts the exchange of data. Then, the central executes any task using the information (service) provided from the peripheral.

In the advertising signal, it is possible to include information (UUID: Universally Unique Identifier) indicating the name of the peripheral (device name: in the present embodiment, SSID is the identifier of access point in wireless LAN (Wi-Fi)) or providable information (service).

During BLE connection (during communication) after connection setting by pairing processing completes, communication packets including a universally unique (individual) BD address (Bluetooth (registered trademark) Device Address) is sent. Connection with an unintended apparatus thereby will not occur.

Figure 3:
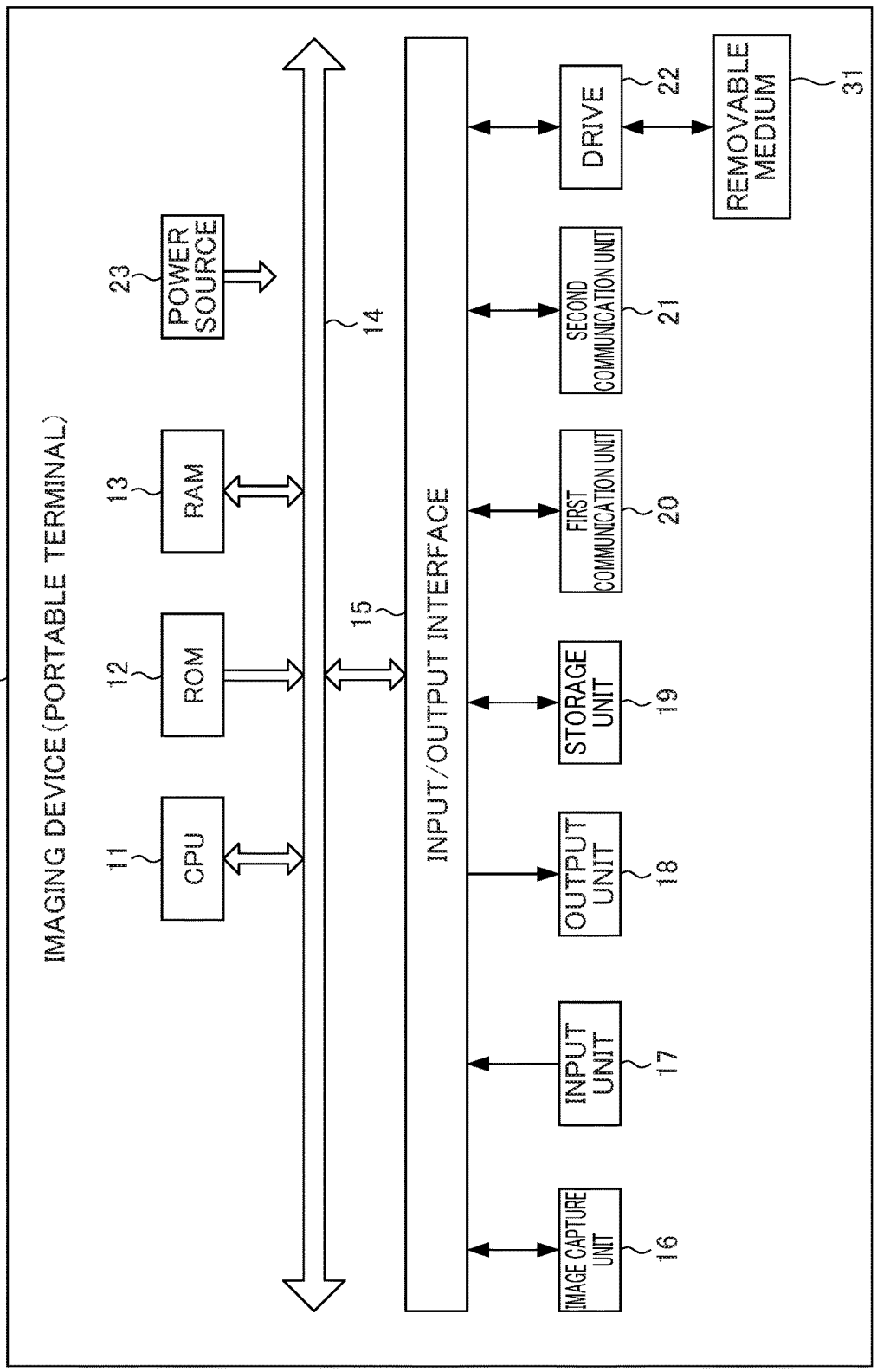
FIG. 3 is a block diagram showing the configuration of hardware of an imaging device and portable terminal according to an embodiment of the present invention.

FIG. 3 is a block diagram showing the hardware configurations of the imaging device 1 and portable terminal 2 according to an embodiment of the present invention.

The imaging device 1 is configured as a digital camera, for example.

The imaging device 1 includes: a CPU (Central Processing Unit) 11, ROM (Read Only Memory) 12, RAM (Random Access Memory) 13, a bus 14, an input/output interface 15, an image capture unit 16, an input unit 17, an output unit 18, a storage unit 19, a first communication unit 20, a second communication unit 21, a driver 22, and an electric power unit 23.

The CPU 11 executes various processing according to programs recorded in the ROM 12, or programs loaded from the storage unit 19 into the RAM 13.

This CPU 11, RAM 13 and ROM 12 (or storage unit 19) constitute a control unit.

The required data, etc. upon the CPU 11 executing various processing is also stored as appropriate in the RAM 13.

The CPU 11, ROM 12 and RAM 13 are connected to each other via the bus 14. This bus 14 is also connected to the input/output interface 15. The imaging unit 16, input unit 17, output unit 18, storage unit 19, first communication unit 20, second communication unit 21, drive 22 and electric power unit 23 are connected to the input/output interface 15.

Although not illustrated, the image capture unit 16 includes an optical lens unit and image sensor.

In order to photograph an object, the optical lens unit is configured by a lens such as a focus lens and a zoom lens for condensing light.

The focus lens is a lens for forming an image of an object on the light receiving surface of the image sensor. The zoom lens is a lens that causes the focal length to freely change in a certain range.

The optical lens unit also includes peripheral circuits to adjust setting parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of an object in the optoelectronic conversion device. The optoelectronic conversion device optoelectronically converts (i.e. captures) the image of the object, accumulates the resultant image signal for a predetermined time interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 16.

Such an output signal of the image capture unit 16 is hereinafter referred to as "data of a captured image". Data of a captured image is supplied to the CPU 11, an image processing unit (not illustrated), and the like as appropriate.

The input unit 17 is configured by various buttons and the like, and inputs a variety of information in accordance with instruction operations by the user.

The output unit 18 is configured by the display unit, a speaker, and the like, and outputs images and sound.

The storage unit 19 is configured by a hard disk, flash memory or the like, and stores the data of various images.

The communication unit 20 controls communication performed with an external device (in the present embodiment, the portable terminal 2) by the first communication method, which is low speed, but power saving and thus suited to constant connection. In the present embodiment, the first communication method employs a communication method based on the BLE communication standard.

The second communication unit 21 controls communication with an external device (in the present embodiment, the portable terminal 2) by the second communication method, which is high speed and thus suited to the transmission of files. In the present embodiment, the second communication method employs a communication method based on the Wi-Fi communication standard of wireless LAN.

A removable medium 31 composed of a magnetic disk, an optical disk, a magneto-optical disk, semiconductor memory or the like is installed in the drive 22, as appropriate. Programs that are read via the drive 22 from the removable medium 31 are installed in the storage unit 19, as necessary. Similarly to the storage unit 19, the removable medium 31 can also store a variety of data such as the image data stored in the storage unit 19.

The power unit 23 is configured by a lithium-ion battery, for example, and is an electric power supply source that supplies electric power for driving to the imaging device 1, and supplies electric current as the driving source of the imaging device 1 to each configuration in the imaging device 1. The power unit 23 is controlled by the CPU 11 and, for example, is controlled to stop the supply of electric power to the output unit 18, etc. and turn OFF the display output in a power off state, maintain the supply of electrical power in communication such as the first communication unit 20 and second communication unit 21, and enable image sending even in a power off state.

In addition, the portable terminal 2 is configured as a smartphone, for example.

It should be noted that the configuration of hardware is abbreviated due to being similar to the imaging device 1, for example. Hereinafter, in the case of using the hardware of the imaging device 1 and portable terminal 2 as explanations, items appending "-1" to the end of the reference symbol are defined for the imaging device 1, and items appending "-2" to the end of the reference symbol are defined for the portable terminal 2. In other words, the imaging device 1 defines the elements noted as CPU 11-1 to removable media 31-1, and the portable terminal 2 defines the elements noted as CPU 11-2 to removable media 31-2.

In the case of exhibiting the function of data communication in the imaging device 1 and portable terminal 2 configured in this way, it is performed in a state in which a communication connection is established by BLE, which is the first communication method, between the imaging device 1 and the portable terminal 2 (constant connection state). In other words, the automatic sending function of captured images is exhibited by assuming that a connection is made by BLE, which is the first communication method, between the imaging device 1 and portable terminal 2.

More specifically, an instruction (connection instruction) is outputted from the imaging device 1 to the portable terminal 2 via communication by the first communication method so as to establish a communication connection by Wi-Fi, which is the second communication method, and then a communication connection by Wi-Fi, which is the first communication method, is established between the imaging device 1 and portable terminal 2. It should be noted that, in the present embodiment, the communication connection is established by 1-to-1 direct communication between the imaging device 1 and the portable terminal 2, with the imaging device 1 set to an access-point (AP) mode so as to serve as the base unit in Wi-Fi, and the portable terminal 2 set to a station (ST) mode so as to serve as an extension device in Wi-Fi, which is the first communication method.

It should be noted that in the case of pairing by a one-time communication connection, the information related to this pairing is stored in each apparatus. In the present embodiment performing short-distance communication, apparatuses that are in a receiving range of radio waves are searched, and based on the pairing information stored from among these, it is configured to perform processing to establish a communication connection automatically, without inputs such as a password being performed. In addition, a pairing operation is performed by, first, all connectable devices that are in the surrounding (devices in a BLE/Wi-Fi active state) being displayed by apparatus name, etc., and the user designating a device to execute linked processing from among these.

Figure 4:
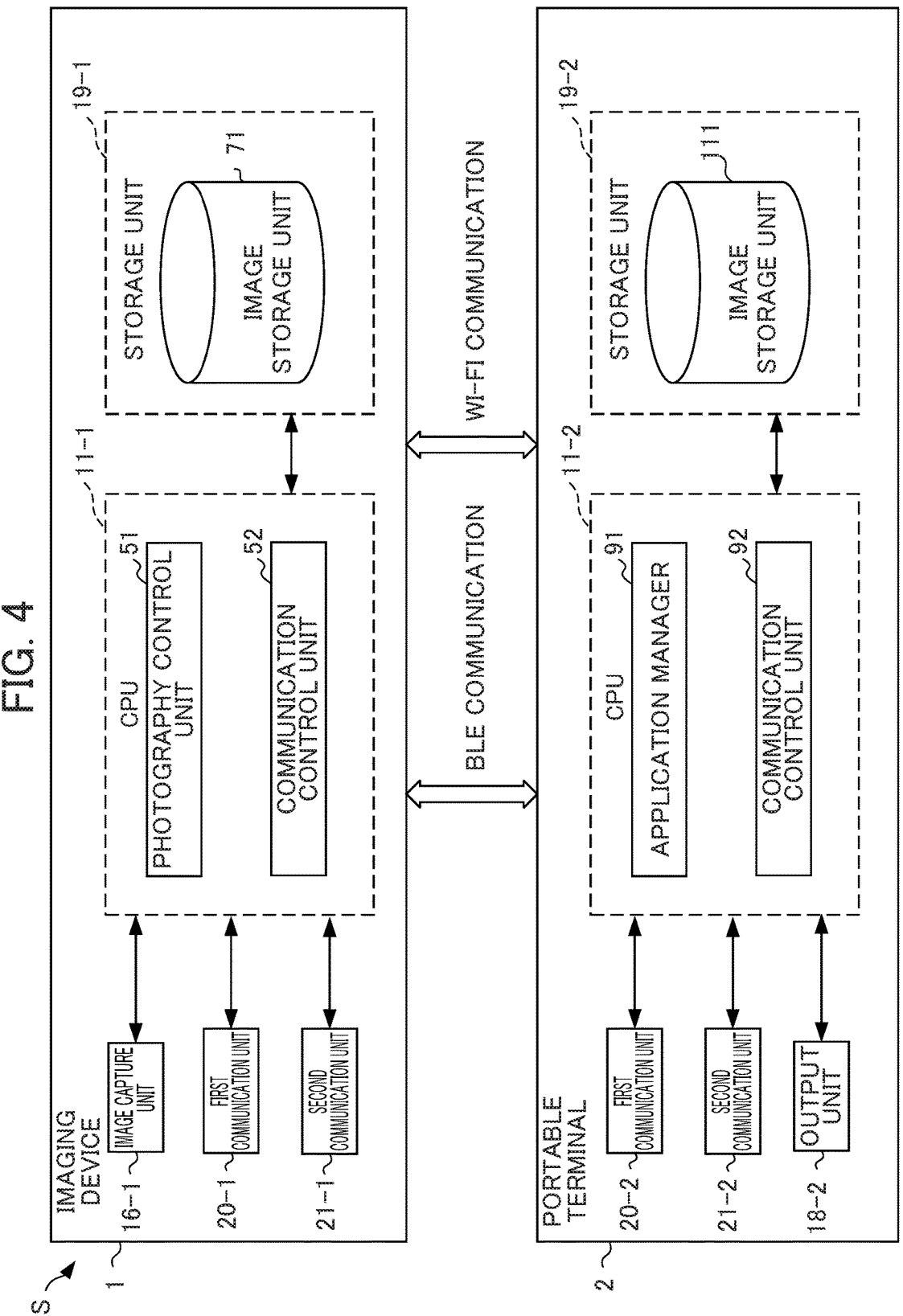
FIG. 4 is a functional block diagram showing a functional configuration for executing automatic image reception processing and mode operation processing, among the functional configurations of the imaging device and portable terminal in FIG. 3.

FIG. 4 is a functional block diagram showing the functional configuration for executing automatic image reception processing and mode operation processing, among the functional configurations of such an imaging device 1 and portable terminal 2.

First, automatic image reception processing will be explained.

"Automatic image reception processing" refers to a series of processing of establishing a communication connection by the second communication method in the portable terminal 2 in the case of acquiring a captured image from the image capture unit 16 of the imaging device 1, sending the captured image to the portable terminal 2, and then receiving the image automatically at the portable terminal 2.

In the case of performing automatic image reception processing on the imaging device 1 side, as shown in FIG. 4, a photography control unit 51 and communication control unit 52 function in the CPU 11-1.

In addition, an image storage section 71 is established in an area of the storage unit 19-1.

Data of captured images acquired from the image capture unit 16 is stored in the image storage section 71.

The photography control unit 51 controls the image capture unit 16 so as to execute photography processing. As a result thereof, a captured image is outputted from the image capture unit 16. The captured image thus outputted is stored in the image storage section 71.

The communication control unit 52 controls the first communication unit 20-1 (second communication unit 21-1) so as to perform communication by BLE (Wi-Fi), which is the first communication method (second communication method), and perform instructions and data communication to the portable terminal 2.

More specifically, the communication control unit 52 controls the second communication unit 21-1 so as to perform communication by Wi-Fi, which is the second communication method, and send images photographed by the imaging device 1 to the portable terminal 2.

In addition, in the case of executing automatic image reception processing on the portable terminal 2 side, as shown in FIG. 4, an application manager 91 and communication control unit 92 function in the CPU 11-2.

Furthermore, an image storage section is established in an area of the storage unit 19-2.

Data of captured images acquired from the imaging device 1 is stored in the image storage section 111.

The application manager 91 manages the launch, end, etc. of applications.

More specifically, the application manager 91 performs communication by BLE, which is the first communication method, and if receiving an instruction to launch an application (hereinafter referred to simply as "app") in the first communication unit 20-2, launches the designated app. In the present embodiment, the application manager 91 launches an app performing communication control of Wi-Fi so as to exhibit the communication control function. It should be noted that "launch" for app or device, in addition to the case of newly executing an app, includes a case of restarting execution of an app in sleep (during execution in background), and includes a case accompanying transition of the electric power source from the off state to on state.

The communication control unit 92 controls the first communication unit 20-2 (second communication unit 21-2) so as to perform communication by BLE (Wi-Fi), which is the first communication method (second communication method), and perform reception of instructions and data communication to the portable terminal 2.

More specifically, the communication control unit 92 controls the second communication unit 21-2 so as to perform communication by Wi-Fi, which is the second communication method, and receive images from the imaging device 1, for example.

Figure 5:
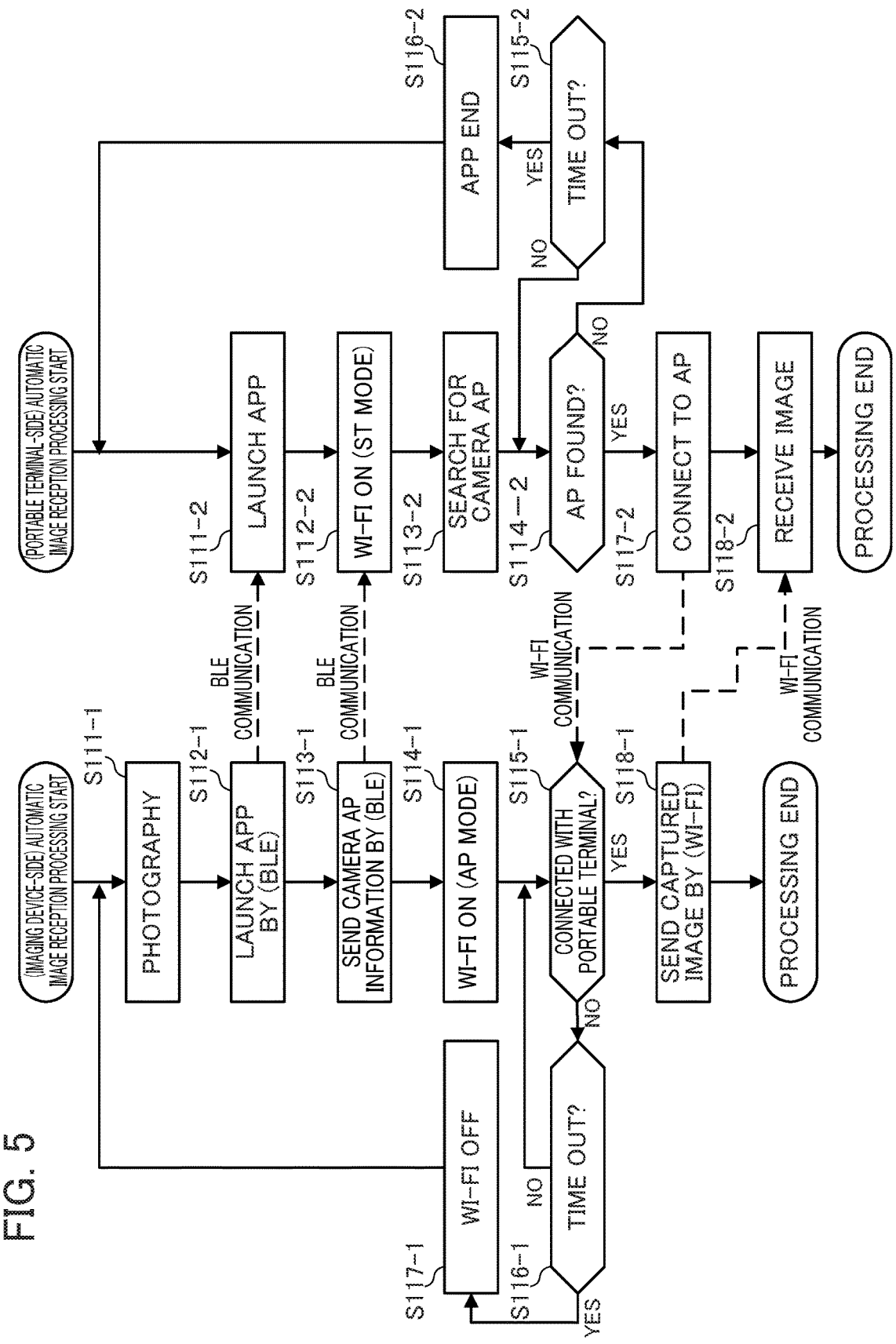
FIG. 5 is a flowchart illustrating the flow of automatic image reception processing executed by the imaging device and portable terminal of FIG. 3 having the functional configuration of FIG. 4.

FIG. 5 is a flowchart illustrating the flow of automatic image reception processing executed by the imaging device 1 and portable terminal 2 of FIG. 3 having the functional configuration of FIG. 4.

It should be noted that, in the initial state of automatic image reception processing, pairing of BLE, which is the first communication method, has completed between the imaging device 1 and portable terminal 2, thereby enter a state of constant connection. In addition, although being an OFF state for Wi-Fi, which is the first communication method, the Wi-Fi settings (profiles) for each other are acquired between the imaging device 1 and portable terminal 2, and a state is entered in which 1-to-1 communication connection between the imaging device 1 and portable terminal 2 can be established during activation of Wi-Fi.

<Automatic Image Reception Processing on Imaging Device 1 Side>

In Step S111-1, the photography control unit 51 controls the image capture unit 16 so as to execute photography processing. As a result thereof, a captured image is outputted from the image capture unit 16. The outputted captured image is stored in the image storage section 71.

Upon photography processing being executed, in the case of the automatic image transfer mode being set, the communication control unit 52 controls the first communication unit 20-1 so as to perform communication by BLE, which is the first communication mode, and send an instruction to launch an app to the portable terminal 2 in Step S112-1. As a result, the app is launched in the portable terminal 2 having received the instruction to launch the app. In the present embodiment, the app performing communication control for Wi-Fi is launched, whereby the communication control function is exhibited.

In Step S113-1, the communication control unit 52 controls the first communication unit 20-1 so as to perform communication by BLE, which is the first communication method, and send access-point information of the imaging device 1 (hereinafter referred to as "camera AP information") to the portable terminal 2. As a result thereof, in the portable terminal 2 having received the camera AP information, Wi-Fi is turned ON in the ST (station) mode in which the portable terminal 2 serves as an extension device.

In Step S114-1, the communication control unit 52 controls the second communication unit 21-1 so as to turn ON Wi-Fi in the AP (access point) mode serving as a base unit.

In Step S115-1, the communication control unit 52 performs communication by Wi-Fi, which is the second communication method, and determines whether or not to establish a connection with the portable terminal 2 according to the connection request from the portable terminal 2 in the second communication unit 21-1.

In the case of establishing a connection with the portable terminal 2, it is determined as YES in Step S115-1, and the processing advances to Step S118-1. The processing of Step S118-1 will be described later.

In contrast, in the case of not establishing a connection with the portable terminal 2, it is determined as NO in Step S115-1, and the processing advances to Step S116-1.

In Step S116-1, the communication control unit 52 determines whether or not a time set in advance has elapsed and timed out.

In the case of not having timed out, it is determined as NO in Step S116-1, and the processing returns to Step S115-1.

In the case of having timed out, it is determined as YES in Step S116-1, and the processing advances to Step S117-1.

In Step S117-1, the communication control unit 52 controls the second communication unit 21-1 so as to turn OFF Wi-Fi. Subsequently, the processing returns to Step S111-1.

In Step S118-1, the communication control unit 52 controls the second communication unit 21-1 so as to perform communication by Wi-Fi, which is the second communication method, and send a captured image photographed to the connected portable terminal 2. As a result thereof, the captured image photographed is sent by Wi-Fi. Subsequently, automatic image reception processing on the imaging device 1 side ends.

<Automatic Image Reception Processing on Portable Terminal 2 Side>

In Step S111-2, the application manager 91 performs communication by BLE, which is the first communication method, and if receiving an instruction to launch an app in the first communication unit 20-2, launches the designated app. In the present embodiment, the app performing communication control in Wi-Fi is launched, whereby the communication control function is exhibited.

In Step S112-2, the communication control unit 92 controls the second communication unit 21-2 so as to perform communication by BLE, which is the first communication method, and in the case of having receiving camera AP information from the imaging device 1, turn ON Wi-Fi in ST mode.

In Step S113-2, the communication control unit 92 controls the second communication unit 21-2 so as to search for the imaging device 1 of the access point (AP).

In Step S114-2, the communication control unit 92 determines whether the imaging device 1 of the access point (AP) was found.

In the case of the imaging device 1 of the access point having been found, it is determined as YES in Step S114-2, and the processing advances to Step S117-2. The processing of Step S117-2 and after will be described later.

In contrast, in the case of the imaging device 1 of the access point not having been found, it is determined as NO in Step S114-2, and the processing advances to Step S115-2.

In Step S115-2, the communication control unit 92 determines whether a time set in advance has elapsed, and timed out.

In the case of not having timed out, it is determined as NO in Step S115-2, and the processing returns to Step S114-2.

In the case of having timed out, it is determined as YES in Step S115-2, and the processing advances to Step S116-2.

In Step S116-2, the application manager 91 ends the app that was launched in Step S111-2. By ending the app, the Wi-Fi communication function of the second communication unit 21-2 is turned OFF. Subsequently, the processing returns to Step S111-2.

In Step S117-2, the communication control unit 92 controls the second communication unit 21-2 so as to perform communication by Wi-Fi, which is the second communication method, connect to the imaging device 1 of the access point (AP), and notify the imaging device 1 of having connected (connection request).

In Step S118-2, the communication control unit 92 controls the second communication unit 21-2 so as to receive an image sent from the imaging device 1. The received image is stored in the image storage section 111. Subsequently, the automatic transmission processing on the portable terminal 2 side ends.

Next, the mode operation processing will be explained.

In addition, "mode operation processing" refers to a series of processing of establishing a communication connection by the second communication method in the imaging device 1 based on various modes of REC mode/PLAY mode of the portable terminal 2, and executing an operation corresponding to the mode in the imaging device 1.

In the case of executing mode operation processing on the imaging device 1 side, as shown in FIG. 4, the photography control unit 51 and communication control unit 52 function in the CPU 11-1.

In addition, the image storage section 71 is established in an area of the storage unit 19-1.

The data of captured images acquired from the image capture unit 16 is stored in the image storage section 71.

The photography control unit 51 controls the image capture unit 16 so as to photograph through images for REC mode. As a result thereof, a through image from the image capture unit 16 is outputted.

The communication control unit 52 controls the first communication unit 20-1 (second communication unit 21-1) so as to perform communication by BLE (Wi-Fi), which is the first communication method (second communication method), and perform instructions and data communication to the portable terminal 2.

More specifically, the communication control unit 52, for example, controls the second communication unit 21-1 so as to perform communication by Wi-Fi, which is the second communication method, to send the through image made from the image capture unit 16 during RCE mode to the portable terminal 2. In addition, the communication control unit 52 controls the second communication unit 21-1 so as to perform communication by Wi-Fi, which is the second communication method, to send a list of images stored in the image storage section 71 to the portable terminal 2, during PLAY mode.

In addition, in the case of executing automatic image reception processing on the portable terminal 2 side, as shown in FIG. 4, the application manager 91 and communication control unit 92 function in the CPU 11-2.

In addition, the image storage section 111 is established in an area of the storage unit 19-2.

Data of images acquired from the imaging device 1 is stored in the image storage section 111.

The application manager 91 manages the launch, end, etc. of applications.

More specifically, the application manager 91 performs communication by BLE, which is the first communication method, and if receiving an instruction to launch an app in the first communication unit 20-2, launches the designated app, for example. In the present embodiment, the application manager 91 launches an app that performs communication control of Wi-Fi, thereby exhibiting a communication control function.

The communication control unit 92 controls the first communication unit 20-2 (second communication unit 21-2) so as to perform communication by BLE (Wi-Fi), which is the first communication method (second communication method), and perform instruction and data communication to the portable terminal 2.

More specifically, the communication control unit 92 controls the second communication unit 21-2 so as to perform communication by Wi-Fi, which is the second communication method, to receive from the imaging device 1 through images made from the image capture unit 16, during REC mode, for example. In addition, the communication control unit 52 controls the second communication unit 21-2 so as to perform communication by Wi-Fi, which is the second communication method, to receive from the imaging device 1 a list of images stored in the image storage section 71, during PLAY mode.

Figure 6:
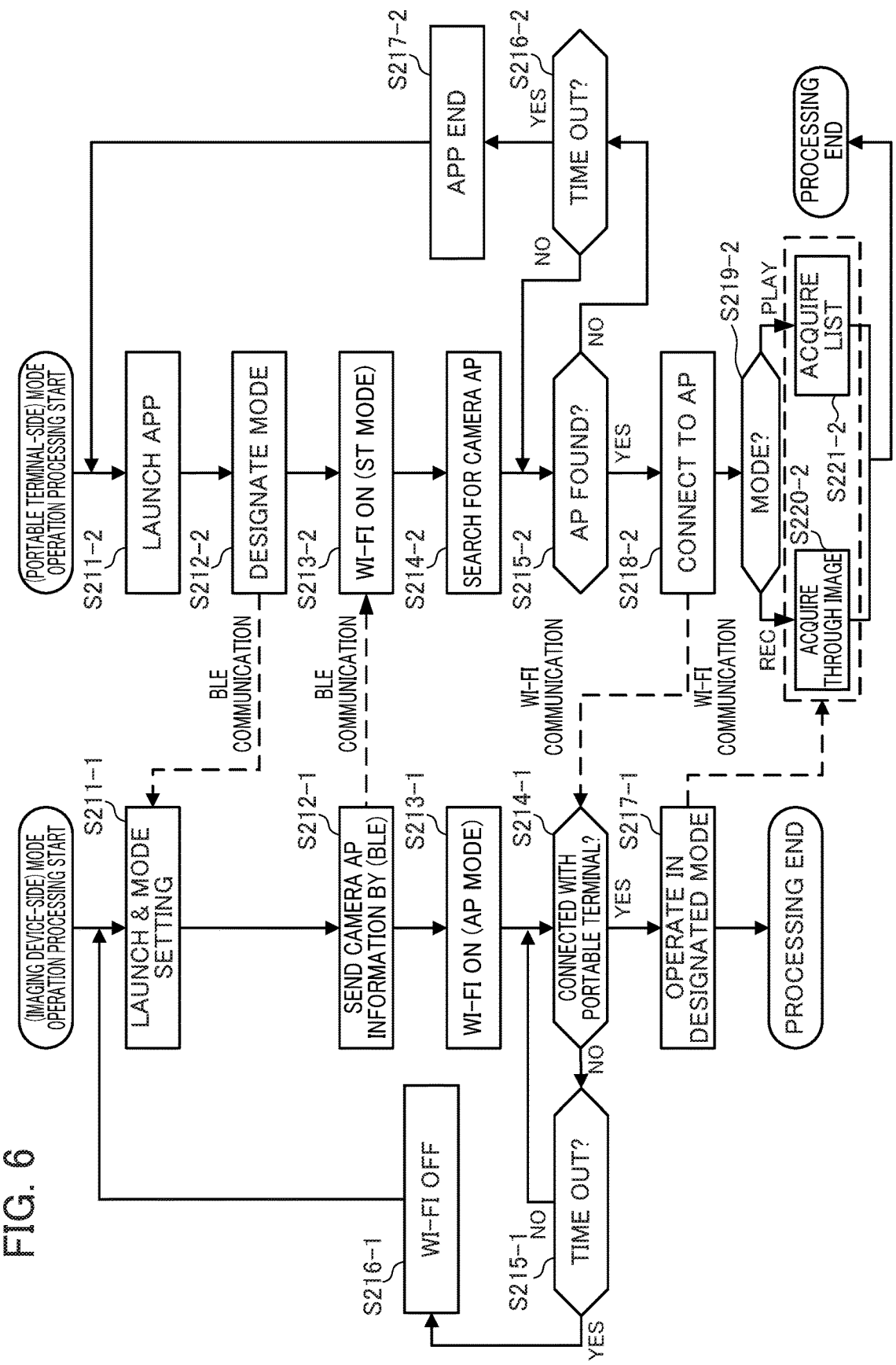
FIG. 6 is a flowchart illustrating the flow of mode operation processing executed by the imaging device and portable terminal of FIG. 3 having the functional configuration of FIG. 4.

FIG. 6 is a flowchart illustrating the flow of mode operation processing executed by the imaging device 1 and portable terminal 2 of FIG. 3 having the functional configurations of FIG. 4.

It should be noted that, in the initial state of the mode operation processing, pairing of BLE, which is the first communication method, between the imaging device 1 and portable terminal 2, has completed, and enters a state of constant connection. In addition, although Wi-Fi that is the first communication method is in the OFF state, a state is entered in which the Wi-Fi settings (profile) of each other can be acquired between the imaging device 1 and portable terminal 2, and a 1-to-1 communication connection can be established between the imaging device 1 and portable terminal 2 during activation of Wi-Fi.

<Mode Operation Processing on Imaging Device 1 Side>

In Step S211-1, the CPU 11 performs communication with the portable terminal 2 by BLE, which is the first communication method, and activates the imaging device 1 according to an activation request from the portable terminal 2, and in the case of there being a mode designation during activation from the portable terminal 2, sets this designated mode. In the present embodiment, the mode is set to either mode of a REC mode that performs photographing while confirming the through image from the imaging device 1 in the portable terminal 2, and a PLAY mode for browsing an image list stored in the imaging device 1 on the portable terminal 2.

In Step S212-1, the communication control unit 52 controls the first communication unit 20-1 so as to perform communication by BLE, which is the first communication method, and send camera AP information to the portable terminal 2. As a result thereof, in the portable terminal 2 having received the camera AP information, Wi-Fi is turned ON in the ST (station) mode in which the portable terminal 2 serves as an extension device, based on the received camera AP information.

In Step S213-1, the communication control unit 52 controls the second communication unit 21-1 so as to turn ON Wi-Fi in the AP (access point) mode serving as the base unit.

In Step S214-1, the communication control unit 52 performs communication by Wi-Fi, which is the second communication method, and determines whether a connection with the portable terminal 2 has been established in the second communication unit 21-1 in response to the connection request from the portable terminal 2.

In the case of having established a connection with the portable terminal 2, it is determined as YES in Step S214-1, and the processing advances to Step S217-1. The processing of Step S217-1 will be described later.

In contrast, in the case of not establishing a connection with the portable terminal 2, it is determined as NO in Step S214-1, and the processing advances to Step S215-1.

In Step S215-1, the communication control unit 52 determines whether a time set in advance has elapsed and timed out.

In the case of not having timed out, it is determined as NO in Step S215-1, and the processing returns to Step S214-1.

In the case of having timed out, it is determined as YES in Step S215-1, and the processing advances to Step S216-1.

In Step S216-1, the communication control unit 52 controls the second communication unit 21-1 so as to turn OFF Wi-Fi. Subsequently, the processing returns to Step S211-1.

In Step S217-1, the photography control unit 51 and communication control unit 52 operate in the mode designated in Step S211-1, or a mode newly designated from the portable terminal 2. In other words, in the case of the designated mode being the REC mode, and there being a sending request of a through image, the photography control unit 51 controls the image capture unit 16 so as to capture a through image, thereby acquiring a through image. Then, the communication control unit 52 controls the second communication unit 21-1 so as to perform communication by Wi-Fi, which is the second communication method, and sequentially transmit the acquired through image to the portable terminal 2. In addition, in the case of the designated mode being the PLAY mode, and there being a sending request of a list of images (thumbnail images), the communication control unit 52 controls the second communication unit 21-1 so as to perform communication by Wi-Fi, which is the second communication method, and send a list of images stored in the image storage section 111 to the portable terminal 2.

Subsequently, the mode operation processing on the imaging device 1 side ends.

<Mode Operation Processing on Portable Terminal 2 Side>

In Step S211-2, the application manager 91 launches an app by an operation, etc. on the input unit 17 by the user. In the present embodiment, the app exhibiting the function designating the mode is launched, whereby the mode designation function is exhibited.

In Step S212-2, the communication control unit 92 controls the second communication unit 21-2 so as to perform communication by BLE, which is the first communication method, and activates the imaging device 1. In addition, in the case of being necessary to designate the mode during activation of the imaging device 1, it sends information designating the mode. In the present embodiment, the mode can be designated as either mode of the REC mode for performing photography while confirming a through image from the imaging device 1 on the portable terminal 2, and the PLAY mode for browsing an image list stored in the imaging device 1 on the portable terminal 2.

In Step S213-2, the communication control unit 92 controls the second communication unit 21-2 so as to perform communication by BLE, which is the first communication method, and in the case of having received AP information from the imaging device 1, to turn ON Wi-Fi in the ST mode.

In Step S214-2, the communication control unit 92 controls the second communication unit 21-2 so as to search for the imaging device 1 of the access point (AP).

In Step S215-2, the communication control unit 92 determines whether the imaging device 1 of the access point (AP) was found.

In the case of the imaging device 1 of the access point having been found, it is determined as YES in Step S215-2, and the processing advances to Step S218-2. The processing of Step S218-2 and after will be described later.

In contrast, in the case of the imaging device 1 of the access point not having been found, it is determined as NO in Step S215-2, and the processing advances to Step S216-2.

In Step S216-2, the communication control unit 92 determines whether a time set in advance has elapsed and timed out.

In the case of not having timed out, it is determined as NO in Step S216-2, and the processing returns to Step S215-2.

In the case of having timed out, it is determined as YES in Step S216-2, and the processing advances to Step S217-2.

In Step S217-2, the application manager 91 ends the app launched in Step S211-2. By ending the app, the Wi-Fi communication function of the second communication unit 21-2 is turned OFF. Subsequently, the processing returns to Step S211-2.

In Step S218-2, the communication control unit 92 controls the second communication unit 21-2 so as to perform communication by Wi-Fi, which is the second communication method, relative to the imaging device 1, to connect to the imaging device 1 of the access point (AP), and notify the imaging device 1 of having connected (connection request).

In Step S219-2, the communication control unit 92 confirms the mode designated according to a user operation or the like.

In the case of the designated mode being REC, it is "REC" in Step S219-2, and the processing advances to Step S220-2.

In Step S220-2, the communication control unit 92 performs communication by Wi-Fi, which is the second communication method, relative to the imaging device 1, switches to the REC mode, performs a sending request of a through image, and sequentially acquires the through image that is sequentially transmitted from the imaging device 1 according to this request. Then, the through image sequentially acquired is sequentially displayed on the output unit 18-2. The user performs an operation such as a photography instruction while browsing the through image being captured by the imaging device 1. Subsequently, the mode operation processing on the portable terminal 2 side ends.

In contrast, in the case of the mode designated by way of a user operation, etc. being PLAY, it is "PLAY" in Step S219-2, and the processing advances to Step S211-2.

In Step S221-2, the communication control unit 92 performs communication by Wi-Fi, which is the second communication method, relative to the imaging device 1, switches to the PLAY mode, performs a sending request of a list of images stored in the image storage section 71, to acquire a list of images (thumbnail images) sent from the imaging device 1 according to this request. Then, the list of images acquired is displayed on the output unit 18-2. The user performs an operation such as selection of images acquired from the imaging device 1, while browsing the list of images stored in the imaging device 1. Subsequently, the mode operation processing on the portable terminal 2 side ends.

FIG. 7 is a schematic view showing a display of the communication status showing the transition of communication states of the imaging device 1 and portable terminal 2, which are sequentially changing with the execution of various processing as mentioned above.

The status display of communication of the imaging device 1 and portable terminal 2 in the first communication method and second communication method is configured to change display for every status, as shown in the example of FIG. 7.

In the case of pairing not being made in the communication status, and thus a connection not being made (<pairing: not yet><connection: no>), it is configured so that status display is not performed.

In the case of pairing being made in the communication status, but a connection not being made (<pairing: done><connection: no>), it is configured so as to display an icon indicating the first communication method and the second communication method by a dotted line or semi-transparent state.

In the case of pairing being made in the communication status and a connection being made (<pairing: done><connection: yes>), it is configured so as to display an icon indicating the first communication method and the second communication method.

The imaging device 1 configured in the above way includes the second communication unit 21-1, communication control unit 52, first communication unit 20-1 and communication control unit 52.

The communication control unit 52 executes predetermined linked processing by performing data transfer by way of the second communication unit 21-2 with the portable terminal 2, which is another apparatus.

The first communication unit 20-1 maintains the communication connection with the portable terminal 2 that is another apparatus, even in a state in which the predetermined linked processing cannot be executed by the communication control unit 52.

The communication control unit 52 causes to transition from a state in which the predetermined linked processing cannot be executed by the communication control unit 52 to a state in which execution is possible, by performing predetermined communication by way of the first communication unit 20-1.

The communication connection with the portable terminal 2 that is the other apparatus is thereby maintained, even if a state in which the predetermined linked processing cannot be executed by the communication control unit 52, and by transitioning from a state in which the predetermined linked processing cannot be performed by the communication control unit 52 to a state in which execution is possible by performing the predetermined communication by way of the first communication unit 52, the predetermined linked processing is executed by the communication control unit 52.

Therefore, the imaging device 1 can receive predetermined data without an operation being made on the portable terminal 2, and thus can improve the convenience of linking of a plurality of devices via wireless communication.

The first communication unit 201-1 is lower speed than the second communication unit 21-1, but is power saving.

The first communication unit 20-1 maintains the communication connection with the portable terminal 2, which is another apparatus, even in a state in which the predetermined linked processing cannot be executed due to a communication connection with the portable terminal 2 that is the other apparatus not being established by the second communication unit 21-1.

The communication control unit 52 causes to transition from a state in which a communication connection with the portable terminal 2 that is the other apparatus is not established by the second communication unit 21-1 to an established state, by performing predetermined communication by way of the first communication unit 20-1.

It is thereby possible to maintain the connection with the portable terminal 2 that is the other device in a lower electric power consumption state, and cause to transition to a state in which the predetermined linked processing can be executed.

The first communication unit 20-1 maintains the communication connection with the portable terminal 2 that is the other apparatus, even in a state in which the predetermined linked processing cannot be executed due to preparation for executing the predetermined linked processing not being possible by either of the portable terminal 2 that is the other apparatus or this imaging device 1.

The communication control unit 52 causes either of the portable terminal 2 that is the other apparatus or this imaging device 1 to transition from the state in which preparation for executing the predetermined linked processing is not possible to a state in which preparation is possible, by performing predetermined communication by way of the first communication unit 20-1.

It thereby becomes possible to, among the apparatuses executing the predetermined linked processing, cause the other apparatus from either one apparatus to transition from a state in which preparation for executing the predetermined linked processing is not possible to a state in which preparation is possible.

State in which preparation for executing the predetermined linked processing is not possible is a state in which the power source of either of the portable terminal 2 that is the other apparatus or this imaging device 1 is OFF, a state in which the program for executing the predetermined linked processing is not launched, or a state in which the second communication unit 21-1 is not functioning.

It thereby becomes possible to cause to transition from various states in which a part of the functions for executing the predetermined linked processing is not operating to a state in which preparation for executing the predetermined linked processing is possible.

The communication control unit 52 causes both of the portable terminal 2 that is the other apparatus or this imaging device 1 to transition to a state in which preparation for executing the predetermined linked processing is possible, even in a case of either of the portable terminal 2 that is the other apparatus or this imaging device 1 being in a state in which preparation for executing the predetermined linked processing is not possible, by performing the predetermined communication by way of the first communication unit 20-1.

It thereby becomes possible for either of the apparatuses executing the predetermined linked processing to cause both apparatuses executing the predetermined linked processing to transition to a state in which preparation for executing the predetermined linked processing is possible.

The communication control unit 52 causes the portable terminal 2 that is the other apparatus to transition to a state in which preparation for executing the predetermined linked processing is possible by sending a predetermined signal to the portable terminal 2 that is the other apparatus by way of the first communication unit 20, in a case of preparation for executing the predetermined linked processing not being possible by the portable terminal 2 that is the other apparatus.

In addition, in the case of this imaging device 1 being in a state in which preparation for executing the predetermined linked processing is not possible, the communication control unit 52 causes this imaging device 1 to transition to a state in which preparation for executing the predetermined linked processing is possible, by receiving a predetermined signal from the portable terminal 2 that is the other apparatus by way of the first communication unit 20-1.

It thereby becomes possible to cause both apparatuses executing the predetermined linked processing to transition to a state in which preparation for executing is possible, by transmitting predetermined signals by way of second wireless communication.

The predetermined linked processing includes first linked processing that controls the portable terminal 2 that is the other apparatus according to operations on this imaging device 1, and second linked processing that controls this imaging device 1 according to operations on the portable terminal 2 that is the other apparatus.

In the case of performing the first linked processing, the communication control unit 52 causes the portable terminal 2 that is the other apparatus to transition to a state in which preparation for executing the first linked processing is possible by sending a predetermined signal to the portable terminal 2 that is the other apparatus by way of the second wireless communication, in response to an operation on this imaging device 1.

In addition, in the case of performing the second linked processing, the communication control unit 52 causes this imaging device 1 to transition to a state in which preparation for executing the second linked processing is possible by receiving a predetermined signal sent by way of the second wireless communication in response to an operation on the portable terminal 2 that is the other apparatus.

It thereby becomes possible to perform the first linked processing by controlling the portable terminal 2 that is the other apparatus from the imaging device 1, and perform the second linked processing by controlling the imaging device 1 from the portable terminal 2 that is the other apparatus.

The communication control unit 52 arbitrarily designates the portable terminal 2 that is the other apparatus performing the predetermined linked processing as the designated apparatus, via a user operation by way of the input unit 17 or the like.

In addition, the communication control unit 52 initiates a communication connection with a designated apparatus by way of the first communication unit 20-1, and in a state maintaining this communication connection, establishes a state releasing the communication connection with the designated apparatus by way of the second communication unit 21-1.

In addition, the communication control unit 52 initiates a communication connection with a designated apparatus by way of the second communication unit 21-1, by performing predetermined communication in which the designated apparatus was designated by way of the first communication unit 20-1.

It thereby becomes possible to designate a specific portable terminal 2 that is the other apparatus and execute the predetermined linked processing.

One among this imaging device 1 and the portable terminal 2 that is the other apparatus is the imaging device 1 including an image capture function, and the other one is the portable terminal 2 including an image display function.

The predetermined linked processing includes image transfer processing that transfers image data captured by the imaging device 1 and causes to be displayed on a display terminal by way of the second communication unit 21-1.

It thereby becomes possible to cause the imaging device 1 and portable terminal 2 to link, transfer the image data captured by the imaging device 1 to a display terminal, and display using the functions of the display terminal.

The predetermined linked processing includes the first linked processing to initiate image transfer processing according to an operation on the imaging device 1, and the second linked processing to initiate image transfer processing according to an operation on the display terminal.

It thereby becomes possible to transfer image data to the display terminal according to an operation on the imaging device 1, and transfer image data from the imaging device 1 according to an operation on the display terminal.

The communication system S configured in the above way includes the imaging device 1 and the portable terminal 2 that realize predetermined functions by linking with each other.

The imaging device 1 includes the second communication unit 21-1, communication control unit 52 and first communication unit 20-1.

The communication control unit 52 executes the predetermined linked processing by performing data transfer by way of the second communication unit 21-1 with the portable terminal 2 that is the other apparatus.

The first communication unit 20-1 maintains a communication connection with the portable terminal 2 that is the other apparatus, even in a state in which the predetermined linked processing cannot be executed by the communication control unit 52.

The communication control unit 52 causes to transition from a state in which the predetermined linked processing cannot be executed by the communication control unit 52 to a state in which execution is possible, by performing predetermined communication by way of the first communication unit 20-1.

The communication connection with the portable terminal 2 that is the other apparatus is thereby maintained even in a state in which the predetermined linked processing cannot be executed by the communication control unit 52, and by transitioning from a state in which the predetermined linked processing cannot be executed by the communication control unit 52 to a state in which execution is possible by performing predetermined communication by way of the first communication unit 20-1, the predetermined linked processing is executed by the communication control unit 52.

Therefore, the imaging device 1 can receive predetermined data without an operation being made on the portable terminal 2, and thus can improve the convenience of linking of a plurality of devices via wireless communication.

In addition, the communication control unit 52 sends image data captured by the imaging device 1 serving as a first apparatus by way of the second communication method serving as the second wireless communication, to the portable terminal 2 serving as the second apparatus.

The communication control unit 52, in a state in which the communication connection is broken between the imaging device 1 serving as the first apparatus and the portable terminal 2 serving as the second apparatus by way of the second communication method serving as second wireless communication, maintains a communication connection between the imaging device 1 serving as the first apparatus and the portable terminal 2 serving as the second apparatus by way of the first communication method serving as first wireless communication, and transmits predetermined control data between the imaging device 1 serving as the first apparatus and the portable terminal 2 serving as the second apparatus by way of the first communication method serving as first wireless communication, thereby causing the second communication method serving as the second wireless communication to transition from a state in which the communication connection is broken between the imaging device 1 serving as the first apparatus and the portable terminal 2 serving as the second apparatus to a connected state.

It is thereby possible to perform connection in the communication system S without an operation being made on the portable terminal 2, and thus possible to improve the convenience of linking of a plurality of devices via wireless communication.

In addition, in the aforementioned embodiment, the imaging device 1 serving as the first apparatus can be configured so as to further include a communication control unit 52/communication control unit 92 serving as an association means mutually storing association information for associating the imaging device 1 serving as the first apparatus and the portable terminal 2 serving as the second apparatus as mutual communication partners.

The imaging device 1 serving as the first apparatus can be configured so as to cause to transition from a state in which the communication connection is broken between the imaging device 1 serving as the first apparatus and the portable terminal 2 serving as the second apparatus to a connected state, following the association information stored by the communication control unit 52/communication control unit 92 serving as the association means.

In addition, in the aforementioned embodiment, the communication control unit 52/communication control unit 92 that are the association means can be configured so as to associate the imaging device 1 serving as the first apparatus and the portable terminal 2 serving as the second apparatus, by transmitting information related to pairing which is association information.

In addition, in the aforementioned embodiment, the communication control unit 52/communication control unit 92 that are the association means can be configured so as to associate the imaging device 1 serving as the first apparatus and the portable terminal 2 serving as the second apparatus as mutual communication partners by way of the communication control unit 52, by transmitting the association information.

In addition, in the aforementioned embodiment, the communication control unit 52/communication control unit 92 that are the association means can be configured so as to allow the apparatus name of the other party to be a candidate for association using the identification information of the apparatus to be selected by displaying on the output unit 18.

Conventionally, technology that connects an imaging device such as a digital camera and an information processing device such as a smartphone by way of wireless communication has been employed.

With such technology, in the case of remotely operating the imaging device from the information processing device by way of wireless communication, first, a wireless communication connection is established between these devices, and predetermined remote operation is subsequently performed.

It should be noted that, in the conventional technology, there is a photography system that remotely operates a camera from a camera operation terminal, as an example of such technology (for example, refer to Japanese Unexamined Patent Application, Publication No. 2014-230024).

However, in the case of remotely operating the imaging device from an information processing device, since the power source of these devices is turned ON every time performing a remote operation, it is necessary to establish a wireless communication connection. In addition, since the role of each device is set in advance in the way of remotely operating the imaging device from the information processing device, the function of remotely operating the imaging device from the information processing device has not been a function with high convenience for the user performing remote operation, because it is only possible to restrictively use the functions set in advance.

The present embodiment has been made taking account of such a situation, and has an object of improving the convenience of linking of a plurality of devices via wireless communication.

Second Embodiment

Figure 8:
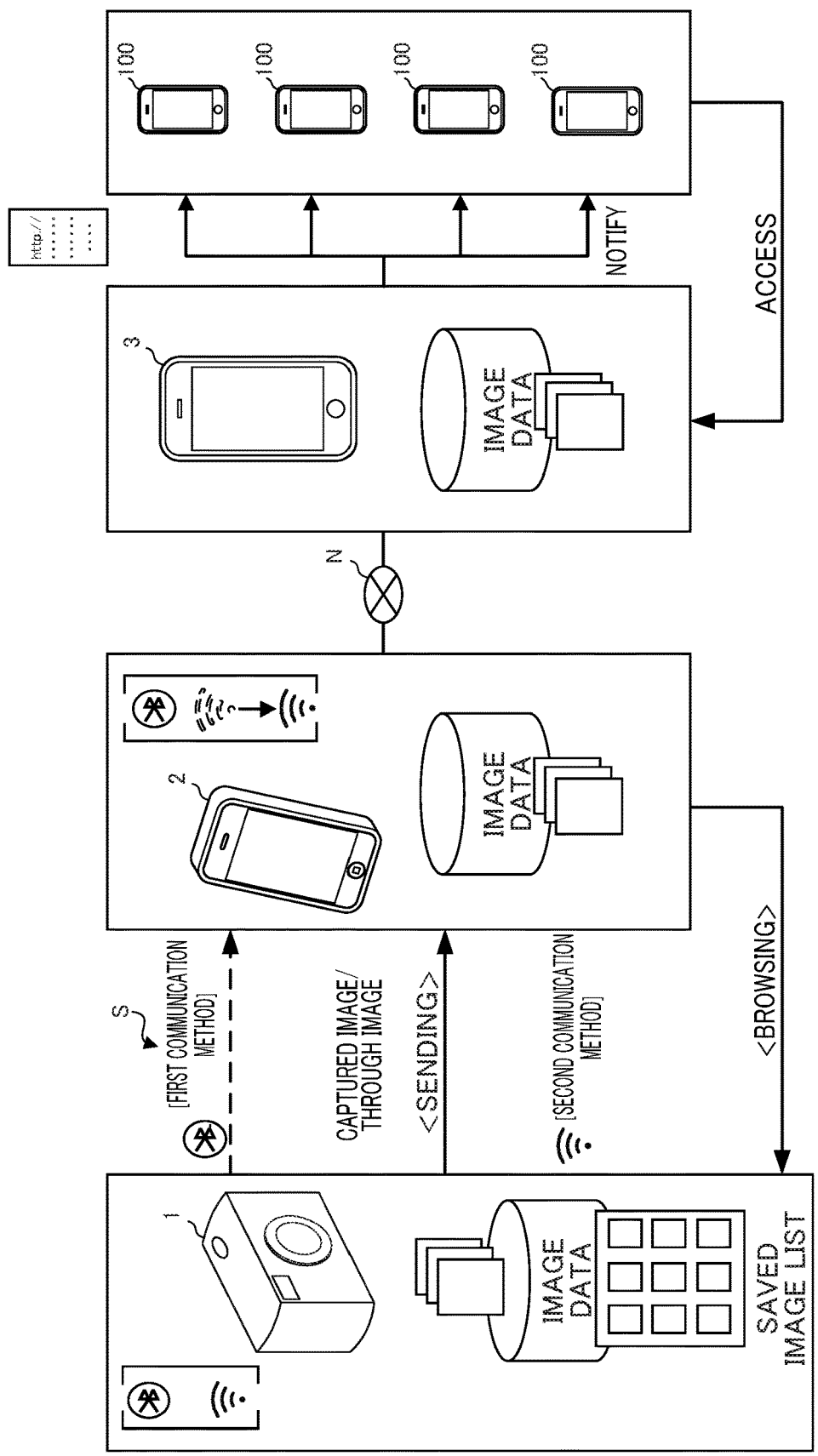
FIG. 8 is a system configuration diagram showing the system configuration of a communication system according to an embodiment of the present invention.

FIG. 8 is a system configuration diagram showing another system configuration of a communication system according to an embodiment of the present invention.

As shown in FIG. 8, the communication system S is premised on the system configuration shown in FIG. 1, and includes the imaging device 1 having at least an image capture/communication function, the portable terminal 2 and server 3 at least having an image display/communication function. The communication system S transfers images captured by the imaging device 1 to the server 3 via the portable terminal 2, saves the images for sharing, and sends sharing information such as the addresses of these saved images to other portable terminals 100, 100, 100, . . . having sharing set. The other portable terminals 100 can browse, etc. images by accessing the server 3 based on the received sharing information.

By a user operating either apparatus among the imaging device 1 and portable terminal 2, the communication system S has functions for performing a request for communication connection by a communication method for which data communication of image file level is possible to the other apparatus from the operation apparatus operated by the user, and performing, in a state in which a communication connection between the imaging device 1 and portable terminal 2 has been established, transmission of image files with the other apparatus and browsing, etc. of image data retained by the other apparatus, according to operations on the operation apparatus.

As shown in FIG. 3, the server 3 is connected to be able to exchange image data with the portable terminal 2 via a network N such as the Internet, and is configured to be able to make images available over the network. It should be noted that, since the hardware configurations are the same as the imaging device 1, except for the image capture unit 16 and first communication unit 20, explanations will be omitted.

Hereinafter, in the case of using the hardware of the server 3 as an explanation, "3" will be appended to the end of the reference symbol. In other words, the server 3 defines elements noted as CPU 11-3 to removable media 31-3.

Hereinafter, link preparation processing (pairing processing) will be explained.

The user arbitrarily designates the imaging device 1 and portable terminal 2 serving as the targets of automatic image transfer processing from among a plurality of imaging devices and a plurality of portable terminals, and processing for pairing the designated imaging device 1 and portable terminal 2 is performed.

After link preparation processing (pairing processing) has completed, it is automatically determined whether or not to perform a link operation depending on the mode setting operation on the imaging device 1 or portable terminal 2 by the user, and which of the imaging device 1 and portable terminal 2 is operated by the user, and which of the automatic image transfer processing and remote operation processing to execute.

Upon photography being instructed according to a user operation, the imaging device 1 performs normal image capture recording so long as the link operation mode is not set; however, in the case of the link operation mode being set, it initiates automatic image transfer processing automatically.

In addition, the portable terminal 2 initiates remote operation processing automatically in the case of link operation being instructed according to a user operation.

Next, the automatic image transfer processing will be explained.

"Automatic image transfer processing" refers to a series of processing in the imaging device 1 of establishing a communication connection by way of the second communication method with the portable terminal 2 in the case of having acquires a captured image from the image capture unit 16, sending the captured image to the portable terminal 2, and receiving an image automatically in the portable terminal 2.

In the case of executing the automatic image reception processing on the imaging device 1 side, as shown in FIG. 4, the photography control unit 51 and communication control unit 52 function in the CPU 11-1.

In addition, the image storage section 71 is established in an area of the storage unit 19-1.

The data of captured images acquired from the image capture unit 16 is stored in the image storage section 71.

The photography control unit 51 controls the image capture unit 16 so as to execute photography processing. As a result thereof, a captured image is outputted from the image capture unit 16. The outputted captured image is stored in the image storage section 71.

The communication control unit 52 controls the first communication unit 20-1 (second communication unit 21-1) so as to perform communication by LE (Wi-Fi), which is the first communication method (second communication method), and perform instruction and data communication to the portable terminal 2.

More specifically, the communication control unit 52 controls the second communication unit 21-1 so as to perform communication by Wi-Fi, which is the second communication method, and send an image captured by the imaging device 1 to the portable terminal 2, for example.

In addition, in the case of executing automatic image reception processing on the portable terminal 2 side, as shown in FIG. 4, the application manager 91 and communication control unit 92 function in the CPU 11-2.

In addition, the image storage section 111 is established in an area of the storage unit 19-2.

The data of captured images acquired from the imaging device 1 is stored in the image storage section 111.

The application manager 91 manages the launch, end, etc. of applications (application programs).

More specifically, the application manager 91, for example, performs communication by LE, which is the first communication method, and if receiving an instruction to launch an application program (hereinafter simply referred to as "application" or "app") in the first communication unit 20-2, launches the designated app. In the present embodiment, the application manager 91 causes the communication control function to be exhibited by launching an app that performs communication control of Wi-Fi. It should be noted that "launch" for app or device, in addition to the case of newly executing an app, includes a case of restarting execution of an app in sleep (during execution in background), and includes a case accompanying transitioning the power source from the OFF state to ON state.

The communication control unit 92 controls the first communication unit 20-2 (second communication unit 21-2) so as to perform communication by LE (Wi-Fi), which is the first communication method (second communication method), and perform reception of instructions and data communication to the portable terminal 2.

More specifically, the communication control unit 92 controls the second communication unit 21-1 so as to perform communication by Wi-Fi, which is the second communication method, and receive images from the imaging device 1, for example.

Figure 9:
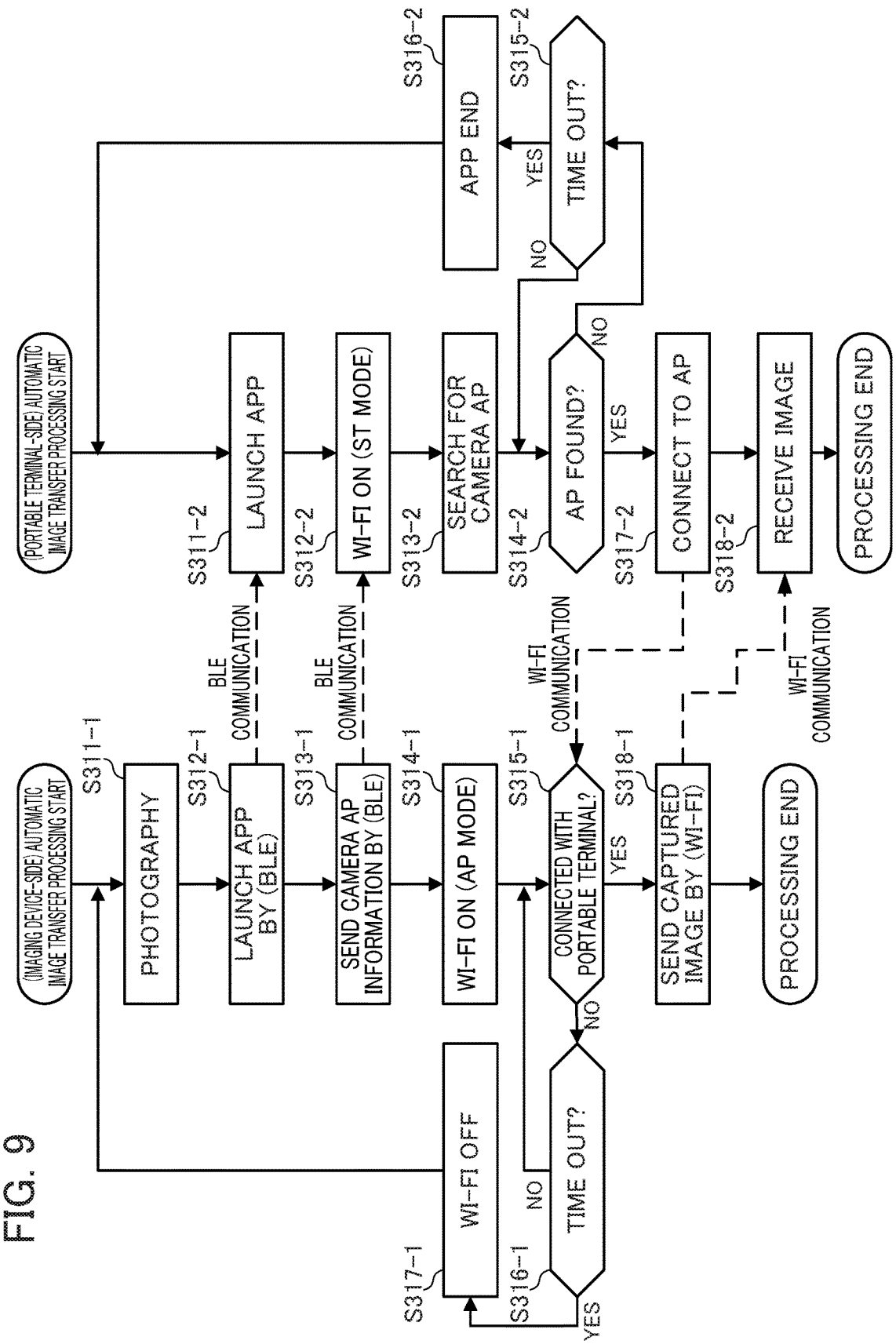
FIG. 9 is a flowchart illustrating the flow of automatic image reception processing executed by the imaging device and portable terminal of FIG. 3 having the functional configuration of FIG. 4.

FIG. 9 is a flowchart illustrating the flow of automatic image reception processing executed by the imaging device 1 and portable terminal 2 of FIG. 3 having the functional configurations of FIG. 4.

It should be noted that, in the initial state of automatic image reception processing, pairing of LE that is the first communication method is completed between the imaging device 1 and portable terminal 2, thereby entering a constantly connected state. In addition, although being an OFF state for Wi-Fi, which is the first communication method, the Wi-Fi settings (profiles) for each other are acquired between the imaging device 1 and portable terminal 2, and a state is entered in which 1-to-1 communication connection between the imaging device 1 and portable terminal 2 can be easily established during activation of Wi-Fi.

<Automatic Image Transfer Processing on Imaging Device 1 Side>

In Step S311-1, the photography control unit 51 controls the image capture unit 16 so as to execute photography processing. As a result thereof, a captured image is outputted from the image capture unit 16. The outputted captured image is stored in the image storage section 71.

In Step S312-1, the communication control unit 52 controls the first communication unit 20-1 so as to perform communication by LE, which is the first communication method, and send an instruction to launch an app to the portable terminal 2. As a result thereof, the app is launched in the portable terminal 2 having received the instruction to launch the app. In the present embodiment, the app performing communication control of Wi-Fi being launched, whereby the communication control function is exhibited.

In Step S313-1, the communication control unit 52 controls the first communication unit 20-1 so as to perform communication by LE, which is the first communication method, and send the access point information of the imaging device 1 (hereinafter referred to as "camera AP information") to the portable terminal 2. As a result thereof, in the portable terminal 2 having received the camera AP information, Wi-Fi is turned ON in the ST (station) mode in which the portable terminal 2 serves as an extension.

In Step S314-1, the communication control unit 52 controls the second communication unit 21-1 so as to turn ON Wi-Fi in the AP (access point) mode serving as the base unit.

In Step S315-1, the communication control unit 52 performs communication by Wi-Fi, which is the second communication method, and determines whether a connection with the portable terminal 2 has been established in the second communication unit 21-1 (if a connection with the portable terminal 2 has not been established, it waits for a connection request from the portable terminal 2 to establish a connection).

In the case of having established a connection with the portable terminal 2, it is determined as YES in Step S315-1, and the processing advances to Step S318-1. The processing of Step S318-1 and after will be described later.

In contrast, in the case of not establishing a connection with the portable terminal 2, it is determined as NO in Step S315-1, and the processing advances to Step S316-1.

In Step S316-1, the communication control unit 52 determines whether a time set in advance has elapsed and timed out.

In the case of not having timed out, it is determined as NO in Step S316-1, and the processing returns to Step S315-1.

In the case of having timed out, it is determined as YES in Step S316-1, and the processing advances to Step S317-1.

In Step S317-1, displaying an error message, etc., the communication control unit 52 controls the second communication unit 21-1 so as to turn OFF Wi-Fi (at this time, it may be configured so as to attempt reconnection according to an instruction of the user without suddenly turning off Wi-Fi, or repeatedly attempt reconnection automatically for a fixed interval). Subsequently, the processing returns to Step S311-1.

In Step S318-1, the communication control unit 52 performs communication by Wi-Fi, which is the second communication method, and controls the second communication unit 21-1 so as to send a captured image photographed to the connected portable terminal 2. As a result thereof, the captured image photographed is sent by Wi-Fi. Subsequently, automatic image reception processing on the imaging device 1 side ends.

<Automatic Image Reception Processing on Portable Terminal 2 Side>

In Step S311-2, the application manager 91 performs communication by BLE, which is the first communication method, and if receiving an instruction to launch an app in the first communication unit 20-2, launches the designated app. In the present embodiment, the app performing communication control of Wi-Fi being launched, whereby the communication control function is exhibited.

In Step S312-2, the communication control unit 92 controls the second communication unit 21-2 so as to perform communication by BLE, which is the first communication method, and in the case of having received camera AP information from the imaging device 1, to turn ON Wi-Fi in the ST mode.

In Step S313-2, the communication control unit 92 controls the second communication unit 21-2 so as to search for the imaging device 1 of the access point (AP) corresponding to the received camera AP information.

In Step S314-2, the communication control unit 92 determines whether the imaging device 1 of the access point (AP) was found.

In the case of the imaging device 1 of the access point having been found (or in the case of a connection with the imaging device 1 already being established), it is determined as YES in Step S314-2, and the processing advances to Step S317-2. The processing of Step S317-2 and after will be described later.

In contrast, in the case of the imaging device 1 of the access point not being found, it is determined as NO in Step S314-2, and the processing advances to Step S315-2.

In Step S315-2, the communication control unit 92 determines whether a time set in advance has elapsed and timed out.

In the case of not having timed out, it is determined as NO in Step S315-2, and the processing returns to Step S314-2.

In the case of having timed out, it is determined as YES in Step S315-2, and the processing advances to Step S316-2.

In Step S316-2, displaying an error message, etc., the application manager 91 ends the app launched in Step S311-2. By ending the app, the Wi-Fi communication function of the second communication unit 21-2 is turned OFF (at this time, it may be configured so as to attempt reconnection according to an instruction of the user, without immediately ending the app to turn OFF Wi-Fi, or repeatedly attempt reconnection automatically for a fixed interval). Subsequently, the processing returns to Step S311-2.

In Step S317-2, the communication control unit 92 controls the second communication unit 21-2 so as to perform communication by Wi-Fi, which is the second communication method, connect to the imaging device 1 of the access point (AP), and notify the imaging device 1 of having connected (establish a communication connection with the imaging device 1).

In Step S318-2, the communication control unit 92 controls the second communication unit 21-2 so as to receive an image sent from the imaging device 1. The received image is stored in the image storage section 111. Subsequently, the automatic image reception processing on the portable terminal 2 side ends.

Next, remote operation processing will be explained.

In addition, "remote operation processing" refers to a series of processing in which a link operation is instructed by a user operation at the portable terminal 2, and if various link operation modes such as REC mode/PLAY mode are selected, establishing a communication connection by the second communication method with the imaging device 1, and executing an operation corresponding to the selected link operation mode in the imaging device 1.

In the case of executing the mode operation processing on the imaging device 1 side, as shown in FIG. 4, the photography control unit 51 and communication control unit 52 function in the CPU 11-1.

In addition, the image storage section 71 is established in an area of the storage unit 19-1.

Data of captured images acquired from the image capture unit 16-1 is stored in the image storage section 71.

The photography control unit 51 controls the image capture unit 16-1 so as to capture a through image. As a result thereof, a through image is outputted from the image capture unit 16-1.

The communication control unit 52 controls the first communication unit 20-1 (second communication unit 21-1) so as to perform communication by BLE (Wi-Fi), which is the first communication method (second communication method), and perform instruction and data communication to the portable terminal 2.

More specifically, the communication control unit 52 controls the second communication unit 21-1 so as to perform communication by Wi-Fi, which is the second communication method, and send the through image made from the image capture unit 16-1 to the portable terminal 2, during REC mode, for example. In addition, the communication control unit 52 controls the second communication unit 21-1 so as to perform communication by Wi-Fi, which is the second communication method, and send a list of images stored in the image storage section 71 to the portable terminal 2 during PLAY mode.

In addition, in the case of executing automatic image reception processing on the portable terminal 2 side, as shown in FIG. 4, the application manager 91 and communication control unit 92 function in the CPU 11-2.

In addition, the image storage section 111 is established in an area of the storage unit 19-2.

Data of images acquired from the imaging device 1 is stored in the image storage section 111.

The application manager 91 manages the launch, end, etc. of applications.

More specifically, the application manager 91 performs communication by BLE, which is the first communication method, and if receiving an instruction to launch an app in the first communication unit 20-2, launches the designated app. In the present embodiment, the application manager 91 causes the communication control function to be exhibited by launching the app that performs communication control of Wi-Fi.

The communication control unit 92 controls the first communication unit 20-2 (second communication unit 21-2) so as to perform communication by BLE (Wi-Fi), which is the first communication method (second communication method), and perform instruction and data communication to the portable terminal 2.

More specifically, the communication control unit 92 controls the second communication unit 21-1 so as to perform communication by Wi-Fi, which is the second communication method, and receive from the imaging device 1 a through image made from the image capture unit 16-1, during REC mode, for example. In addition, the communication control unit 92 controls the second communication unit 21-2 so as to perform communication by Wi-Fi, which is the second communication method, and receive from the imaging device 1 a list of images stored in the image storage section 71, during PLAY mode.

Figure 10:
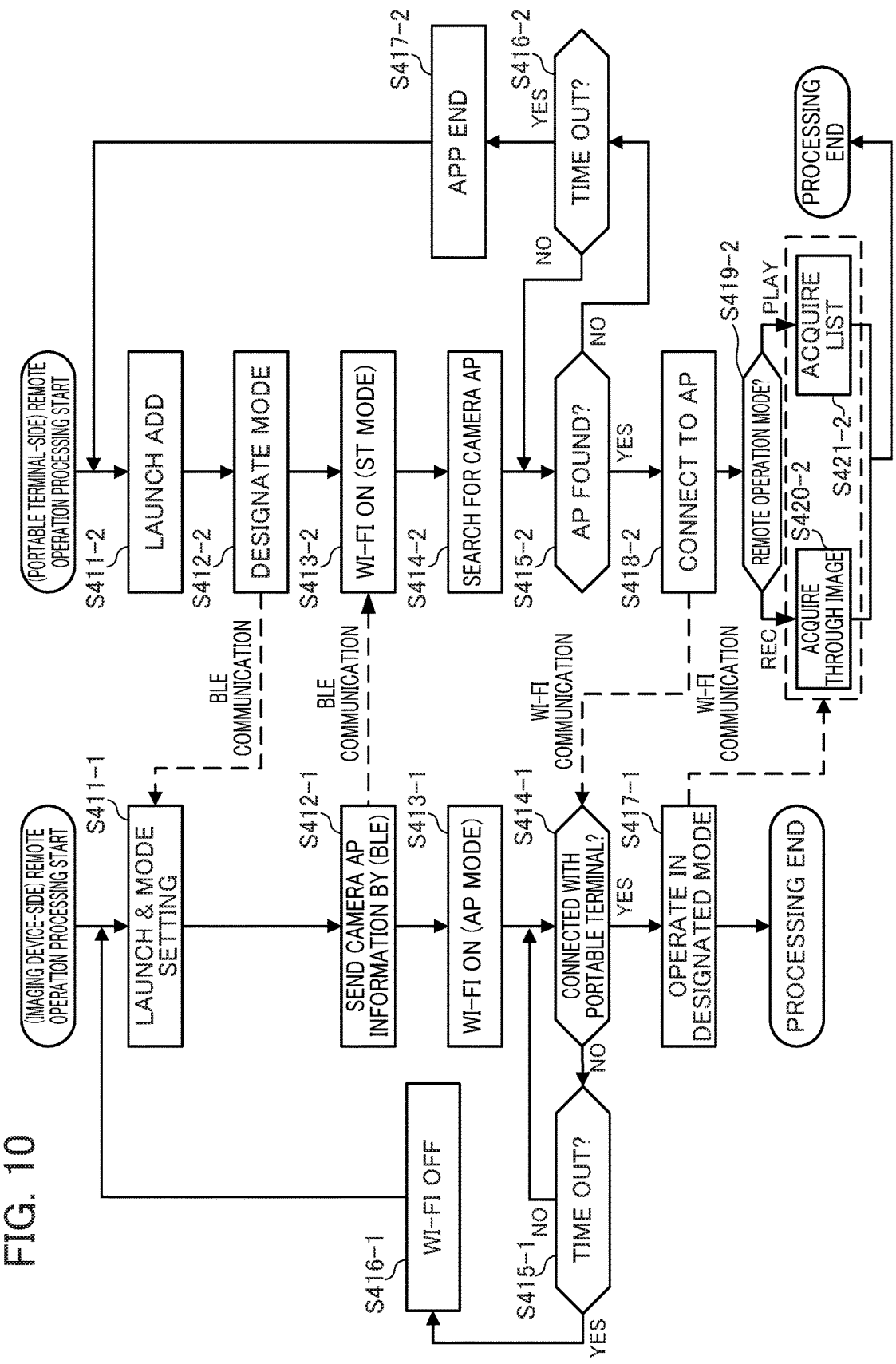
FIG. 10 is a flowchart illustrating the flow of mode operation processing executed by the imaging device and portable terminal of FIG. 3 having the functional configuration of FIG. 4.

FIG. 10 is a flowchart illustrating the flow of remote operation processing executed by the imaging device 1 and portable terminal 2 of FIG. 3 having the functional configurations of FIG. 4.

It should be noted that, in the initial state of mode operation processing, pairing of BLE, which is the first communication method, has completed between the imaging device 1 and portable terminal 2, thereby entering a constant connection state. In addition, although being an OFF state for Wi-Fi, which is the first communication method, the Wi-Fi settings (profiles) for each other are acquired between the imaging device 1 and portable terminal 2, and a state is entered in which 1-to-1 communication connection between the imaging device 1 and portable terminal 2 can be established during activation of Wi-Fi.

<Remote Operation Processing on Imaging Device 1 Side>

In Step S411-1, the imaging device 1 activates in response to a request from the portable terminal 2 via communication by BLE, which is the first communication method, and sets the link operation mode designated from the portable terminal 2. In the present embodiment, the link operation mode is set to either mode of a REC mode that performs photographing while confirming the through image from the imaging device 1 in the portable terminal 2, and a PLAY mode for browsing an image list stored in the imaging device 1 on the portable terminal 2.

In Step S412-1, the communication control unit 52 controls the first communication unit 20-1 so as to perform communication by BLE, which is the first communication method, and send camera AP information to the portable terminal 2. As a result thereof, in the portable terminal 2 having received the camera AP information, Wi-Fi is turned ON in the ST (station) mode in which the portable terminal 2 serves as an extension device.

In Step S413-1, the communication control unit 52 controls the second communication unit 21-1 so as to turn ON Wi-Fi in AP (access point) mode serving as the base unit.

In Step S414-1, the communication control unit 52 performs communication by Wi-Fi, which is the second communication method, and determines whether having established a connection with the portable terminal 2 in the second communication unit 21-1.

In the case of having established a connection with the portable terminal 2, it is determined as YES in Step S414-1, and the processing advances to Step S417-1. The processing of Step S417-1 will be described later.

In contrast, in the case of not having established a connection with the portable terminal 2, it is determined as NO in Step S414-1, and the processing advances to Step S415-1.

In Step S415-1, the communication control unit 52 determines whether a time set in advance has elapsed and timed out.

In the case of not having timed out, it is determined as NO in Step S415-1, and the processing returns to Step S414-1.

In the case of having timed out, it is determined as YES in Step S415-1, and the processing advances to Step S416-1.

In Step S416-1, the communication control unit 52 controls the second communication unit 21-1 so as to turn OFF Wi-Fi. Subsequently, the processing returns to Step S411-1.

In Step S417-1, the photography control unit 51 and communication control unit 52 operate in the mode designated in Step S411-1. In other words, in the case of the designated mode being the REC mode, the photography control unit 51 controls the image capture unit 16-1 so as to capture a through image, thereby acquiring a through image. Then, the communication control unit 52 controls the second communication unit 21-1 so as to perform communication by Wi-Fi, which is the second communication method, and send the acquired through image to the portable terminal 2. In addition, in the case of the designated mode being the PLAY mode, the communication control unit 52 controls the second communication unit 21-1 so as to perform communication by Wi-Fi, which is the second communication method, and send a list of images stored in the image storage section 111 to the portable terminal 2.

Subsequently, the mode operation processing on the imaging device 1 side ends.

<Remote Operation Processing on Portable Terminal 2 Side>

In Step S411-2, the application manager 91 launches an app with the operation or the like on the input unit 17 by the user. In the present embodiment, the app exhibiting the functions designating the mode is launched, whereby the designated functions of the mode are exhibited.

In Step S412-2, when the user performs an operation to select any of a plurality of link operation modes including REC mode and PLAY mode by operating the input unit 17, the communication control unit 92 controls the second communication unit 21-2 so as to send instruction information in order to activate and perform instruction to set to the selected link operation in the imaging device 1, via communication by BLE, which is the first communication method. In the present embodiment, for the link operation mode, either link operation mode of REC mode that performs photography while confirming the through image from the imaging device 1 on the portable terminal 2, and PLAY mode for browsing an image list stored in the imaging device on the portable terminal 2.

In Step S413-2, the communication control unit 92 controls the second communication unit 21-1 so as to perform communication by BLE, which is the first communication method, and in the case of receiving camera AP information from the imaging device 1, turn ON Wi-Fi in ST mode.

In Step S414-2, the communication control unit 92 controls the second communication unit 21-2 so as to search for the imaging device 1 of the access point (AP).

In Step S415-2, the communication control unit 92 determines whether the image device 1 of the access point (AP) was found.

In the case of the imaging device 1 of the access point having been found, it is determined as YES in Step S415-2, and the processing advances to Step S418-2. The processing of Step S418-2 and after will be described later.

In contrast, in the case of the imaging device 1 of the access point not being found, it is determined as NO in Step S415-2, and the processing advances to Step S416-2.

In Step S416-2, the communication control unit 92 determines whether a time set in advance has elapsed and timed out.

In the case of not having timed out, it is determined as NO in Step S416-2, and the processing returns to Step S415-2.

In the case of having timed out, it is determined as YES in Step S416-2, and the processing advances to Step S417-2.

In Step S417-2, the application manager 91 ends the app that was launched in Step S411-2. By ending the app, the Wi-Fi communication function of the second communication unit 21-2 is turned OFF. Subsequently, the processing returns to Step S411-2.

In Step S418-2, the communication control unit 92 controls the second communication unit 21-2 so as to perform communication with the imaging device 1 by Wi-Fi, which is the second communication method, connect to the imaging device 1 of the access point (AP), and notify the imaging device 1 of having connected.

In Step S419-2, the communication control unit 92 confirms the designated link operation mode.

In the case of the designated link operation mode being REC, it becomes "REC" in Step S419-2, and the processing advances to Step S420-2.

In Step S420-2, the communication control unit 92 performs communication with the imaging device 1 by Wi-Fi, which is the second communication method, and acquires a through image. Then, it causes the through image acquired to be displayed on the output unit 18-2. The user performs an operation such as of a photography instruction while browsing the through image being captured by the imaging device 1. Subsequently, the mode operation processing on the portable terminal 2 side ends.

In contrast, in the case of the designated mode being PLAY, it becomes "PLAY" in Step S419-2, and the processing advances to Step S421-2.

In Step S421-2, the communication control unit 92 performs communication with the imaging device 1 by Wi-Fi, which is the second communication method, and acquires a list of images stored in the image storage section 71. Then, it causes the list of images acquired to be displayed on the output unit 18-2. The user performs operations such as the selection of an image acquired from the imaging device 1, while browsing the list of images stored in the imaging device 1. Subsequently, the mode operation processing on the portable terminal 2 side ends.

Next, display operations for displaying changes in the radio wave state and electric power supply state of apparatuses, or the communication status changing before and after execution of link preparation processing (pairing processing), automatic image transfer processing and remote operation processing will be explained.

FIG. 11 is a schematic diagram showing displays of communication statuses of the imaging device 1 and portable terminal 2.

The status display of communication of the imaging device 1 and portable terminal 2 for the first communication method and second communication method is configured so as to change the display for every status, as shown in the example of FIG. 11.

In the case of pairing not being made in the communication status, and thus a connection not being made (<pairing: not yet><connection: no>), it is configured so that status display is not performed.

In the case of pairing being made in the communication status, but a connection not being made (<pairing: done><connection: no>), it is configured so as to display an icon indicating the first communication method and the second communication method by dotted lines or in a semi-transparent state.

In the case of pairing being made in the communication status and a connection being made (<pairing: done><connection: yes>), it is configured so as to display an icon indicating the first communication method and the second communication method.

Figure 12:
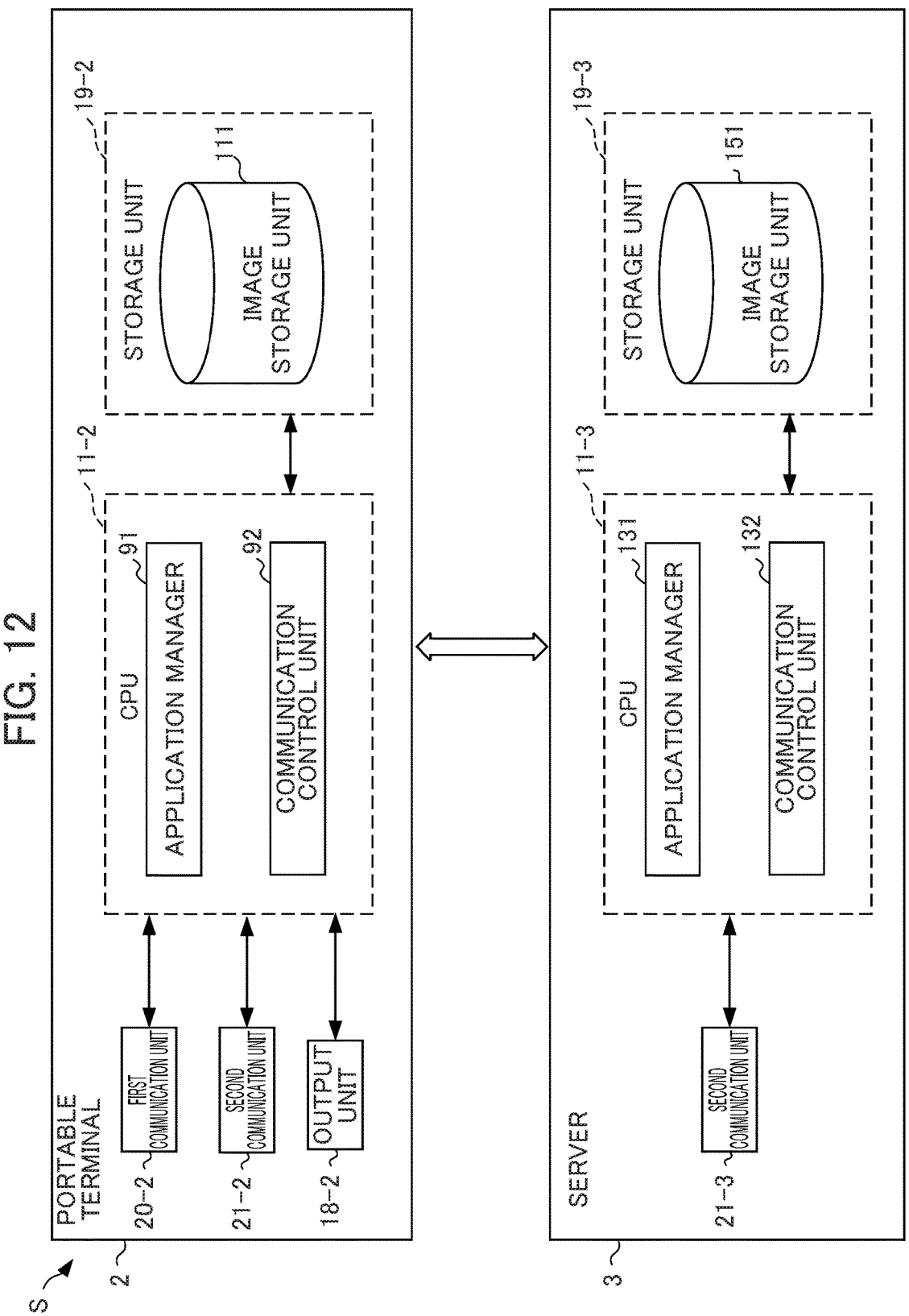
FIG. 12 is a functional block diagram showing the functional configuration for executing image sharing processing, among the functional configurations of the portable terminal of FIG. 3 and a server.

FIG. 12 is a functional block diagram showing the functional configuration for executing image sharing processing, among the functional configurations of the portable terminal 2 and server 3 in FIG. 3.

"Image sharing processing" is processing of sending images captured by the imaging device 1 to the server 3 via the portable terminal 2, and sharing the images by establishing these images in a browsable state on another portable terminal 100.

In the case of executing image sharing processing on the portable terminal 2 side, as shown in FIG. 12, the communication control unit 92 and application manager 91 function in the CPU 11-2.

In addition, the image storage section 111 is established in an area of the storage unit 19-2.

The data of images acquired from the imaging device 1 is stored in the image storage section 111.

The communication control unit 92 controls communication of the second communication unit 21-2. More specifically, the communication control unit 92 controls the second communication unit 21-2 so as to send images and an instruction to perform cloud album creation and sharing destination setting to the server 3.

The application manager 91 manages and controls various application operations, and causes images received from the imaging device 1 to be stored in an app album provided in the image storage section 111.

In contrast, in the case of executing image sharing processing on the server 3 side, an application manager 131 and communication control unit 132 function in a CPU 11-3.

An image storage section 151 is established in an area of a storage unit 19-3.

Data of images acquired from the portable terminal 2 is stored in the image storage section 151.

The application manager 131 manages and controls various application operations, and creates a cloud album in the image storage section 151 based on an instruction from the portable terminal 2, and for example, performs sharing setting to record a mail address of another portable terminal 100 serving as a sharing destination, and stores an image received from the portable terminal 2 in the cloud album of the image storage section 151 thus created.

The communication control unit 132 controls communication of the second communication unit 21-3. More specifically, the communication control unit 92 controls the second communication unit 21-3 so as to send a sharing notification noting the whereabouts of a shared image to the recorded mail address. In the present embodiment, a URL noting the whereabouts of images is described in the sharing notification. In the other portable terminal 100 receiving the sharing notification, the images are made browsable, etc. by accessing the URL described in the notification.

Figure 16:
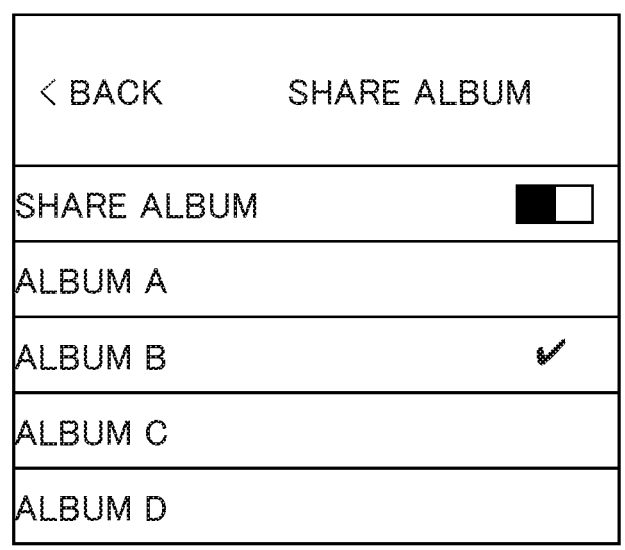
FIG. 16 is a schematic view showing a selection screen of albums in an app.

Next, in Step S318-2 of the automatic transfer processing in FIG. 9 in the case of the image sharing with the other portable terminal 100 b via the server being set, the flow of FIG. 16 is executed after receiving the image in the case of image sharing via the server 3 being set.

Figure 13:
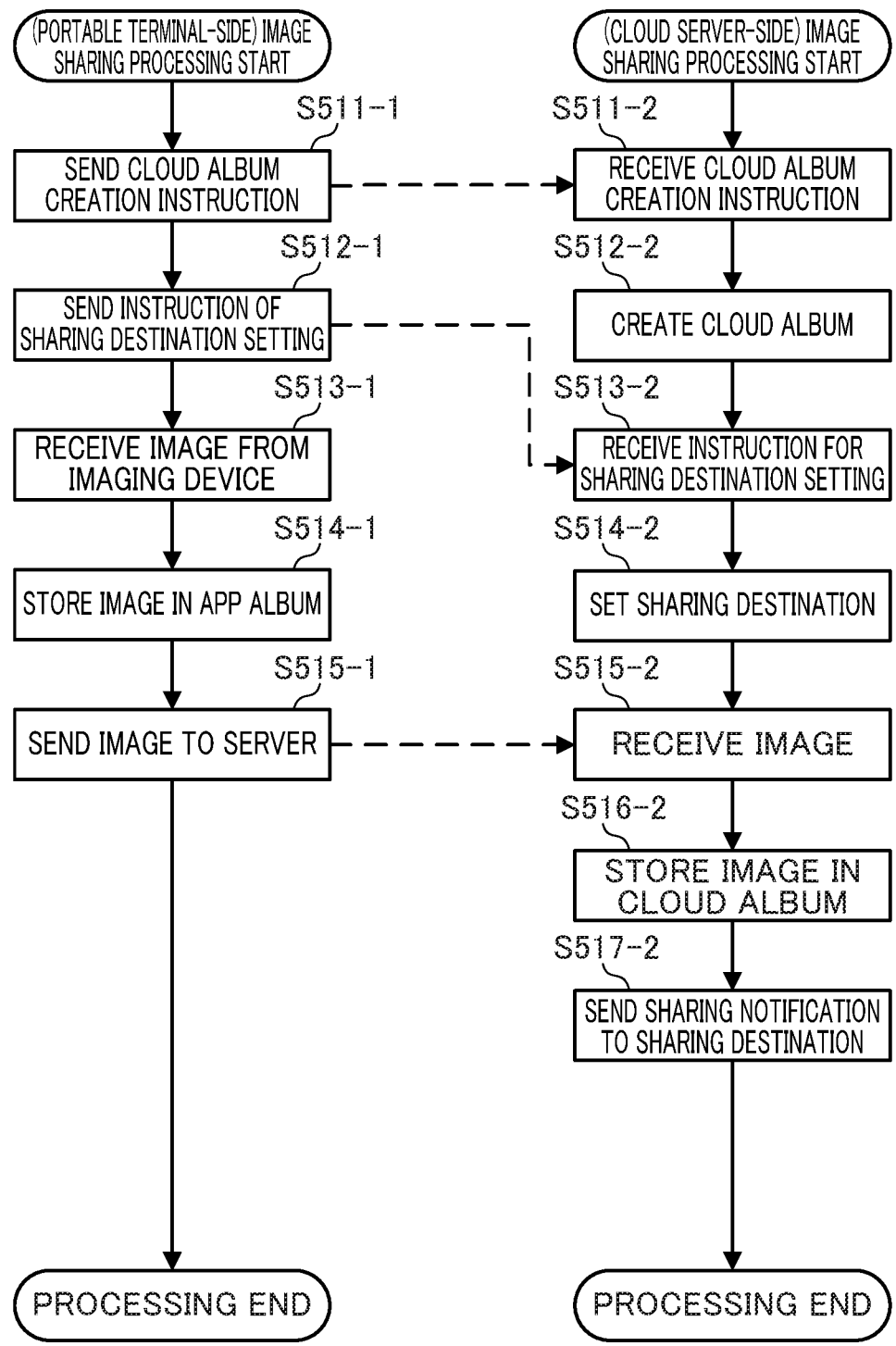
FIG. 13 is a flowchart illustrating the flow of image sharing processing executed by the portable terminal of FIG. 3 having the functional configuration of FIG. 15 and a server.

FIG. 13 is a flowchart illustrating the flow of image sharing processing executed by the portable terminal 2 and server 3 of FIG. 3 having the functional configuration of FIG. 12. It should be noted that the present flowchart is the processing that is executed in the case of the image sharing with the other portable terminal 100 via the server 3 being set, and is performed between the portable terminal 2 and server 3 after receiving an image in Step S318-2 of the automatic transfer processing of FIG. 9.

<Image Sharing Processing on Portable Terminal 2 Side>

In Step S511-1, the communication control unit 92 sends an instruction for cloud album creation to the server 3. Receiving this, the cloud album is created in the image storage section 151 by the server 3.

In Step S512-1, the communication control unit 92 sends an instruction for sharing destination setting (in the present embodiment, registering of mail address of the other portable terminal 100 that is the sharing destination). Receiving this, sharing destination setting is performed by the server 3.

In Step S513-1, the second communication unit 21-2 receives an image from the imaging device 1 by Wi-Fi communication.

In Step S514-1, the application manager 91 causes an image for sending to the server 3 to be stored in the cloud album of the image storage section 111, by receiving the image from the imaging device 1. It should be noted that an image of a size based on the "resize when sending" setting is sent by the imaging device 1.

In Step S515-1, the communication control unit 92 sends an image to the server 3. Receiving this, the server 3 causes the received image to be stored in the cloud album of the image storage section 151.

<Image Sharing Processing on Server 3 Side>

In Step S511-2, the second communication unit 21-3 receives an instruction for cloud album creation from the portable terminal 2.

In Step S512-2, the application manager 131 creates a cloud album in the image storage section 151.

In Step S513-2, the second communication unit 21-3 receives an instruction for sharing setting from the portable terminal 2.

In Step S514-2, the application manager 131 performs sharing setting. More specifically, the mail address of the sharing destination is registered.

In Step S515-2, the second communication unit 21-3 receives an image for sharing from the portable terminal 2.

In Step S516-2, the application manager 131 causes the received image to be stored in the cloud album of the image storage section 151.

In Step S517-2, the communication control unit 132 sends a sharing notification noting the whereabouts of an image to be shared to the registered mail address. In the present embodiment, the URL noting the whereabouts of the image is described in the sharing notification. It is possible to browse, etc. images on the other portable terminal 100 having received the sharing notification by accessing the URL described in the notification.

A communication step T configured in this way possesses a function of, by simply photographing with a camera (imaging device 1), an image is automatically transferred to a smartphone (portable terminal 2), and the image is further sent to a cloud album and notification is automatically performed to a sharing partner.

Conventionally, although there is technology of automatically transferring captured images from a camera to a smartphone, there has not been technology that performs so much as sharing of this destination by simply being saved in a smartphone.

Therefore, the following such operations are performed in the communication step T of the present embodiment.

Pairing the camera and smartphone by BLE following a sequence.

Upon performing pairing, a smartphone app distinguishes the smartphone OS, and sends information thereof to the camera.

Access point information of the camera is stored in the smartphone, and is configured to be able to automatically make a Wi-Fi connection from the smartphone to the camera.

An album for sharing is created in the cloud album.

Sharing partner is set in album for sharing.

Smartphone app sets so as to share in a cloud album if receiving images from a camera.

Access point of camera activated when performing photography by camera, and instruction outputted to the smartphone by BLE so as to connect to the access point of the camera. At this time, a determination is made as to whether to forcibly switch to the access point according to the OS distinction result of the smartphone.

According to the OS distinction result of the smartphone, an instruction is outputted by BLE and the app of the cloud album also launches.

If a Wi-Fi connection is confirmed from the smartphone, the camera sends a captured image to the smartphone. The size at this time follows the "resize when sending" setting of the camera.

When the smartphone app receives an image from the camera, it saves the image at a designated location of the smartphone, and transfers the image to the cloud album. According to the OS distinction result of the smartphone, the exchange method of images between the camera image reception app and cloud album app is changed.

When the image arrives at the cloud album side, a notification of the image being registered in the album is outputted to a sharer.

The sharer having received notification can access the cloud album to confirm images, by operating this notification.

As a result thereof, it is possible to exert the following effects by the communication step T of the present embodiment.

It is possible to transfer a captured image automatically from the camera to smartphone.

It is possible to share images automatically received by the smartphone in a cloud album, without operating the smartphone.

Users will not be aware of differences in OS of smartphones.

<App Linked Processing by BLE>

The app linked processing by BLE is a portion not mentioned in FIG. 9 and FIG. 13, and is a constraint of the OS serving as assumptions upon executing the processing of FIG. 9, FIG. 13, etc., and processing related to the constraints thereof.

The communication system S of the present embodiment uses a notification function of BLE, and has a function allowing link operation to be made between a plurality of apps.

Conventionally, a "URL scheme" that is a mechanism of link operations by a plurality of apps operating on a specific OS (e.g., iOS) has a restriction in only being able to be used from an app in operation in the foreground (top screen), and not being able to be used during operation in the background, and thus an app in operation in the background cannot link with another app using the "URL scheme". On the other hand, the function of BLE can be used by an app in operation in the background.

Therefore, it is made to operate as follows in the communication system S of the present embodiment.

A BLE profile for performing request of app launch and notification to the camera is provided.

An app having initiative (app A) connects (pairs) with the camera by BLE, notifies another app (app B) of BLE connection information, and jointly uses the BLE connection by the app A and app B.

The app B prepares and waits so as to be able to acquire an app launch notification from the BLE connection information.

The app A executes an app launch request, the camera receives this and notifies app launch of app B, and then the app B having received this initiates operation.

Upon releasing pairing with the camera, the app A notifies the app B, and the app B ends standby for BLE notification.

Therefore, link operation is possible during operation in the background for a plurality of apps operating on iOS in the communication system S of the present embodiment. In addition, after releasing pairing, it will not standby pointlessly for BLE notification.

Figure 14:
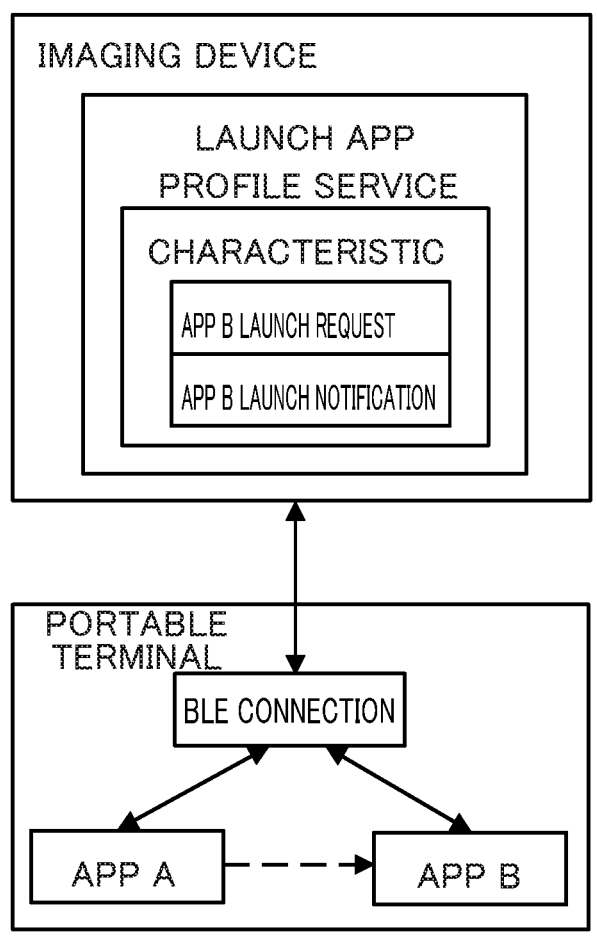
FIG. 14 is an operational configuration diagram of an application by the imaging device and portable terminal in the communication system of the present embodiment.

Next, app operation configuration will be explained. FIG. 14 is an operation configuration diagram of apps in the imaging device 1 and portable terminal 2 of the communication system S of the present embodiment.

The app A saves images automatically sent from the camera.

The app B is an app for realizing a link function of registering images saved by the app A in an album of app B management.

The imaging device 1 is a peripheral of BLE, and has a BLE profile for app linking built in.

The portable terminal 2 operating by a specific OS is a central of BLE, and jointly uses the BLE connection by the app A and app B.

An iOS device is connected by BLE with the imaging device 1, and information of the BLE profile is communicated.

Figure 15:
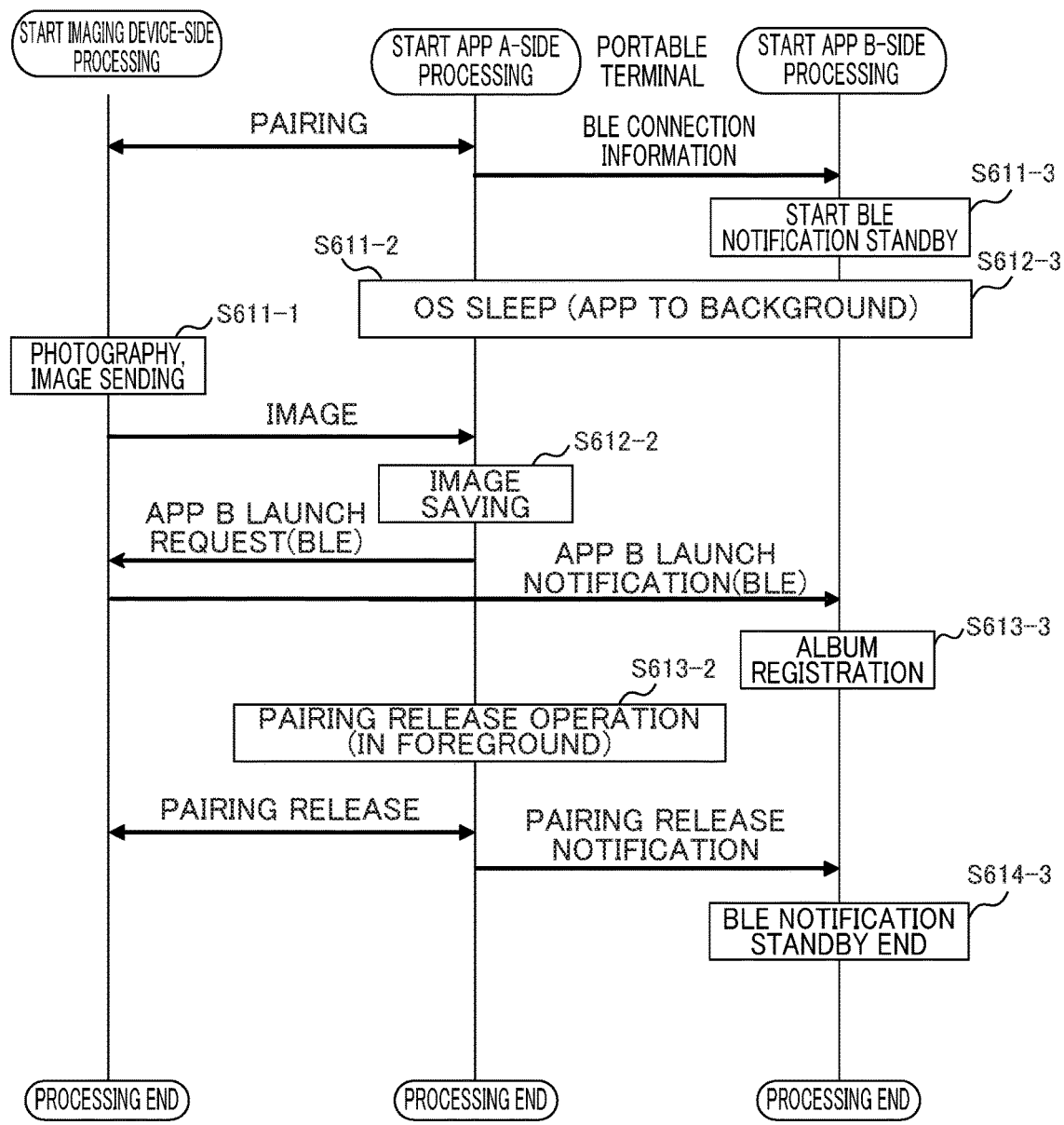
FIG. 15 is a flowchart showing an operational sequence by the imaging device and portable terminal in the communication system of the present embodiment.

Next, an operation sequence will be shown. FIG. 15 is a flowchart showing an operation sequence by the imaging device 1 and portable terminal 2 in the communication system S of the present embodiment.

The app A pairs with the camera, and notifies the app B of BLE connection information by the URL scheme. The app A can use the URL scheme due to operating in the foreground.

The app B prepares so as to be able to acquire an app launch notification (notification of app B launch notification characteristics) from the BLE connection information, and initiates standby for BLE notification.

When causing the OS to sleep, the app A enters background operation.

The app A receives and saves an automatically sent image from the camera while in background operation, performs a launch request of app B to the camera (fills data into the app B launch request characteristics), and the camera receives this and performs notification according to the app B launch notification characteristics, the app B standing by for this launches, and registers the image in an album of app B management.

The app A notifies the app B by the URL scheme when releasing pairing with the camera, and the app B ends standby for BLE notification.

<Imaging Device-Side Processing>

The imaging device-side processing is initiated by an operation of imaging device-side processing start on the input unit 17-1 by the user. It should be noted that, after processing initiation, it operates so that pairing (connection) of BLE communication and Wi-Fi communication is established between the imaging device 1 and portable terminal 2 (app A).

In Step S611-1, the photography control unit 51 controls the image capture unit 16-1 so as to perform photography, and the communication control unit 52 controls the second communication unit 21-1 so as to send the captured image to the portable terminal 2.

Subsequently, in the case of the launch request of app B from app A of the portable terminal 2 being through BLE, the communication control unit 52 controls the first communication unit 20-1 so as to send launch notification through BLE to the app B of the portable terminal 2. As a result thereof, the app B of the portable terminal 2 launches, and the sent photograph is registered in the album. Subsequently, pairing (connection) with the portable terminal 2 is released, and the imaging device-side processing ends.

<App A-Side Processing>

The processing on the portable terminal 2 side of the app A and app B is initiated by an operation of portable terminal-side processing start on the input unit 17-2 by the user. It should be noted that, after processing initiation, it operates so that pairing (connection) of BLE communication and Wi-Fi communication is established by the app A of the portable terminal 2 between the imaging device 1 and portable terminal 2. In the case of pairing having established, the app A provides BLE connection information to the app B.

In Step S611-2, the application manager 131 controls so that the app A enters background operation by OS sleep.

In Step S612-2, in the case of receiving an image from the imaging device 1, the application manager 131 controls so as to save an image in the image storage section 151 by way of the app A. Subsequently, the communication control unit 92 controls the first communication unit 20-2 so as to send a launch request through BLE to the app B by way of the app A under the application manager 91.

In Step S613-2, the application manager 131 causes the app A to operate in the foreground, and makes a pairing release operation. As a result thereof, the pairing (connection) with the imaging device 1 is released and a pairing release notification is provided to the app B, whereby the app A-side processing ends.

<App B-side Processing>

In Step S611-3, the application manager 131 receives the BLE connection information provided from the app A, and controls so as to initiate BLE notification standby in the app B.

In Step S612-3, the application manager 131 controls so that the app B enters background operation according to OS sleep.

In Step S613-3, the application manager 131 controls so as to operate in the foreground according to an app launch request from the imaging device 1, and the communication control unit 132 controls the second communication unit 21-2 so as to send an image stored in the image storage section 151 to the cloud server, and performs album registration by storing images in a predetermined storage area of the cloud server.

In Step S614-3, the application manager 131 receives a pairing release notification from the app A, and controls so as to end BLE notification standby of the app B. Subsequently, the app B-side processing ends.

MODIFIED EXAMPLE

The present example is another example of a case of receiving an image in Step S318-2 of the automatic transfer processing in FIG. 9, and then executing the image sharing processing of FIG. 13.

In the aforementioned embodiment, the linking apps are not limited to two.

In addition, it may implement a BLE profile for app linking not in the imaging device 1, but rather a separate apparatus.

<Album Registration Processing in Automatic Image Sending Camera>

In the communication system S of the present embodiment, an album registration function is included in the automatic image sending camera. In other words, in the communication system S of the present embodiment, the automatic sending camera has a function of automatically transferring images along with registering in an album on the Net, by making an album setting in advance.

Conventionally, a function is built-in of automatically sending a captured image to a terminal side after photographing by a camera, between a camera and a mobile terminal such as a smartphone. Conventionally, after sending an image to the mobile terminal by a wireless connection, it must register in SNS and register in an album service on the Net by a manual operation of a user. There is a problem in that album sharing many images requires an exceeding amount of labor, and particularly, since many images can be sent with a camera with the current automatic sending function, a function combining this has been desired.

1. Therefore, the following such operations are performed in the communication system S of the present embodiment. Advance Selection of Album by App Prior to initiating operation, as shown in FIG. 16, the album is selected by the app in advance, and in a transfer app on the mobile terminal side corresponding to the camera, it is decided in which albums to register a selection of whether or not to register images automatically sent by the camera in the album. It should be noted that FIG. 16 is a schematic diagram showing a selection screen of albums by the app.

Figure 17:
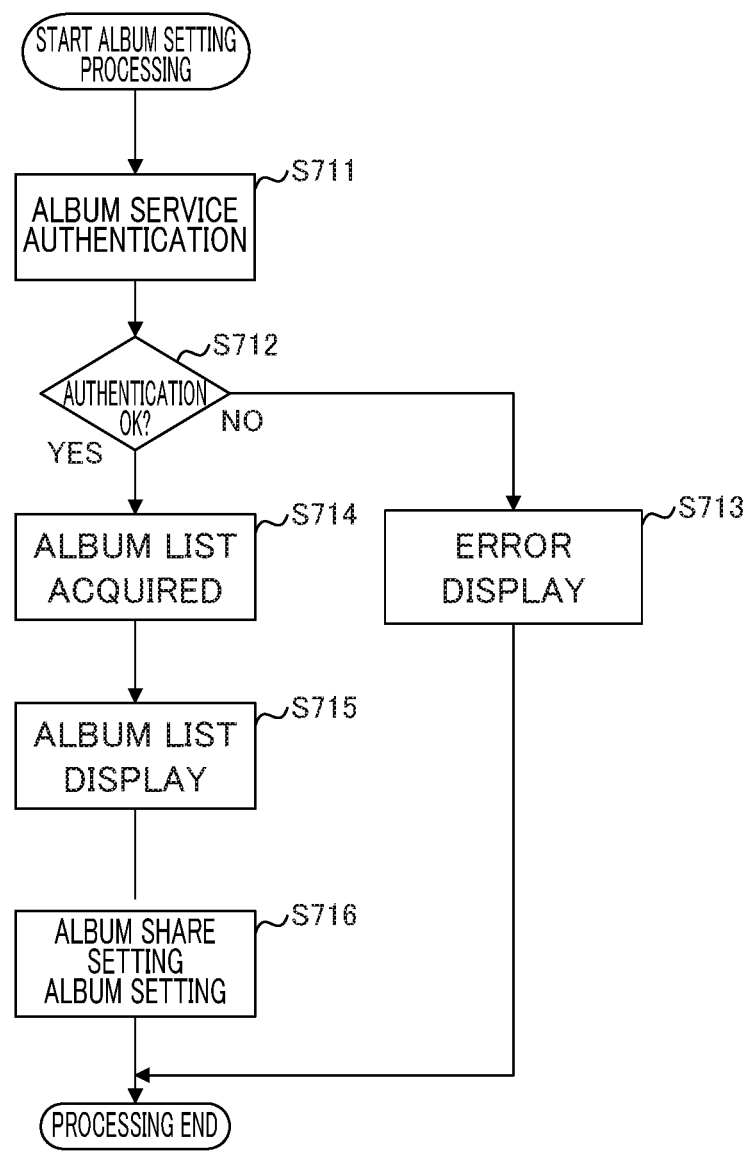
FIG. 17 is a flowchart illustrating the flow of album registration processing.
Figure 18:
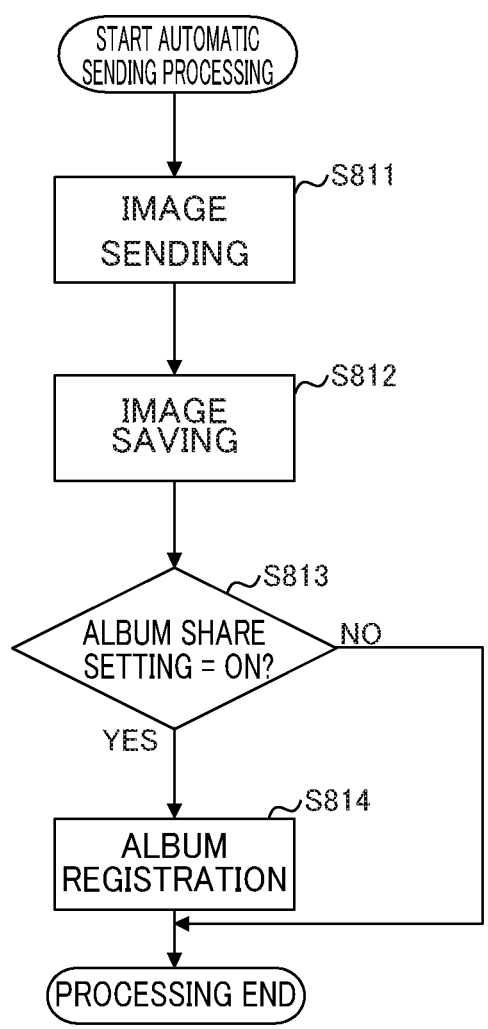
FIG. 18 is a flowchart illustrating the flow of automatic sending processing.

As operations of the processing, as shown in FIGS. 17 and 18, upon turning ON "share album" in advance, when automatically sending using the camera, it will be registered in the album in accordance with this setting. It should be noted that FIG. 17 is a flowchart illustrating the flow of album registration processing, and FIG. 18 is a flowchart illustrating the flow of automatic sending processing.

<Album Setting Processing>

The album setting processing is initiated by an operation of album setting processing start on the input unit 17-2 by the user.

In Step S711, the communication control unit 132 controls the second communication unit 21-2 so as to perform album service authentication in the server 3.

In Step S712, the communication control unit 132 determines whether or not authentication was OK as a result of authentication control with the server 3.

In the case of authentication being OK, it is determined as YES in Step S712, and the processing advances to Step S714.

In contrast, in the case of authentication not being OK, it is determined as NO in Step S712, and the processing advances to Step S713.

In Step S713, the CPU 11-2 controls the output unit 18-1 so as to display an error due to being authentication NG.

In Step S714, the communication control unit 32 controls the second communication unit 21-2 so as to acquire an album list from the server 3.

In Step S715, the CPU 11-2 controls the output unit 18-2 so as to display the album list acquired from the server 3.

In Step S716, an operation for selecting an album in the album share settings is made on the input unit 17-2 according to a user operation, and the application manager 131 selects the album to be shared. Subsequently, the album setting processing ends.

<Automatic Sending Processing>

It should be noted that the present automatic sending processing is another example of the automatic transfer processing in FIG. 9.

The automatic sending processing is initiated by an operation of automatic sending processing start on the input unit 17-1 by a user.

In Step S811, the communication control unit 132 controls the second communication unit 21-2 so as to receive an image from the imaging device 1.

In Step S812, the application manager 131 saves the received image in the image storage section 151.

In Step S813, the application manager 131 determines whether the album share setting is ON.

In the case of the album share setting being ON, it is determined as YES in Step S813, and the processing advances to Step S814.

In contrast, in the case of the album share setting not being ON, it is determined as NO in Step S813, and ends.

In Step S814, the communication control unit 132 controls the second communication unit 21-2 so as to cause an image saved in the image storage section 151 to be stored in a predetermined storage area of the server 3, and performs album registration. Subsequently, the automatic sending processing ends.

2. Selection of Album by Camera in Advance

In the operations of 1, although being contents to select the album on the app side, it can also notify the camera of album information acquired on the app side, and select the album on the camera side.

The camera performs album setting in advance prior to photography. By way of communication (may be either BLE or Wi-Fi), the album information is acquired with an app of the mobile terminal, and this is notified to the camera, whereby this album information is displayed on the camera. The user views the screen of the camera, selects an album, and sets whether or not to share in the album.

In automatic sending, a selected album ID is attached to the captured image, and sent to the mobile terminal. On the terminal side, registration is performed in the album according to the album ID of images received.

Figure 19:
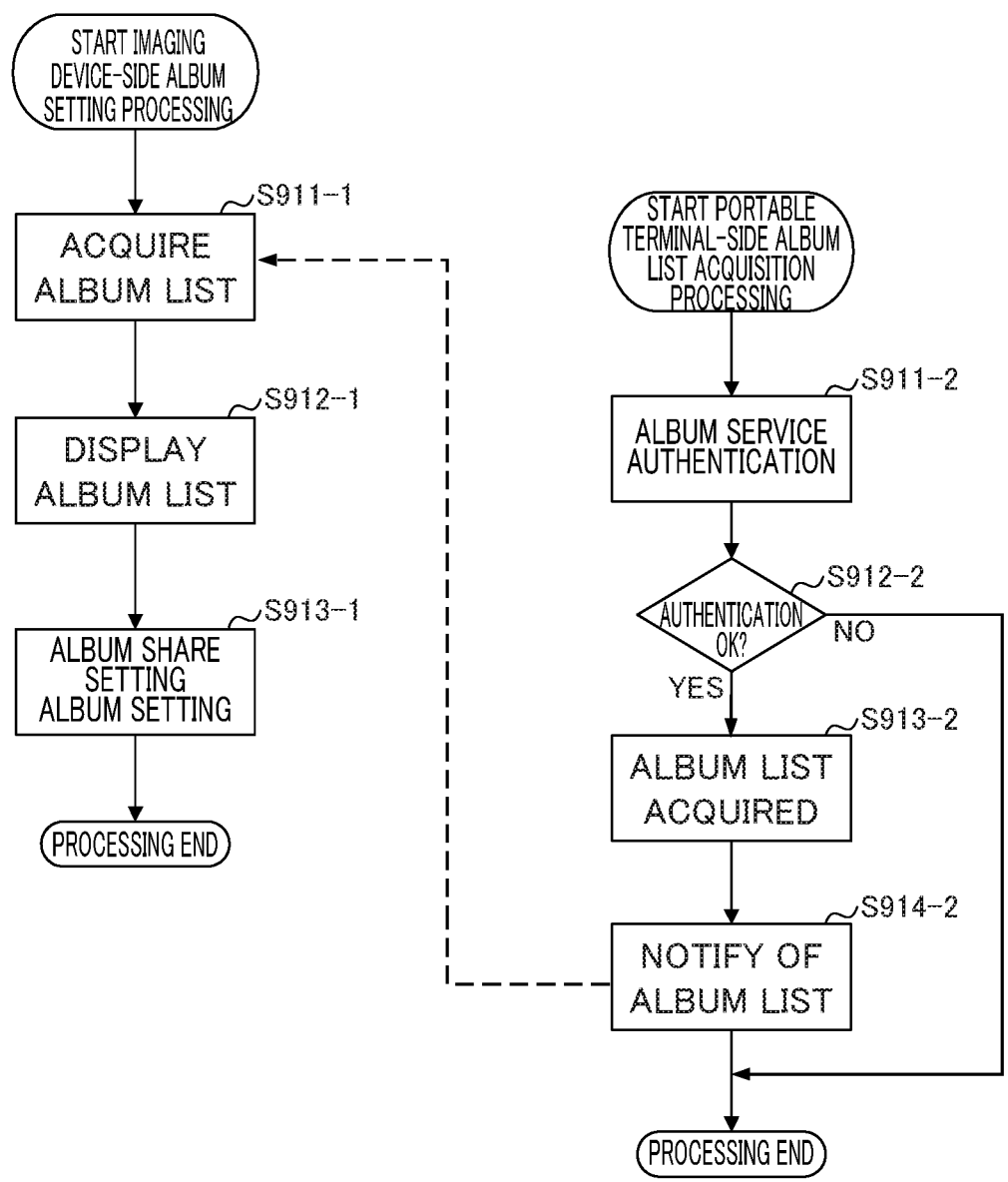
FIG. 19 is a flowchart illustrating the flow of album selection processing on a camera side.
Figure 20:
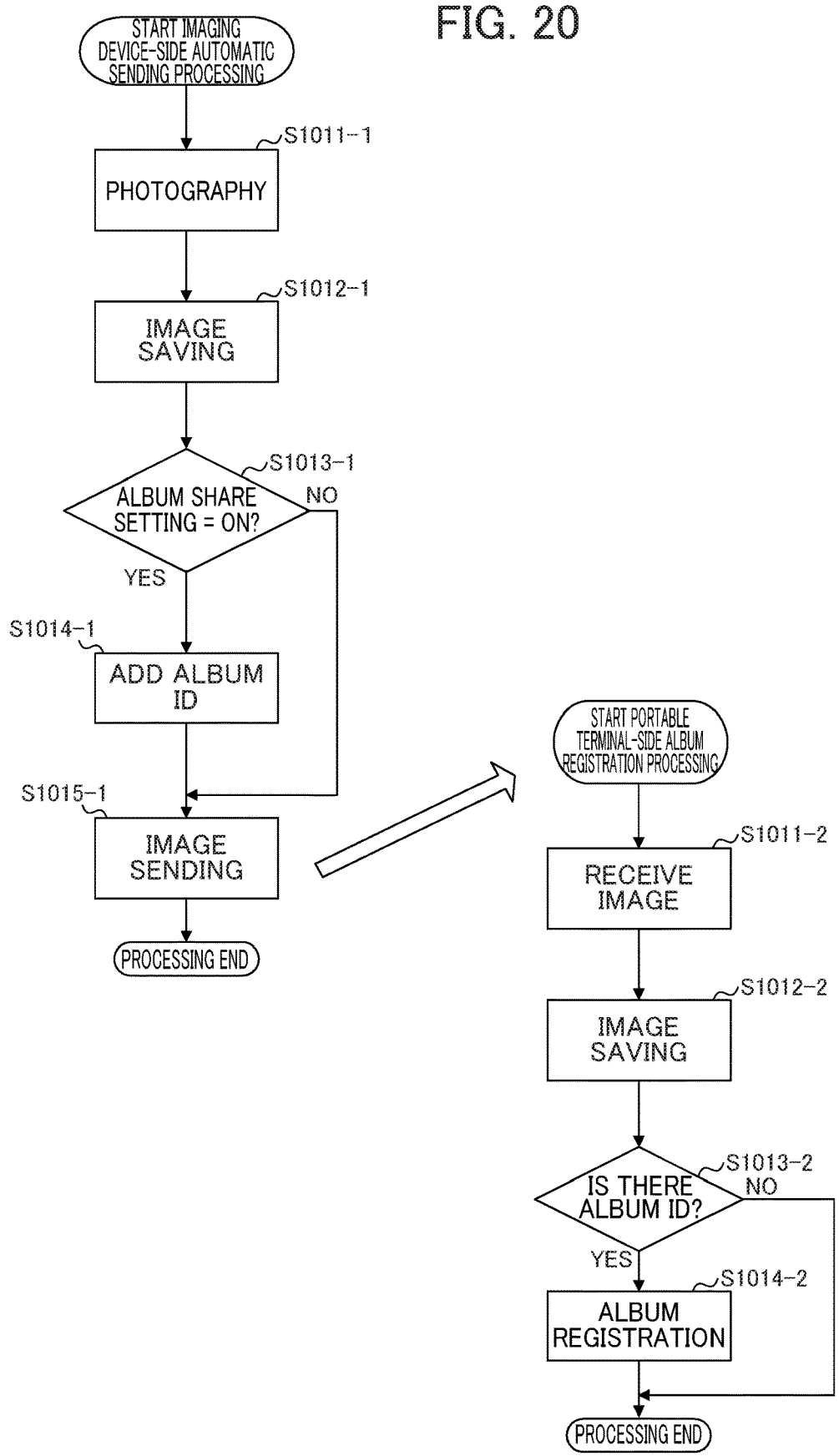
FIG. 20 is a flowchart illustrating the flow of image registration processing.

It should be noted that FIG. 19 is a flowchart illustrating the flow of album selection processing on the camera side, and FIG. 20 is a flowchart illustrating the flow of image registration processing.

<Imaging Device-side Album Setting Processing>

The album setting processing on the imaging device 1 side is initiated by an operation of album setting processing start on the input unit 17-1 by the user.

In Step S911-1, the communication control unit 92 controls the second communication unit so as to acquire an album list from the server 3.

In Step S912-1, the CPU 11-1 controls the output unit 18-1 so as to display the album list acquired from the server 3.

In Step S913-1, the operation to select an album is made in the album share settings on the input unit 17-1 according to a user operation, and the application manager 91 selects an album to share. Subsequently, the album setting processing on the imaging device 1 side ends.

<Portable Terminal-side Album List Acquisition Processing>

In addition, the album list acquisition processing on the portable terminal 2 side is initiated by an operation of album list acquisition processing start on the input unit 17-2 by the user.

In Step S911-2, the communication control unit 132 controls the second communication unit 21-2 so as to perform album service authentication in the server 3.

In Step S912-2, the communication control unit 132 determines whether or not authentication is OK as a result of authentication control with the server 3.

In the case of authentication being OK, it is determined as YES in Step S912-2, and the processing advances to Step S913-2.

In contrast, in the case of authentication not being OK, it is determined as NO in Step S912-2, and the album list acquisition processing on the portable terminal 2 side ends.

In Step S913-2, the communication control unit 132 controls the second communication unit 21-2 so as to acquire an album list from the server 3.

In Step S914-2, the communication control unit 132 controls the second communication unit 21-2 to notify the imaging device 1 of an album list acquired from the server 3.

Subsequently, the album list acquisition processing on the portable terminal 2 side ends.

<Imaging Device-Side Automatic Sending Processing>

The automatic sending processing on the imaging device 1 side is initiated by an operation of automatic sending processing start on the input unit 17-1 by the user.

In Step S1011-1, the photography control unit 51 controls the image capture unit 16-1-1 so as to perform photography.

In Step S1012-1, the photography control unit 51 saves an image captured in the image storage section 71.

In Step S1013-1, the communication control unit 52 determines whether or not the album share setting is ON.

In the case of the album share setting being ON, it is determined as YES in Step S1013-1, and the processing advances to Step S1014-1.

In contrast, in the case of the album share setting not being ON, it is determined as NO in Step S1013-1, and the processing advances to Step S1015-1.

In Step S1014-1, the communication control unit 52 attaches an album ID to the image that is the sending target for sharing.

In Step S1015-1, the communication control unit 52 controls the second communication unit 21-1 so as to send an image to which the album ID is attached to the portable terminal 2. Subsequently, the automatic sending processing on the imaging device 1 side ends.

<Portable Terminal-side Album Registration Processing>

The album registration processing on the portable terminal 2 side is initiated by an operation of portable terminal-side album registration processing start on the input unit 17-2 by the user.

In Step S1011-2, the communication control unit 92 controls the second communication unit 21-2 so as to receive an image from the imaging device 1.

In Step S1012-2, the application manager 91 saves the image received in the image storage section 111.

In Step S1013-2, the application manager 91 determines whether there is an album ID.

In the case of there being an album ID, it is determined as YES in Step S1013-2, and the processing advances to Step S1014-2.

In contrast, in the case of there not being an album ID, it is determined as NO in Step S1013-2, and the album registration processing on the portable terminal 2 side ends.

In Step S1014-2, the communication control unit 92 controls the second communication unit 21-2 so as to cause an image saved in the image storage section 151 to be stored in a predetermined storage area of the server 3, and performs album registration.

Subsequently, the album registration processing on the portable terminal 2 side ends.

3. Selection of Plurality of Albums by Camera and App

In the case of using a plurality of albums for different purposes in the operation of 1, the camera selects (N/A) not to album register with the three types of album A, album B and album C on the album setting screen. It is possible to confirm the type of album being selected during photography (REC).

In addition, the app selects in advance to which album the album A, album B and album C are set specifically, respectively.

It should be noted that FIG. 21 is a schematic diagram showing a screen display example of the imaging device 1, and FIG. 22 is a schematic diagram showing a screen display example of the imaging device 1.

Therefore, in the communication system S of the present embodiment, the automatic sending camera that transfers many images automatically to a mobile terminal can not only transfer images to the mobile terminal, but also automatically send to an album on a network and share, by making an album setting in advance. For example, it is convenient upon photographing pictures of today's one day exhibition, and reporting to coworkers, etc. In addition, by notifying the camera of album information, it is possible to confirm and select an album name in the camera main body. In addition, by simply switching albums on the camera side and photographing, it is possible to perform album sharing simply in the case of sharing albums with a plurality of themes.

MODIFIED EXAMPLE

In the operations of the aforementioned 1 to 3, although the service providing albums is singular, it is possible to select and set from a plurality of different services of business entities on the transfer app side. By configuring in this way, it is possible to choose and register an album from a plurality of services according to the modified example. Since it is possible to absorb the difference in services on the app side without being aware of the plurality of services on the camera side, it is possible to perform album sharing simply by different services.

The data processing system configured in the above way realizes a predetermined link function by the first apparatus including a function of acquiring data and the second apparatus including a function of managing data linking.

The first apparatus includes a data sending means for sending data to the second apparatus via the first wireless communication means.

The second apparatus includes: a storage means for storing a first program for executing data reception processing for receiving data from the first apparatus via the first wireless communication means, and a second program for executing data management processing for managing the data received by the data reception processing; a switching means for switching the first program and the second program to a stopped state and active state; and a control means for switching the second program from the stopped state to the active state in a case of receiving data by the data reception processing in a state in which the first program is active, as well as designating this received data as a management target and executing data management processing.

It is thereby possible to raise the convenience of data management with a data processing system.

The first apparatus includes an activation notification sending means that, in a case of having receiving an activation request for the second program from the first apparatus via the second wireless communication means, sends an activation notification of the second program to the second apparatus via the second wireless communication means, and the controls means of the second apparatus, in the case of not being able to directly activate the second program from the first program, sends an activation request of the second program to the first apparatus via the second wireless communication means, and switches the second program from the stopped state to the active state according to the activation notification sent from the first apparatus in response to this activation request.

The second wireless communication means is lower speed than the first wireless communication means, but is power saving, and the control means cannot launch the second program by the first wireless communication means, and is capable of launching the second program by the second wireless communication means.

The data management processing is processing that manages by dividing designated data into any of a plurality of groups.

The control means designates the received data as a group management target, and causes data management processing to be executed.

The second apparatus includes a group information sending means for sending group information related to a plurality of groups that can be managed by the data management processing to the first apparatus, and the control means of the second apparatus causes the data received from the first apparatus to be managed by dividing into the groups designated by the group selection information received from the first apparatus.

The first apparatus further includes a selection information sending means for selecting a predetermined group from among a plurality of groups included in the group information received from the second apparatus, and sending this group selection information to the second apparatus.

Every time the second apparatus stores group selection information sent from the first apparatus, and receives new data from the first apparatus, the second apparatus causes to manage by dividing into the groups designated by the group selection information being stored.

The second apparatus causes to manage by dividing the data received along with the group selection information from the first apparatus into the groups designated by this group selection information.

The first apparatus allows the user to select by list displaying a plurality of groups included in the group information received from the second apparatus, and sends the group selection information based on a user operation to the second apparatus.

The second apparatus includes a third communication means for communicating with a server providing a data sharing service over a network.

The data management processing designates the data received from the first apparatus as a sharing target, and sends to a server via the third communication means.

The data sharing service is a service allowing a plurality of data sets to be shared by classifying into a plurality of groups. The second apparatus designates a group designated by the group selection information, upon causing the received data to be shared by designating as a sharing target and sending to the server.

The first apparatus allows a user to select whether or not to share an acquired image, and sends sharing allowance information to the second apparatus along with group selection information.

The first apparatus allows the user to select whether or not to share an acquired image, and sends sharing allowance information to the second apparatus along with group selection information.

The second apparatus sends received data to the server in the case of sharing being enabled.

Services on a plurality of different networks providing a data sharing service are selected, and received data is sent to a server providing the selected service.

The first apparatus is an imaging device including a function of acquiring image data by photography.

The imaging device that is the first apparatus sends this image data by way of a data sending means in the case of new image data being acquired in a state in which the automatic sending mode is set.

The imaging device that is the first apparatus stores and updates group selection information, and displays a currently selected group on a live-view screen.

The second apparatus has a plurality of different types, and the control means changes the control of activation depending on the type.

The first wireless communication means is a constant connected state, and the second wireless communication means establishes a connection in response to a connection request via the first wireless communication means, and changes the connection establishing control according to the type.

Conventionally, technology that connects an imaging device such as a digital camera and a portable terminal such as a smartphone by way of wireless communication has been employed.

As an example of such technology, there is a photography system that remotely operates a camera by way of a camera operation terminal (e.g., refer to Japanese Unexamined Patent Application, Publication No. 2014-230024).

In addition, in the portable terminal, for example, it is possible to use various kinds of application software such as image sharing application software that shares images with other users by accessing an image sharing service on a network.

If using such technology, it is possible to manage image data and use an image sharing service by the user operating a portable terminal to enable photography to be performed by the camera by remote operation, and save image data sent from the camera in the portable terminal, then subsequently perform various operations along with launching the required application software.

In this case, the user will operate to launch different application software depending on the type (e.g., iOS, Android, etc.) of OS (operating software) of the portable terminal.

However, in the case of using the aforementioned such technology, in order to use employ an image sharing service using a camera and portable terminal, it is necessary for the user to perform an operation to launch the required application software, and perform various operations following the method of the launched application software. Not limited to a case of linking a camera and portable terminal, there is a similar problem in the case of perform various types of management on data acquired from linking between an apparatus providing data and an apparatus managing data.

The present embodiment has been made taking account of such a situation, and has an object of improving the convenience in the case of performing various types of management of data acquired by linking between an apparatus providing data and an apparatus managing data.

Third Embodiment

Pairing Connection Operation

Although an explanation has not been made for detailed portions in the aforementioned first and second embodiments, in the present embodiment, the processing related to the restrictions of BLE communication standard serving as the premise in the processing of the first and second embodiments will be explained. The processing explained in the present embodiment is executed when initiating the processing of FIGS. 9, 10, etc., and is executed in parallel to the processing of FIGS. 9, 10, etc.

In the communication system S of the present embodiment, upon connecting the imaging device and portable terminal by BLE, although a connection of Bluetooth (registered trademark) is established by outputting an advertising signal from the imaging device and the portable terminal detecting this signal and performing connection processing, the following such problems (Problems 1, 2, 3) arise when the contents of the advertising signal are the same state. In addition, when the information carried in the advertising signal increases, the data size of the signal becomes greater, and will be a drawback in terms of electrical power.
(Problem 1)

Since the pairing settings can be changed by a different portable terminal than the portable terminal having set pairing, there is a security problem (hijacking problem).

If a situation in which there is an imaging device and portable terminal for which pairing is set, and a BLE connection cannot be established due to the distance between the two being far, etc., the imaging device will output an advertising signal to attempt to connect with the portable terminal. At this time, if a pairing operation is performed at another portable terminal, the imaging device and portable terminal will be linked and partial operation thereof becomes possible.

In addition, if a state in which the power source of the imaging device is installed, the contents of the BLE signal (SSID and password of Wi-Fi) will be sent to a portable terminal C.
(Problem 2)

If there is a portable terminal for which pairing is set prior thereof, since this portable terminal will automatically execute the pairing processing when the pairing operation is made at the imaging device, it will not be possible to perform pairing processing at another portable terminal (portable terminal changing problem).

There is an imaging device and portable terminal for which pairing is set, and pairing release is performed by an operation on the imaging device. If attempting pairing of another portable terminal and the imaging device, when operating the imaging device, a portable terminal B will automatically connect with the imaging device. At this time, the portable terminal will not be able to continue the pairing processing.
(Problem 3)

Among imaging devices listed in the pairing processing of the portable terminal app, those for which pairing is possible and those not as such coexist (list sorting).

Address such a problem, the following such countermeasures are employed by the communication system S of the present embodiment.

According to the connection state (pairing yes/no) of the imaging device 1 connecting with the portable terminal 2, the device name is made to change, and then processing is conducted at the smartphone by utilizing this change. In other words, depending on the BLE connection information (pairing yes/no) that is the pairing information of the imaging device 1, a difference is imparted by adding a space character to the device name of the advertising signal, and the connection control by the app of the portable device 2 is changed according to this difference.

More specifically, the communication system S causes the device name placed in the data of the advertising signal to change according to the state of pairing of the imaging device 1, and diverges the processing of the app of the portable terminal 2 according to the device name. It should be noted that being able to do pairing is premised on being one-to-one by the imaging device 1 and portable terminal 2. In addition, the portable terminal 2 identifies the imaging device 1 that is the pairing partner not by the device name, but rather by the BD address.

<State in which Imaging Device 1 is not Pairing>

The device name is made without spaces at the end in the SSID of Wi-Fi.

Example: "ZR1600-01ACDC" (device name+no space)

No automatic reconnecting even by pairing (avoiding "Problem 2")

(For this reason, does not connect if not through a pairing operation.)

<State of Imaging Device 1 Pairing>

Device name is made adding a space at the end of the device name. Example: "ZR1600-01ACDC " (device name+ space)

No connecting with a smartphone not pairing (avoiding "Problem 1") (Connects only with a pairing portable terminal 2)

No displaying in a list of candidates for which pairing is possible (avoiding "Problem 3").

(Displays Only Devices not Pairing)

Figure 23:
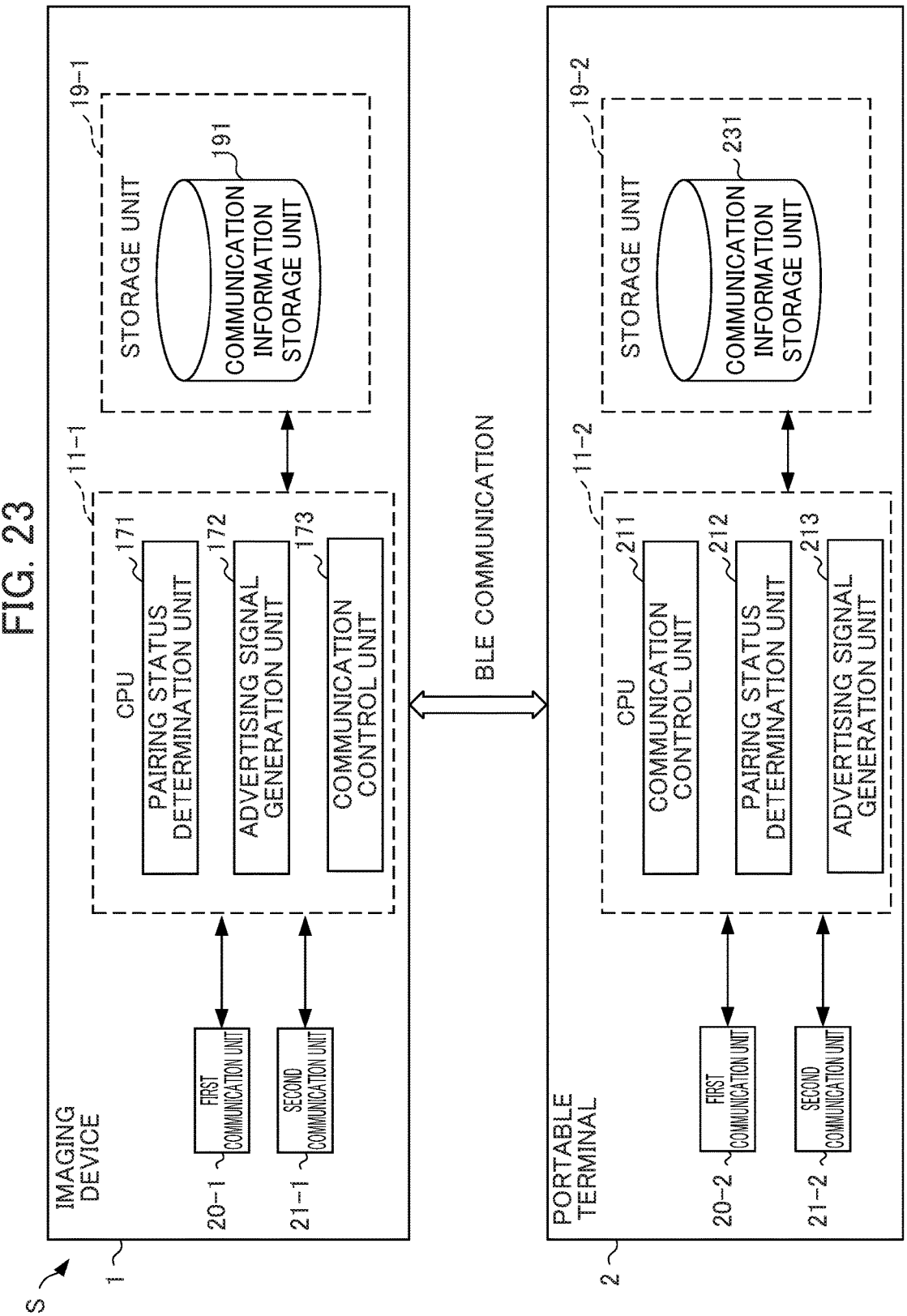
FIG. 23 is a functional block diagram showing a functional configuration for executing pairing connection processing, among the functional configurations of the imaging device and portable terminal of FIG. 3.

FIG. 23 is a functional block diagram showing a functional configuration for executing pairing connection processing, among the functional configurations of the imaging device 1 and portable terminal 2 in FIG. 3.

Pairing connection processing refers to a series of processing for performing connection by performing pairing in the BLE communication standard between the imaging device 1 and portable terminal 2.

In the case of performing the pairing connection processing at the imaging device 1, as shown in FIG. 23, a pairing status determination unit 171, advertising signal generation unit 172 and communication control unit 173 function in the CPU 11-1.

In addition, a communication information storage section 191 is established in an area of the storage unit 19-1.

Pairing information obtained as a result of pairing processing (information generated based on the SSID that is the identifier of the access point in wireless LAN (Wi-Fi) in the present embodiment) and connection information obtained as a result of connection processing (BD address in the present embodiment) are stored in the communication information storage section 191. The pairing information is the device name in the advertising information used in the pairing processing, etc., and the BD address used upon connection after pairing processing ends.

The pairing status determination unit 171 determines the pairing status by referencing the pairing information stored in the communication information storage section 191 (referencing presence of pairing information). The pairing status determination unit 171 determines as a status not performing pairing (hereinafter referred to as "unpaired status") in the case of there being no pairing information, and determines as a status performing pairing (hereinafter referred to as "paired status") in a case of there being pairing information.

The advertising signal generation unit 172 generates an advertising signal based on the determination results by the pairing status determination unit 171.

Upon the generation of the advertising signal, the advertising signal generation unit 172 changes information added to the advertising signal (hereinafter referred to as "advertising information") according to whether the determination result of the pairing status determination unit 171 is the unpaired status or the paired status.

The advertising signal generation unit 172 generates an "advertising signal of unpaired resource" setting the advertising information as "device name+no space (only device name)" in the case of being the unpaired status, and generates an "advertising signal of paired resource" setting the advertising information as "device name+space" in the case of being the paired status.

The communication control unit 173 controls the first communication unit 20-1. More specifically, the communication control unit 173 controls the first communication unit 20-1 so as to send the advertising signal and execute the pairing processing or connection processing. It should be noted that, as a result of the pairing processing and connection processing, the acquired pairing information and BD address are stored in the communication information storage section 191.

In the case of executing the pairing connection processing in the portable terminal 2, as shown in FIG. 23, the communication control unit 211, pairing status determination unit 212 and advertising signal determination unit 213 function in the CPU 11-2.

In addition, a communication information storage section 231 is established in an area of the storage unit 19-2.

Pairing information obtained upon pairing is stored in the communication information storage section 231. The pairing information is the device name in the advertising signal used in pairing processing, etc., and the BD address used during connection after pairing processing ends.

The communication control unit 211 controls the first communication unit 20-2. More specifically, the communication control unit 211 controls the first communication unit 20-2 so as to detect advertising signals, and execute pairing processing and connection processing.

The pairing status determination unit 212 determines the status of pairing by referencing the pairing information stored in the communication information storage section 231 (referencing presence of pairing information). The pairing status determination unit 212 determines as a status not performing pairing (hereinafter referred to as "unpaired status") in the case of there being no pairing information, and determines as a status performing pairing (hereinafter referred to as "paired status") in the case of there being pairing information.

The advertising signal determination unit 213 determines whether the advertising information of the detected advertising signal is an advertising signal of unpaired resource or the advertising signal of a paired resource. More specifically, the advertising signal determination unit 213 determines as an advertising signal of an unpaired resource in the case of the advertising information being the device name+no space (only device name), and determines as an advertising signal of a paired resource in the case of the advertising information being the device name+space.

Figure 24:
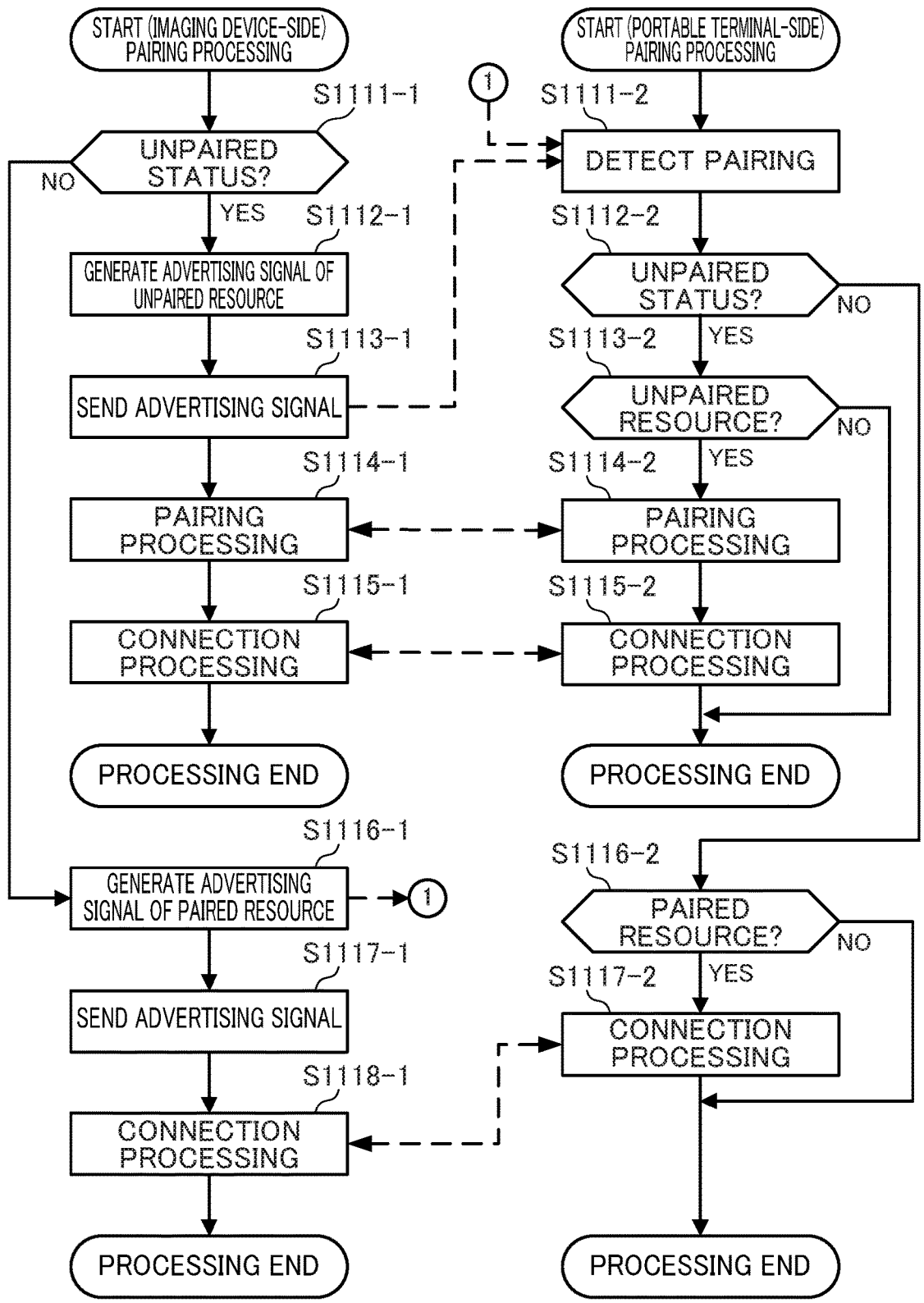
FIG. 24 is a flowchart illustrating the flow of pairing connection processing executed by the imaging device and portable terminal of FIG. 3 having the functional configuration of FIG. 29.

FIG. 24 is a flowchart illustrating the flow of pairing connection processing executed by the imaging device 1 and portable terminal 2 in FIG. 3 having the functional configuration of FIG. 23.

<(Imaging Device-Side) Pairing Connection Processing>

The pairing connection processing on the imaging device 1 side is initiated by an operation of pairing connection processing start on the input unit 17-1 by a user.

In Step S1111-1, the pairing status determination unit 171 determines whether or not being an unpaired status.

In the case of being the unpaired status, it is determined as YES in Step S1111-1, and the processing advances to Step S1112-1.

In Step S1112-1, the advertising signal generation unit 172 generates the advertising signal of an unpaired resource. More specifically, the advertising signal generation unit 172 generates an advertising signal of an unpaired resource to which information without a space in the device name is attached.

In Step S1113-1, the communication control unit 173 controls the first communication unit 20-1 so as to send the generated advertising signal of an unpaired resource.

In Step S1114-1, the communication control unit 173 controls the first communication unit 20-1 so as to execute pairing processing with the portable terminal 2.

In Step S1115-1, the communication control unit 173 controls the first communication unit 20-1 so as to execute connection processing based on the connection setting performed by the pairing processing. Subsequently, the processing ends.

In contrast, in a case of not being the unpaired status, but rather being a paired status making pairing, it is determined as NO in Step S1111-1, the processing advances to Step S1116-1.

In Step S1116-1, the advertising signal generation unit 172 generates an advertising signal of a paired resource. More specifically, the advertising signal generation unit 172 generates an advertising signal of a paired resource to which information in which there is a space in the device name is attached.

In Step S1117-1, the communication control unit 173 controls the first communication unit 20-1 so as to send the generated advertising signal of a paired resource.

In Step S1118-1, the first communication unit 20-1 is controlled so as to execute connection processing based on the connection setting performed by pairing processing. Subsequently, the processing ends.

<(Portable Terminal-side) Pairing Connection Processing>

The pairing connection processing on the portable terminal 2 side is initiated by an operation of pairing connection processing start on the input unit 17-2 by a user.

In Step S1111-2, the communication control unit 211 controls the first communication unit 20-1 so as to detect an advertising signal. As a result thereof, the first communication unit 20-1 detects the advertising signal sent from the imaging device 1.

In Step S1112-2, the pairing status determination unit 212 determines whether being an unpaired status.

In the case of being the unpaired status, it is determined as YES in Step S1112-2, and the processing advances to Step S1113-2.

In Step S1113-2, the advertising signal determination unit 213 determines whether being the advertising signal of an unpaired resource.

In the case of being the advertising signal not of an unpaired resource, but rather paired, it is determined as NO in Step S1113-2, and the pairing connection processing ends.

In the case of being the advertising signal of an unpaired resource, it is determined as YES in Step S1113-2, and the processing advances to Step S1114-2.

In Step S1114-2, the communication control unit 211 controls the communication unit so as to execute pairing processing with the imaging device 1.

In Step S1115-2, the communication control unit 211 controls the communication unit so as to execute connection processing based on the connection setting performed by the pairing processing. Subsequently, the pairing connection processing ends.

In contrast, in the case of the status not being unpaired, but rather paired, it is determined as NO in Step S1112-2, and the processing advances to Step S1116-2.

In Step S1116-2, the advertising signal determination unit 213 determines whether being an advertising signal of a paired resource.

In the case of being an advertising signal of not a paired resource, but rather an unpaired resource, it is determined as NO in Step S1116-2, and the pairing connection processing ends.

In the case of being the advertising signal of a paired resource, it is determined as YES in Step S1116-2, and the processing advances to Step S1117-2.

In Step S1117-2, the communication control unit 211 controls the communication unit so as to execute connection processing based on the connection setting performed by the pairing processing. Subsequently, the pairing connection processing ends.

MODIFIED EXAMPLE

Specialized to the specifications of a predetermined OS (Operating System) (directed to iOS in the present embodiment) for strengthening the avoidance of "Problem 1", it is possible to configure so as to provide a characteristic of the device name, temporarily connect by BLE and acquire this, and then judge similarly to the connection allowance judgement according to the device name in the above-mentioned advertising data to decide whether to maintain a connection or disconnect.

Figure 25:
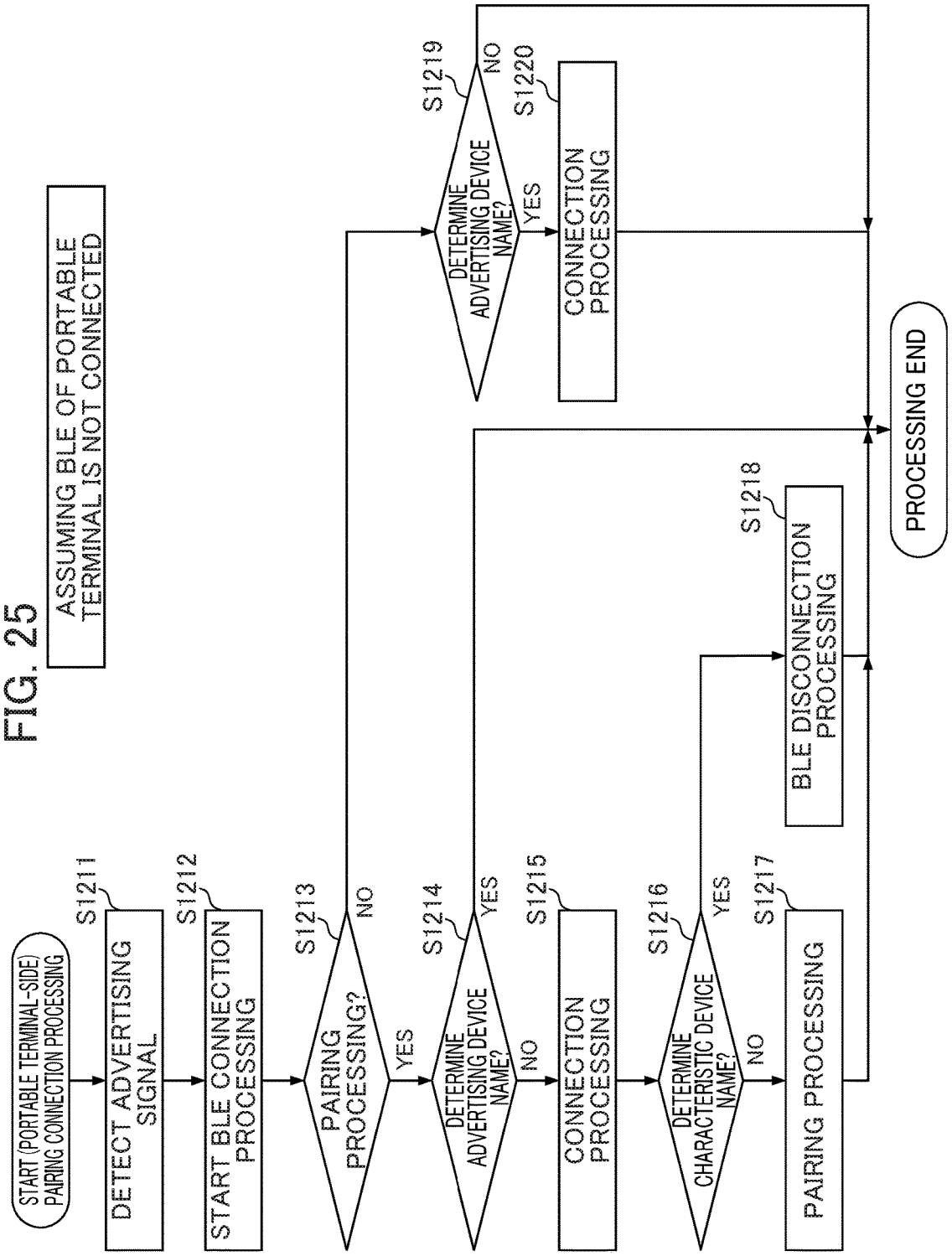
FIG. 25 is a flowchart illustrating another flow of pairing connection processing executed by the portable terminal having the functional configuration of FIG. 29.

In addition, if adding a function of the present modified example to the aforementioned flowchart, it is possible to treat as FIG. 25. It should be noted that FIG. 25 is a flowchart illustrating another flow of pairing connection processing executed by the portable terminal 2 of FIG. 3 having the functional configuration of FIG. 23.

<Portable Terminal-Side Pairing Connection Processing>

The pairing connection processing on the portable terminal 2 side is initiated by an operation of pairing connection processing start on the input unit 17-2 by a user. It should be noted that BLE of the portable terminal 2 is not connected during processing start as a premise.

In Step S1211, the communication control unit 211 controls the first communication unit 20-2 so as to detect an advertising signal. As a result thereof, the first communication unit 20-2 detects the advertising signal sent from the imaging device 1.

In Step S1212, the communication control unit 211 controls the first communication unit 20-2 so as to initiate BLE connection processing and perform BLE connection with the imaging device 1.

In Step S1213, the pairing status determination unit 212 determines whether having done pairing processing.

In the case of having done pairing processing, it is determined as YES in Step S1213, and the processing advances to Step S1214.

In contrast, in the case of not having done pairing processing, it is determined as NO in Step S1213, and the processing advances to Step S1219.

In Step S1214, the advertising signal determination unit 213 determines whether having judged the advertising device name.

In the case of having judged the advertising device name, it is determined as YES in Step S1214, and the portable terminal 2-side pairing connection processing ends.

In contrast, in the case of not having judged the advertising device name, it is determined as NO in Step S1214, and the processing advances to Step S1215.

In Step S1215, the communication control unit 211 controls the first communication unit 20-2 so as to execute connection processing.

In Step S1216, the advertising signal determination unit 213 determines whether having judged the characteristic device name.

In the case of having judged the characteristic device name, it is determined as YES in Step S1216, and the processing advances to Step S1218.

In contrast, in the case of not having judged the characteristic device name, it is determined as NO in Step S1216, and the processing advances to Step S1217.

In Step S1217, the communication control unit 211 controls the first communication unit 20-2 so as to execute pairing processing. Subsequently, the pairing connection processing on the portable terminal 2 side ends.

In Step S1218, the communication control unit 211 controls the first communication unit 20-2 so as to execute BLE disconnect processing. Subsequently, the pairing connection processing on the portable terminal 2 side ends.

In Step S1219, the advertising signal determination unit 213 determines whether having judged the advertising device name.

In the case of having judged the advertising device name, it is determined as YES in Step S1219, and the processing advances to Step S1220.

In contrast, in the case of not having judged the advertising device name, it is determined as NO in Step S1219, and the pairing connection processing on the portable terminal 2 side ends.

In Step S1220, the communication control unit 211 controls the first communication unit 20-2 so as to execute connection processing. Subsequently, the pairing connection processing on the portable terminal 2 side ends.

<Background Process Processing of Automatic Sending>

In the communication system S of the present embodiment, there are time limitations in the background operations by the app of the portable terminal 2 (smartphone), and thus has a function of sending an image transmission within the time.

In a conventional imaging device, between the imaging device (camera) and a mobile terminal such as a smartphone, a function is built in for sending a captured image automatically to the terminal side after photographing with a camera.

In order to send by simply an operation on the camera without operating the smartphone, an arrangement is implemented whereby an app is launched as a background process by sending a launch notification using Bluetooth, whereby the smartphone receives images even in a sleep state.

Since there is a time limit in the background operations in iOS, it may not be possible to send all of the data in this case.

Figure 26:
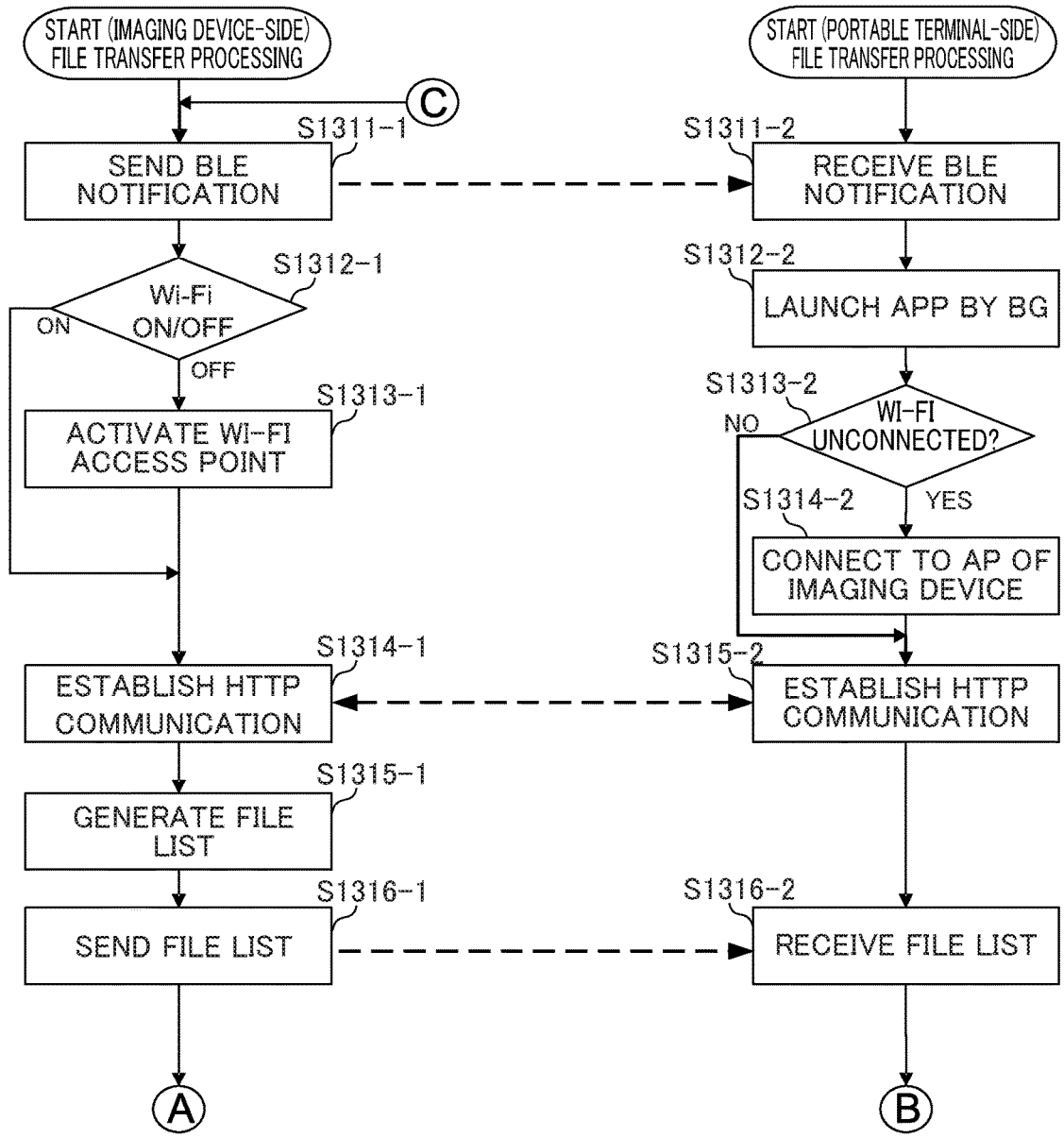
FIG. 26 is a flowchart illustrating background process processing of automatic sending.
Figure 27:
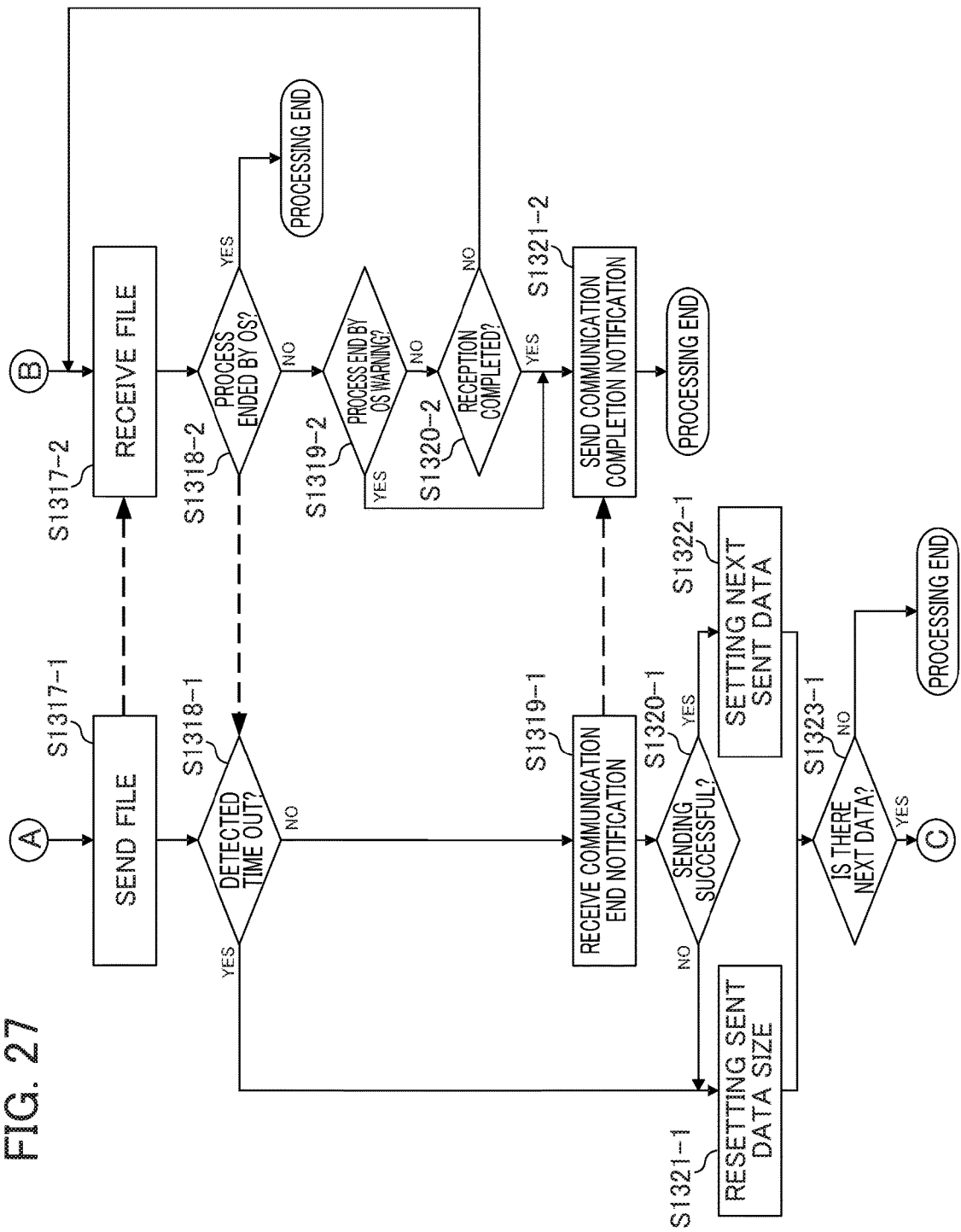
FIG. 27 is a flowchart illustrating background process processing of automatic sending.

Therefore, the communication system S of the present embodiment makes the operations such as those shown in FIGS. 26 and 27. It should be noted that FIGS. 26 and 27 are flowcharts illustrating the background process processing of automatic sending.

1. Performs process activation notification by BLE from the camera to smartphone.

2. Launch app for image reception on smartphone in background.

3. Start Wi-Fi access point of camera, and connect by Wi-Fi with smartphone.

4. Send list of files to send from camera to app.

5. App acquires files of file list from camera.

6A-1. In a case of data transfer finishing within time, report success to camera, end background process, and return smartphone to sleep state.

6A-2. Camera performs process start notification by BLE again in order to send next file list.

6B-1. In case of data transfer not seeming to finish within time, report failure to camera, end background process, and return smartphone to sleep state.

6B-2. Camera performs process activation notification by BLE again in order to send unsent file list.

6C-1. In the case of the background process ending without prior notice, the app cannot do anything.

6C-2. The camera detects communication disconnect, and performs process activation notification by BLE again in order to send the unsent file list.

It should be noted that a case of failure in sending retries by changing the packet size of sent data.

<(Imaging Device-Side) File Transfer Processing>

File transfer processing on the imaging device 1 side is initiated by an operation of (imaging device-side) file transfer processing start on the input unit 17-1 by a user.

In Step S1311-1, the communication control unit 173 controls the first communication unit 20-1 so as to send a notification.

In Step S1312-1, the communication control unit 173 determines the ON/OFF state of Wi-Fi.

In the case of Wi-Fi being ON, it is determined as YES in Step S1312-1, and the processing advances to Step S1314-1.

In contrast, in the case of Wi-Fi being OFF, it is determined as NO in Step S1312-1, and the processing advances to Step S1313-1.

In Step S1313-1, the communication control unit 173 controls the second communication unit 21-1 so as to activate the Wi-Fi access point.

In Step S1314-1, the communication control unit 173 controls the second communication unit 21-1 so as to establish HTTP communication.

In Step S1315-1, the communication control unit 173 creates a file list.

In Step S1316-1, the communication control unit 173 sends the file list.

In Step S1317-1, the communication control unit 173 sends the file.

In Step S1318-1, the communication control unit 173 controls the second communication unit 21-1 so as to determine whether to have detected timeout at the portable terminal 2.

In the case of having detected timeout at the portable terminal 2, it is determined as YES in Step S1318-1, and the processing advances to Step S1321-1.

In contrast, in the case of not having detected timeout of the portable terminal 2, it is determined as NO in Step S1318-1, and the processing advances to Step S1319-1.

In Step S1319-1, the communication control unit 173 controls the second communication unit 21-1 so as to receive a communication complete notification.

In Step S1320-1, the communication control unit 173 determines whether sending was successful.

In the case of sending having been successful, it is determined as YES in Step S1320-1, and the processing advances to Step S1322-1.

In contrast, in the case of sending not being successful, it is determined as NO in Step S1320-1, and the processing advances to Step S1321-1.

In Step S1321-1, the communication control unit 173 controls the second communication unit 21-1 so as to reset the sent data size.

In Step S1322-1, the communication control unit 173 controls the second communication unit 21-1 so as to set the next sent data.

In Step S1323-1, the communication control unit 173 controls the second communication unit 21-1 so as to determine whether there is subsequent data.

In the case of there being subsequent data, it is determined as YES in Step S1323-1, and the processing returns to Step S1221.

In contrast, in the case of there not being subsequent data, it is determined as NO in Step S1323-1, and the file transfer processing on the imaging device 1 side ends.

<(Portable Terminal-Side) File Transfer Processing>

The file transfer processing on the portable terminal 2 side is initiated by a portable terminal 2-side operation of file transfer processing start on the input unit 17-2 by a user.

In Step S1311-2, the communication control unit 211 controls the first communication unit 20-2 so as to receive a BLE notification.

In Step S1312-2, the CPU 11 launches an application in the background (BG).

In Step S1313-2, the communication control unit 211 determines whether being unconnected with Wi-Fi.

In the case of being unconnected with Wi-Fi, it is determined as YES in Step S1313-2, and the processing advances to Step S1314-2.

In contrast, in the case of not being unconnected with Wi-Fi, it is determined as NO in Step S1313-2, and the processing advances to Step S1315-2.

In Step S1314-2, the communication control unit 211 controls the second communication unit 21-2 so as to connect to the AP of the imaging device 1.

In Step S1315-2, the communication control unit 211 controls the second communication unit 21-2 so as to establish HTTP communication.

In Step S1316-2, the communication control unit 211 controls the second communication unit 21-2 so as to receive a file list.

In Step S1317-2, the communication control unit 211 controls the second communication unit 21-2 so as to receive a file.

In Step S1318-2, the CPU 11 determines whether a process by the OS has ended.

In the case of the process by the OS having ended, it is determined as YES in Step S1318-2, and the file transfer processing on the portable terminal 2 side ends.

In contrast, in the case of the process by the OS not having ended, it is determined as NO in Step S1318-2, and the processing advances to Step S1319-2.

In Step S1319-2, the CPU 11 determines whether or not having made an end report of the process by the OS.

In the case of having made an end report of the process by the OS, it is determined as YES in Step S1319-2, and the processing advances to Step S1321-2.

In contrast, in the case of not having made an end report of the process by the OS, it is determined as NO in Step S1319-2, and the processing advances to Step S1320-2.

In Step S1320-2, the communication control unit 211 determines whether reception of a file has completed.

In the case of the reception of a file having completed, it is determined as YES in Step S1320-2, and the processing advances to Step S1321-2.

In contrast, in the case of reception of the file not having completed, it is determined as NO in Step S1320-2, and the processing returns to Step S1317-2.

In Step S1321-2, the communication control unit 211 controls the second communication unit 21-2 so as to send a communication complete notification. Subsequently, the file transfer processing on the portable terminal 2 side ends.

Therefore, in the communication system S of the present embodiment, due to starting from notification of Bluetooth for all of the sending process divided into a plurality of times, it is possible to send many pieces of data by a communication function with a time limit. In addition, it becomes easy to resend from data that could not be sent in a process having an unclear end timing.

<BLE Connection Parameter Adaptive Setting Processing>

The communication system S of the present embodiment has a function that adaptively sets the connection parameter of BLE during camera power ON and during OFF to achieve both connection stability and electric power savings.

Conventionally, although the data transfer rate increases with a shorter time for the connection interval of the BLE connection parameter, the power dissipation increases. Although the time until determining that BLE disconnected and performing reconnection processing is shorter and the actually communicable time actually becomes shorter as the time of connection monitoring timeout shortens, disconnecting can be easily seen by the user.

Figure 28:
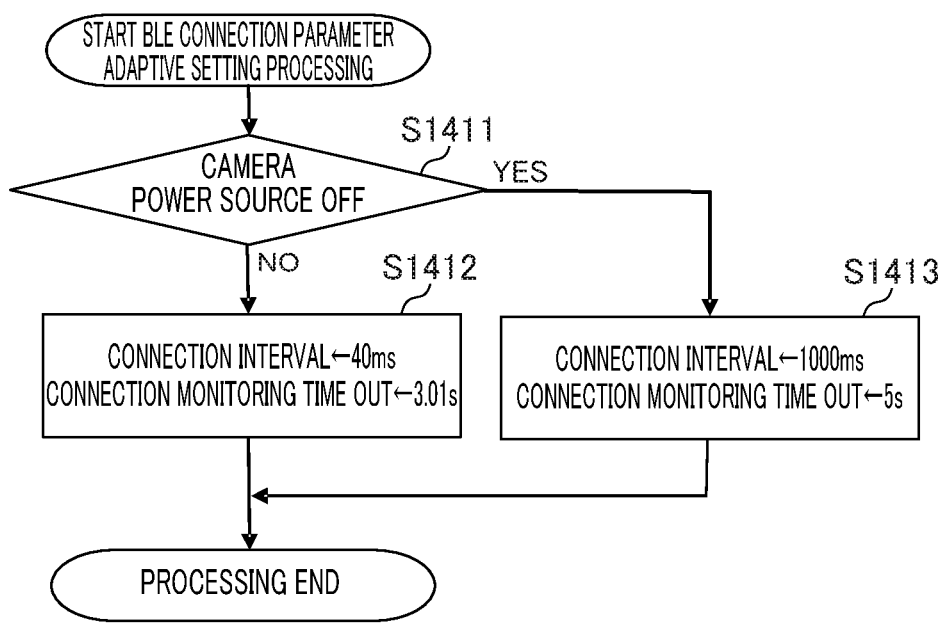
FIG. 28 is a flowchart illustrating BLE-connection parameter adaptive setting processing.

Therefore, the communication system S of the present embodiment performs operations such as those shown in FIG. 28.

It should be noted that FIG. 28 is a flowchart illustrating the BLE connection parameter adaptive setting processing.

Change BLE connection parameter adaptively to during camera power source ON and during OFF.

During camera power source ON shortens the connection interval and the time of connection monitoring timeout.

During camera power source OFF lengthens the connection interval and time of connection monitoring timeout. In other words, by diverging at whether during camera power source ON and during OFF, the BLE connection parameter setting is changed.

In other words, the BLE connection parameter adaptive setting processing is initiated by an operation of BLE connection parameter adaptive setting processing start on the input unit 17-1 by a user.

In Step S1411, the CPU 11 determines whether the camera power source was turned OFF.

In the case of the camera power source being turned OFF, it is determined as YES in step S1411, and the processing advances to Step S1413.

In contrast, in the case of the camera power source not having been turned OFF, it is determined as NO in Step S1411, and the processing advances to Step S1412.

In Step S1412, the communication control unit 173 changes the settings to "connection interval <−40 ms" and "connection monitoring timeout <−3.01 s". Subsequently, the BLE connection parameter adaptive setting processing ends.

In Step S1413, the communication control unit 173 changes the settings to "connection interval <−1000 ms" and "connection monitoring timeout <−5 s". Subsequently, the BLE connection parameter adaptive setting processing ends.

The communication system S of the present embodiment exerts the following such effects.

During camera power source ON, the data transfer rate is higher and the time in which communication is not possible is shorter.

During camera power source OFF, it operates in power savings, and does not recognize disconnect even if some communication is interrupted.

(Since data transfer cannot occur during camera power source OFF, a problem does not arise even if the transfer rate is low.)

<Wi-Fi Setting Control Processing on Imaging Device-Side>

With the communication system S of the present embodiment, when making pairing of a camera and smartphone, Wi-Fi connection is facilitated, and since connection is no longer possible if the Wi-Fi setting is changed from this state, it has a function of putting a restriction on the change function for Wi-Fi settings by whether there is pairing or no pairing on the camera side. In addition, it has a function of adjusting so that operations are different according to whether or not there is pairing.

Conventionally, between a camera and a mobile terminal such as a smartphone, a function is built in for automatically sending captured images to the terminal side after photographing by the camera.

In order to automatically send, the camera and smartphone are paired by BLE, and the Wi-Fi settings of the camera are sent to the smartphone via BT. The smartphone connects to the Wi-Fi access point of the camera based on the information at this time.

However, the SSID and password of the access point can easily change since they are only values of settings, and if changed, the camera and smartphone will no longer be able to connect by Wi-Fi.

Figure 29:
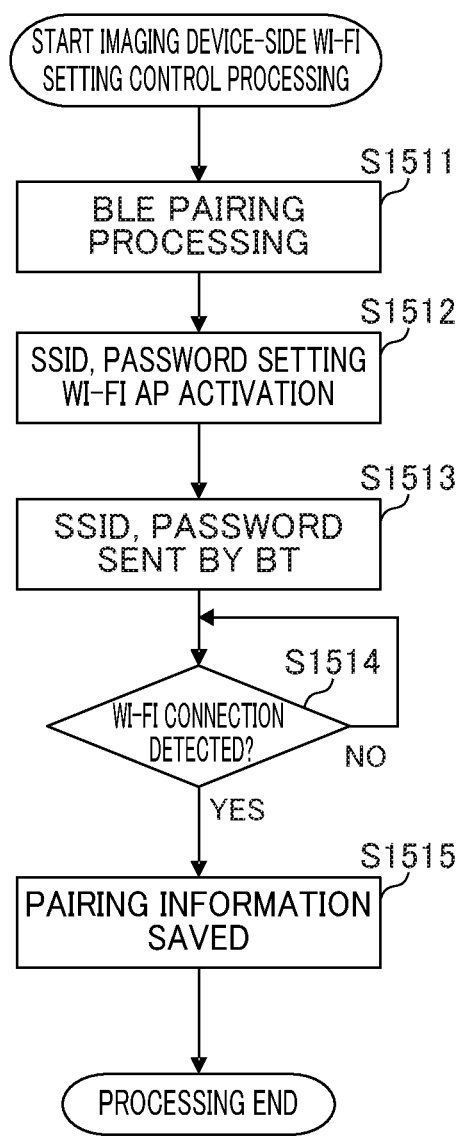
FIG. 29 is a flowchart illustrating Wi-Fi setting control processing.

Therefore, the communication system S of the present embodiment performs operations such as those shown in FIG. 29. It should be noted that FIG. 29 is a flowchart illustrating the Wi-Fi setting control processing on the imaging device 1 side.

The camera places the SSID and password of Wi-Fi access point of the camera during BLE pairing in BT communication, and sends to the smartphone.

The smartphone adds the received SSID and password to its own Wi-Fi settings.

The camera records information of pair establishment, subsequently masks a change menu for the Wi-Fi password, to make it unexecutable to the user.

In other words, the communication system S of the present embodiment switches allowed/unallowed for Wi-Fi password change according to the presence of pairing.

More specifically, the Wi-Fi setting control processing on the imaging device 1 side is initiated by an operation of Wi-Fi setting control processing start on the input unit 17-1 by a user.

In Step S1511, the communication control unit 173 controls the first communication unit 20-1 so as to execute BLE pairing processing.

In Step S1512, the communication control unit 173 controls the second communication unit 21-1 so as to set the SSID and password, and activate the Wi-Fi AP.

In Step S1513, the communication control unit 173 controls the first communication unit 20-1 so as to send the SSID and password by BLE.

In Step S1514, the communication control unit 173 controls the second communication unit 21-1 so as to determine whether having detected a Wi-Fi connection.

In the case of having detected a Wi-Fi connection, it is determined as YES in Step S1514, and the processing advances to Step S1515.

In contrast, in the case of not having detected a Wi-Fi connection, it is determined as NO in Step S1514, and the processing enters a standby state in Step S1514.

In Step S1515, the communication control unit 173 saves the pairing information. Subsequently, the Wi-Fi setting control processing on the imaging device 1 side ends.

Figure 30:
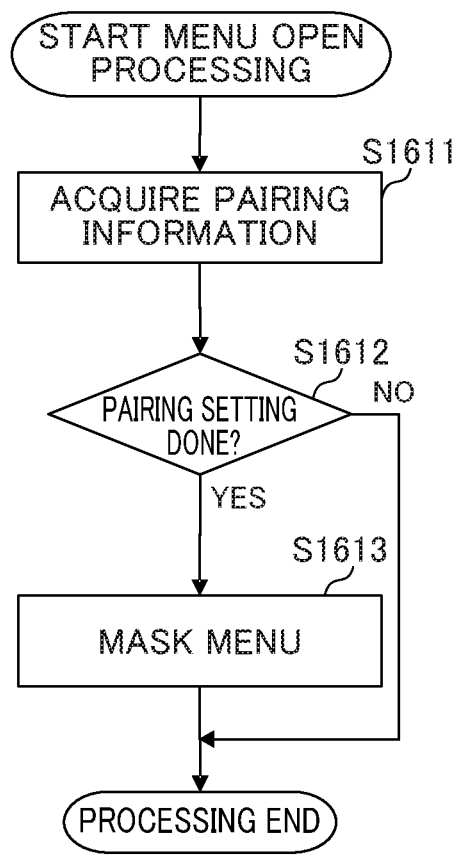
FIG. 30 is a flowchart illustrating Menu open processing.

FIG. 30 is a flowchart illustrating Menu open processing.

Menu open processing start is initiated by an operation of Menu open processing start on the input unit 17-1 by a user.

In Step S1611, the communication control unit 173 acquires pairing information.

In Step S1612, the communication control unit 173 determines whether pair setting has been done.

In the case of pair setting being done, it is determined as YES in Step S1612, and the processing advances to Step S1613.

In contrast, in the case of pair setting not being done, it is determined as NO in Step S1612, the Menu open processing start ends.

In Step S1613, the CPU 11 masks the menu. Subsequently, menu open processing start ends.

Therefore, the communication system S of the present embodiment can prevent automatic sending not being performed due to a setting change on the camera side, and other communication functions no longer being usable.

It should be noted that a function for switching the operations according to the presence of a pair other than the Wi-Fi password is as follows.

Automatic image sending
With pair: executable
Without pair: not executable (setting to ON also not allowed)
Manual image sending
With pair: all executable
Without pair: sending with app in background not allowed <Mode Judgment Processing of Camera Activation by BLE Communication>

The communication system S of the present embodiment, in the case of the camera being active for the main cause of BLE, has a function of suppressing wasteful processing of the camera by judging the mode activating while confirming the BLE communication state, without suddenly normally activating, and turning power source OFF as necessary. In other words, the communication system S of the present embodiment has a function of making so that the camera only transitions to normal operation by an intended operation such as a case of performing camera activation from a smartphone, so that wasteful activation processing is not performed.

Conventionally, it is made possible to wait for BLE connection also in a state turning the power source of the camera OFF, by way of an HW configuration. In addition, when in a camera power source OFF state while BLE is live, various events of BLE are notified by HW of BLE, and with this as the main factor, it has been possible to turn the camera power source ON. However, as the main factor for a case of activating by BLE, since it is possible to activate by various factors such as disconnection of BLE, connection, and BLE Read/Write request from a smartphone, it will perform excessive processing if normally starting up the power source of the camera by simply all of the factors, which becomes a drawback in terms of electric power. In addition, upon the camera activating BLE, it is difficult to leave behind the information of by which BLE event it was activated. (Since the camera is powered OFF, the contents of BLE connection are not left behind such as in the RAM.)

Figure 31:
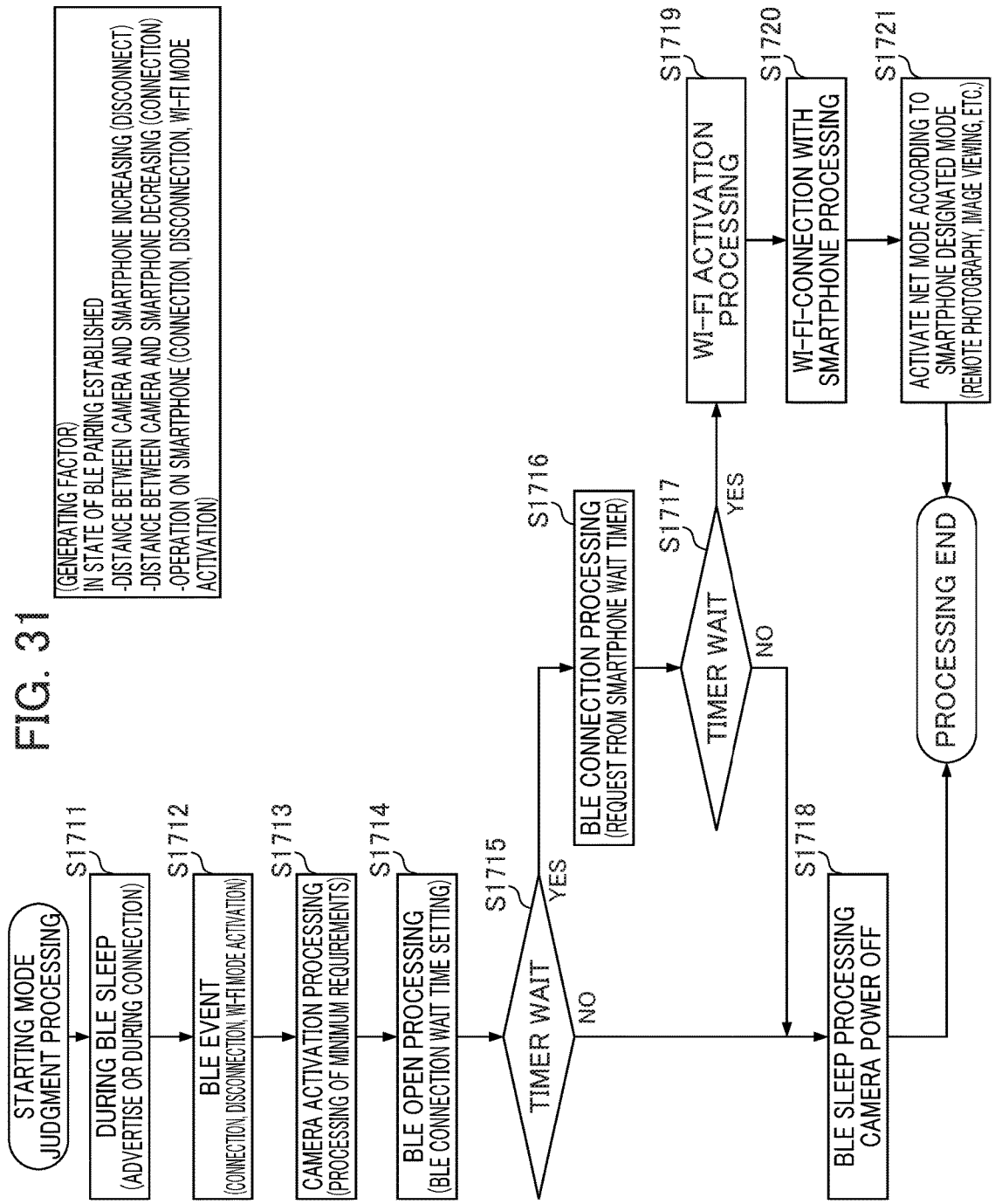
FIG. 31 is a flowchart illustrating mode judgment processing for camera activation according to BLE communication.

Therefore, the communication system S of the present embodiment performs operations such as those shown in FIG. 31. It should be noted that FIG. 31 is a flowchart illustrating mode judgment processing of camera activation by BLE communication. It should be noted that, as a "prerequisite", in the case of BLE of the camera being a state of advertise or during connection, processing becomes necessary to set the BLE module to sleep, turn off the power source of the camera, and turn off the power source while maintaining output of BLE.

1) Camera is activated by a certain BLE event.
   By simply the camera being started by the factor of BLE at this time can be understood as the activation factor.
2) Camera performs dedicated activation as BLE active standby state (only LED illuminated).
   BLE reactivated to enter state of advertising, and timer started (5 seconds).
   It should be noted that a case of no BLE connection within the timer (5 seconds) is judged as a BLE disconnect event.
   In this state, BLE Sleep is set, and the camera is powered off.
   ->PowerOff (1)
3) A case of there being a BLE connection within the time of the timer releases the timer and moves to the next processing.
   After BLE connection processing completes, the timer is started again (5 seconds).
   It should be noted that a case of no Wi-Fi connection request by a BLE signal within the timer (5 seconds) sets to Sleep while in this state, and the camera is powered off.
4) A case of a BLE signal being notified within the timer time is judged as intentionally being activated from a smartphone, and the camera is activated in Wi-Fi mode.

In other words, the mode judgment processing is initiated by an operation of mode judgment processing start on the input unit 17-1 by a user.

In Step S1711, the communication control unit 173 controls the first communication unit 20-1 so as to enter Sleep of BLE (advertise or during connection).

In Step S1712, the communication control unit 173 controls the first communication unit 20-1 so as to generate a BLE event (connection/disconnection/Wi-Fi mode activation).

In Step S1713, the CPU 11 performs camera activation processing (minimum necessary processing).

In Step S1714, the communication control unit 173 controls the first communication unit 20-1 so as to perform BLE open processing (BLE connection wait timer setting).

In Step S1715, the communication control unit 173 determines whether being in timer wait.

In the case of being in timer wait, it is determined as YES in Step S1715, and the processing advances to Step S1716.

In contrast, in the case of not being in timer wait, it is determined as NO in Step S1715, and the processing advances to Step S1718.

In Step S1716, the communication control unit 173 control so as to perform BLE connection processing (request wait timer from portable terminal 2) In Step S1717, the communication control unit 173 determines whether being timer wait.

In the case of being timer wait, it is determined as YES in Step S1717, and the processing advances to Step S1719.

In contrast, in the case of not being timer wait, it is determined as NO in Step S1717, and the processing advances to Step S1718.

In Step S1718, the CPU 11 performs BLE Sleep processing and turns OFF camera power. Subsequently, mode judgment processing ends.

In Step S1719, the communication control unit 173 controls the second communication unit 21-1 so as to execute Wi-Fi activation processing.

In Step S1720, the communication control unit 173 controls the second communication unit 21-1 so as to execute Wi-Fi connection processing with the portable terminal 2.

In Step S1721, the CPU 11 performs controls to activate NET mode according to the portable terminal instruction mode (remote photography/viewing pictures/etc.). Subsequently, the mode judgment processing ends.

Therefore, the communication system S of the present embodiment makes it possible to curb the battery consumption of camera processing according to a BLE event as much as possible, by performing only the minimum requirement processing in the case of the camera being awaken by a BLE event.

MODIFIED EXAMPLE

In the case of judging as the activation by BLE disconnect, processing such that becomes more power saving may be introduced by changing the settings such as of lengthening the interval of advertising.

The communication system S configured in the above way includes the following such configurations.

A wireless communication system that performs predetermined linked processing by a plurality of apparatuses having different roles performing wireless communication includes a pairing means for designating a combination of a plurality of apparatuses serving as the targets of predetermined linked processing based on a user operation, and executing pairing processing to cause pairing information indicating this combination to be stored in mutual apparatuses.

The first apparatus includes: an advertising signal delivery means for delivering an advertising signal that is a signal notifying another apparatus by way of wireless communication of its own existence and its own provided functions; and an advertising signal control means for changing its own identifier included in the advertising signal according to pairing information stored by the pairing means.

The second apparatus includes: a connection means for detecting an advertising signal delivered by the advertising signal delivery means, and in the case of being delivery from an apparatus providing a function related to predetermined linked processing, establishing a communication connect with this apparatus; and a connection control means for controlling whether to establish a communication connection with an apparatus for which the advertising signal was detected, based on the pairing information stored by the pairing means and a change state of an identifier included in the advertising signal.

The communication system can thereby configure so as to prevent unintended apparatuses from mistakenly being connected in the case of communication connecting a plurality of apparatuses using wireless communication, and thus can perform appropriate communication connection.

The first apparatus is an imaging device having an image capture function, and the second apparatus is an information terminal having a display function.

The predetermined linked processing is processing of sending image data captured by the imaging device and displaying at the information terminal.

The wireless communication is wireless communication based on the BLE standard.

The first apparatus is a peripheral of BLE standard, and the second apparatus is a central of BLE standard.

The advertising signal delivery means does not send out an advertising signal in the case of being connected with any apparatus, and sends out an advertising signal in the case of not making a communication connection with any apparatuses.

The advertising signal control means controls the advertising signal delivery means so as to send out a first advertising signal not adding a space at the end of the device name included in the advertising signal in a state not pairing with any apparatus, and send out a second advertising signal adding a space to the end of the device name included in the advertising signal, in a state having done pairing with any apparatus.

The connection control means controls so as not to, in the case of detecting a first advertising signal, reconnect even if pairing is done with a camera having sent out this first advertising signal, and in the case of detecting a second advertising signal, reconnect if pairing has been done with the camera having sent out this second advertising signal, and not reconnecting if pairing is not done.

The connection control means of the information terminal controls so as to initiate connection along with performing pairing at the time of a pairing operation, and subsequently not to perform connection even if entering a reconnectable state, in the case of ending connection while pairing.

The first communication means by the first communication method and the second communication means by the second communication method are provided.

The advertising signal is sent by way of the first communication method.

Identification information for identifying an apparatus of the second communication method is included in the identifier contained in the advertising signal.

A second connection control means is further included for causing a communication connection to be established by the second communication method using the identification information of the apparatus included in the identifier contained in the advertising information.

The first communication method is wireless communication based on the BLE (Bluetooth Low Energy) (trademark) standard.

The second communication method is wireless communication based on the Wi-Fi standard, and the identification information is SSID.

Conventionally, technology has been known that configures so that, in the case of an information terminal such as a smartphone remotely operating an imaging device such as a digital camera connected (pairing) via wireless communication such as Bluetooth (registered trademark), information of a partner-side apparatus once connected (pairing) is stored, and in the case of connecting (pairing) between the same imaging device and information terminal again, allows for easy setting of photography conditions, etc. using the information of the partner-side apparatus that is being stored.

In addition, generally, since the battery is drained in a state while establishing a wireless communication connection, control so as to break the connection whenever possible is performed in the case of communicating not being required, and in recent years, there has come to be many cases of using a communication means of low electrical power consumption such as BLE (Bluetooth Low Energy) (trademark).

However, in the aforementioned technology, although settings such as photography conditions are easy after reconnecting between the same imaging device and information terminal that had connected in the past, after breaking the connection between the imaging device and information terminal having once connected, in a case of wanting to reconnect the same imaging device and smartphone again, case of wanting to change pairing and reconnect, etc., it may mistakenly connect with an unintended partner, or problems in security may arise, in the case of a plurality of connectable imaging devices and information terminals being present. There are similar problems in the case of performing connections by wireless communication with a combination of an imaging device and an apparatus other than a portable terminal.

The present embodiment has been made taking account of such a situation, and has an object of, in the case of making a communication connection between a plurality of apparatuses using wireless communication, preventing unintended apparatuses from being mistakenly connected, and configuring so as to be able to perform communication connection appropriately.

The communication system configured in the above way can include the following such configuration as a data processing system that executes predetermined data processing by a peripheral apparatus that is an apparatus providing a predetermined function and a central apparatus that is an apparatus utilizing the function provided of this peripheral apparatus linking.

The peripheral apparatus includes a first communication unit and a control unit.

The first communication unit performs communication control by way of the first communication method to, in a state not establishing a communication connection with any central apparatus, send an advertising signal, which is a signal notifying other apparatuses of its own existence and its own provided function by way of broadcast communication (BLE's connectionless broadcasting); establish a communication connection with a central apparatus having responded to this advertising signal; and maintain a communication connection by performing communication periodically with the central apparatus establishing this communication connection.

The control unit executes predetermined data processing by linking with the central apparatus.

The central apparatus includes a first communication unit and a control unit.

The first communication unit performs communication control by way of the first communication method to detect an advertising signal sent by peripheral apparatuses, in the case of the function indicated by this advertising signal being its own desired function, establish a communication connection by way of the first communication method with the peripheral apparatus, and maintain the communication connection by performing communication periodically with the peripheral apparatus having established this communication connection.

The control unit executes predetermined data processing by linking with the peripheral apparatus.

The first communication unit of the peripheral apparatus and the first communication unit of the central apparatus maintain a communication connection by performing communication periodically, even in a case of the peripheral apparatus and central apparatus not being a predetermined operation state capable of executing the predetermined data processing.

The control unit of the peripheral apparatus and the control unit of the central apparatus, in a case of not being in a predetermined operation state, cause the execution of the predetermined data processing to start by causing the peripheral apparatus and central apparatus to link, after causing to transition to a predetermined operation state by transmitting predetermined signals via the first communication units between the peripheral apparatus and central apparatus.

Therefore, under the respective constraints, the data processing system can effectively utilize the characteristics of communication or functions of the OS (or satisfy constraints), and cause a plurality of apparatuses to link and operate more effectively.

The control unit of the peripheral apparatus and the control unit of the central apparatus, in the case of either of the peripheral apparatus and central apparatus not being in a predetermined operation state, cause the apparatus not in the predetermined operation state to transition to the predetermined operation state by transmitting predetermined signals via the first communication units from the apparatus that is in the predetermined operation state to the apparatus that is not in the predetermined operation state.

Therefore, under the respective constraints, the data processing system can effectively utilize the characteristics of communication or functions of the OS (or satisfy constraints), and cause a plurality of apparatuses to link and operate more effectively.

The control unit of the peripheral apparatus and the control unit of the central apparatus cause an arbitrary peripheral apparatus and an arbitrary central apparatus to transition to a pairing state that is a state combining together, establish a communication connection by way of the first communication units between the peripheral apparatus and central apparatus having transitioned to the pairing state, and execute predetermined data processing by linking the peripheral apparatus and central apparatus that transitioned to the pairing state.

Therefore, under the respective constraints, the data processing system can effectively utilize the characteristics of communication or functions of the OS (or satisfy constraints), and cause a plurality of apparatuses to link and operate more effectively.

The control unit of the peripheral apparatus and the control unit of the central apparatus, in the case of establishing a communication connection between a peripheral apparatus and central apparatus that are not in the pairing state, control the first communication unit so as to establish a communication connection with the condition of a user operation being performed for transitioning these two apparatuses to a new pairing state, and in the case of establishing a communication connection between a peripheral apparatus and central apparatus that are in the pairing state, control the first communication unit so as to establish a communication connection automatically without a user operation being performed.

Therefore, under the respective constraints, the data processing system can effectively utilize the characteristics of communication or functions of the OS (or satisfy constraints), and cause a plurality of apparatuses to link and operate more effectively.

The control unit of the peripheral apparatus and the control unit of the central apparatus, in the case of establishing a communication connection between the peripheral apparatus and central apparatus, consider the pairing state of these two apparatuses, and the pairing state of a combination with another peripheral apparatus or another central apparatus, and judge whether to establish a communication connection.

Therefore, under the respective constraints, the data processing system can effectively utilize the characteristics of communication or functions of the OS (or satisfy constraints), and cause a plurality of apparatuses to link and operate more effectively.

The control unit of the peripheral apparatus, upon sending an advertising signal, controls the first communication unit so as to change a state of part of the advertising signal according to the pairing state.

The control unit of the central peripheral controls the first communication unit so as to decide whether to establish a communication connection with a peripheral according to the pairing state and the change state of a part of the advertising signal received from this peripheral device.

Therefore, under the respective constraints, the data processing system can effectively utilize the characteristics of communication or functions of the OS (or satisfy constraints), and cause a plurality of apparatuses to link and operate more effectively.

The control unit of the peripheral apparatus, upon sending an advertising signal, controls the first communication unit so as to send a first advertising signal in which a part of the advertising signal is a first state in the case of not being in a pairing state with any central apparatus, and send a second advertising signal in which the part of the advertising signal is a second state different from the first state in the case of being in a pairing state with any central apparatus.

The control unit of the central apparatus, in the case of receiving a first advertising signal from a peripheral not in the pairing state, controls the first communication unit so as to establish a communication connection with this peripheral apparatus; in the case of receiving a second advertising signal from a peripheral apparatus not in the pairing state, controls the first communication unit so as not to establish a communication connection with this peripheral apparatus; in the case of having received a first advertising signal from a peripheral apparatus in the pairing state, controls the first communication unit so as not to establish a communication connection with this peripheral apparatus; and in the case of having received a second advertising signal from a peripheral apparatus in the pairing state, controls the first communication unit so as to establish a communication connection with this peripheral apparatus.

Therefore, under the respective constraints, the data processing system can effectively utilize the characteristics of communication or functions of the OS (or satisfy constraints), and cause a plurality of apparatuses to link and operate more effectively.

The control unit of the peripheral apparatus and the control unit of the central apparatus, in the case of communication connection by way of the first communication units being broken during execution of the predetermined data processing, control the first communication units so as to re-establish the communication connection that was broken automatically, without a user operation being performed.

Therefore, under the respective constraints, the data processing system can effectively utilize the characteristics of communication or functions of the OS (or satisfy constraints), and cause a plurality of apparatuses to link and operate more effectively.

The control unit of the peripheral apparatus, in the case of re-establishing a broken communication connection, controls the first communication unit so as to send a second advertising signal created by changing a part of the advertising signal.

The control unit of the central apparatus, in the case of re-establishing a broken communication connection, controls the first communication unit so as to establish a communication connection on the condition of having receiving a second advertising signal.

Therefore, under the respective constraints, the data processing system can effectively utilize the characteristics of communication or functions of the OS (or satisfy constraints), and cause a plurality of apparatuses to link and operate more effectively.

The peripheral apparatus is an imaging device having an image capture function.

The central apparatus is an information terminal having an image management function.

The predetermined data processing is processing for sending an image captured by the imaging device to the information terminal, and causing this sent image to be managed by the information terminal.

Therefore, under the respective constraints, the data processing system can effectively utilize the characteristics of communication or functions of the OS (or satisfy constraints), and cause a plurality of apparatuses to link and operate more effectively.

The control unit of the information terminal, in a state maintaining a communication connection by way of the first communication unit, causes an image management program required in the execution of the predetermined data processing to transition to an execution stop state in which execution is temporarily stopped, and in a case of receiving a predetermined signal via the first communication unit from the imaging device, causes the image management program that is in the execution stop state to transition to the execution state, and executes processing to receive and manage images sent from the imaging device according to the image management program having transitioned to the execution state.

Therefore, under the respective constraints, the data processing system can effectively utilize the characteristics of communication or functions of the OS (or satisfy constraints), and cause a plurality of apparatuses to link and operate more effectively.

The control unit of the imaging device, in the case of automatic sending mode being set upon performing photography, sends a predetermined signal via the first communication unit to the information terminal, and after the information terminal causes the image management program to transition to the execution state, executes processing to send the captured image to the information terminal automatically.

Therefore, under the respective constraints, the data processing system can effectively utilize the characteristics of communication or functions of the OS (or satisfy constraints), and cause a plurality of apparatuses to link and operate more effectively.

The peripheral apparatus is an imaging device having an image capture function.

The central apparatus is an information terminal having an operable function and display function.

The predetermined data processing is processing to remotely operate the image capture function of the imaging device according to operations on the information terminal.

Therefore, under the respective constraints, the data processing system can effectively utilize the characteristics of communication or functions of the OS (or satisfy constraints), and cause a plurality of apparatuses to link and operate more effectively.

The control unit of the imaging device, in a state maintaining a communication connection by way of the first communication unit, causes the power source to transition to the OFF state, and in the case of receiving a predetermined signal from the information terminal via the first communication unit, causes the power source to transition to the ON state, and executes processing related to the image capture function according to remote operation from the information terminal in the state having transitioned the power source to the ON state.

Therefore, under the respective constraints, the data processing system can effectively utilize the characteristics of communication or functions of the OS (or satisfy constraints), and cause a plurality of apparatuses to link and operate more effectively.

The control unit of the information terminal, in the case of there being a user operation in a state in which the remote operation mode is set, sends a predetermined signal via the first communication unit to the imaging device, and after causing the power source of the imaging device to transition to the ON state, executes processing to remotely operate the image capture function of the imaging device.

Therefore, under the respective constraints, the data processing system can effectively utilize the characteristics of communication or functions of the OS (or satisfy constraints), and cause a plurality of apparatuses to link and operate more effectively.

The control unit of the information terminal sends a predetermined signal designating the operation mode during start up via the first communication unit to the imaging device.

The control unit of the imaging device causes to transition to an operation mode designated along with causing the power source to transition to the ON state, in the case of receiving a predetermined signal designating the operation mode during startup from the information terminal via the first communication unit.

Therefore, under the respective constraints, the data processing system can effectively utilize the characteristics of communication or functions of the OS (or satisfy constraints), and cause a plurality of apparatuses to link and operate more effectively.

The peripheral apparatus and central apparatus further include second communication units that perform communication control by way of the second communication method in which data communication faster than the first communication method can be performed, but cannot communicate in the case of the peripheral apparatus and central apparatus not being in a predetermined operation state.

The predetermined data processing is processing of performing data communication by way of the second communication method between the peripheral apparatus and the central apparatus via the second communication unit.

Therefore, under the respective constraints, the data processing system can effectively utilize the characteristics of communication or functions of the OS (or satisfy constraints), and cause a plurality of apparatuses to link and operate more effectively.

The first communication unit has lower power consumption for maintaining a communication connection than the second communication unit.

Therefore, under the respective constraints, the data processing system can effectively utilize the characteristics of communication or functions of the OS (or satisfy constraints), and cause a plurality of apparatuses to link and operate more effectively.

The control unit of the peripheral apparatus and the control unit of the central apparatus start data communication by way of the second communication units between the peripheral apparatus and central apparatus, after having caused to transition to the operation state in which data communication by the second communication units is possible, by sending a predetermined signal via the first communication unit to an apparatus, among the peripheral apparatus and central apparatus, that is not in the operation state in which data communication is possible by the second communication unit.

Therefore, under the respective constraints, the data processing system can effectively utilize the characteristics of communication or functions of the OS (or satisfy constraints), and cause a plurality of apparatuses to link and operate more effectively.

The second communication method sets the connection information necessary for establishing a communication connection with any apparatus, and establishes a communication connection using this set connection information.

The control unit of the peripheral apparatus prohibits a setting change in the connection information in a state having established a communication connection by way of the first communication unit.

Therefore, under the respective constraints, the data processing system can effectively utilize the characteristics of communication or functions of the OS (or satisfy constraints), and cause a plurality of apparatuses to link and operate more effectively.

The communication unit of the imaging device, in the case of receiving a signal via the first communication unit, causes the power source to transition to the ON state with the condition of being an intentional startup request signal from an information terminal that is in the pairing state.

Therefore, under the respective constraints, the data processing system can effectively utilize the characteristics of communication or functions of the OS (or satisfy constraints), and cause a plurality of apparatuses to link and operate more effectively.

The control unit of the peripheral apparatus and the control unit of the central apparatus, in a case of the execution of predetermined data processing being interrupted due to either of the peripheral apparatus and central apparatus no longer being in a predetermined operation state during execution of the predetermined data processing, causes the apparatus that is not in the predetermined operation state to transition to the predetermined operation state, and causes the execution of the predetermined data processing that was interrupted to restart, by sending a predetermined signal via the first communication unit from the apparatus that is in the predetermined operation state to the apparatus no longer in the predetermined operation state.

Therefore, under the respective constraints, the data processing system can effectively utilize the characteristics of communication or functions of the OS (or satisfy constraints), and cause a plurality of apparatuses to link and operate more effectively.

The control unit of the information terminal causes the image management program to be executed in the background in a state maintaining the communication connection by way of the first communication unit, and causes the image management program to transition to the execution stop state, in a case of continuously causing the image management program to be executed exceeding a time limit for the background execution defined by the operating system.

During execution of the predetermined data processing, the control unit of the imaging device causes execution of predetermined data processing that was interrupted to restart, by causing the image management program that is in the execution stop state to transition to the execution state by sending a predetermined signal via the first communication unit, every time execution of the predetermined data processing is interrupted because of the information terminal causing the image management program to transition to the execution stop state according to the time limit of background execution according to the operating system.

Therefore, under the respective constraints, the data processing system can effectively utilize the characteristics of communication or functions of the OS (or satisfy constraints), and cause a plurality of apparatuses to link and operate more effectively.

Predetermined operation state is a state in which the power source is ON, and a state in which the program for executing the predetermined data processing is operating, and communication according to the second communication method is possible by the second communication unit.

Therefore, under the respective constraints, the data processing system can effectively utilize the characteristics of communication or functions of the OS (or satisfy constraints), and cause a plurality of apparatuses to link and operate more effectively.

The peripheral apparatus causes the interval time for monitoring whether or not the communication connection is being maintained by the first communication unit to change, depending on whether its own power source is the ON state or the OFF state.

Therefore, under the respective constraints, the data processing system can effectively utilize the characteristics of communication or functions of the OS (or satisfy constraints), and cause a plurality of apparatuses to link and operate more effectively.

The first communication method is wireless communication based on the BLE (Bluetooth Low Energy) (trademark) standard.

Therefore, under the respective constraints, the data processing system can effectively utilize the characteristics of communication or functions of the OS (or satisfy constraints), and cause a plurality of apparatuses to link and operate more effectively.

In addition, the communication system is a data processing system that executes predetermined data processing by the first apparatus providing a predetermined function and the second apparatus utilizing this function provided by the first apparatus linking.

The data processing system includes an execution unit, communication control unit, pairing unit and control unit.

The execution unit executes the predetermined data processing by the first apparatus and second apparatus linking.

The communication control unit establishes a communication connection between the first apparatus and second apparatus, and maintains the communication connection between the first apparatus and second apparatus, even if a case in which the first apparatus and second apparatus establishing this communication connection are not in a predetermined operation state capable of executing the predetermined data processing.

The pairing unit causes the first apparatus and second to transition to a pairing state that is a state combining with each other.

The control unit, in a case of the first apparatus and second apparatus having transitioned to the pairing state not being in a predetermined operation state, causes to transition to the predetermined operation state, by transmitting predetermined signals by way of the communication control units between the first apparatus and second apparatus.

The execution unit causes execution of the predetermined data processing to start by causing the first apparatus and second apparatus to link after causing the first apparatus and second apparatus to transition to the pairing state.

In a case of establishing a communication connection between the first apparatus and second apparatus, the communication control unit judges whether to establish a communication connection by considering the pairing state of these two apparatuses, and a pairing state of a combination with another first apparatus or another second apparatus.

Therefore, under the respective constraints, the data processing system can effectively utilize the characteristics of communication or functions of the OS (or satisfy constraints), and cause a plurality of apparatuses to link and operate more effectively.

In addition, the communication system is a data processing device that functions as a central apparatus executing the predetermined processing by linking with a peripheral apparatus providing a predetermined function.

The data processing device includes a first communication unit and a control unit.

The first communication unit detects an advertising signal sent by a peripheral apparatus, and in the case of the function indicated by this advertising signal being its own desired function, establishes a communication connection by way of the first communication method with the peripheral apparatus, and performs communication control by way of the first communication method, which maintains the communication connection by performing intermittent communication with the peripheral apparatus establishing this communication connection.

The control unit executes predetermined data processing by linking with the peripheral apparatus.

The first communication unit maintains the communication connection by performing communication periodically, even in a case of the peripheral apparatus and central apparatus not being in a predetermined operation state capable of executing the predetermined data processing.

The control unit, in a case of not being in the predetermined operation state, causes execution of the predetermined data processing to start by linking with the peripheral apparatus, after having caused to transition to the predetermined operation state by sending predetermined signals via the first communication units between the peripheral apparatus and central apparatus.

Therefore, under the respective constraints, the data processing system can effectively utilize the characteristics of communication or functions of the OS (or satisfy constraints), and cause a plurality of apparatuses to link and operate more effectively.

In addition, the communication system is a data processing device that functions as a peripheral apparatus providing a predetermined function, and executes predetermined data processing by linking with a central apparatus that utilizes this function.

The data processing device includes a first communication unit and a control unit.

The first communication unit performs communication control by way of the first communication method to, in a state not establishing a communication connection with any central apparatus, send an advertising signal, which is a signal notifying other apparatuses of its own existence and its own provided function by way of broadcast communication; establish a communication connection with a central apparatus having responded to this advertising signal; and maintain a communication connection by performing communication periodically with the central apparatus establishing this communication connection.

The control unit executes the predetermined data processing by linking with the central apparatus.

The first communication unit maintains the communication connection by performing communication periodically, even in a case of the peripheral apparatus and the central apparatus not being in a predetermined operation state.

The control unit, in the case of not being in the predetermined operation state, causes to transition to the predetermined operation state, and then link with the central apparatus and start execution of predetermined data processing, by sending predetermined signals via the first communication units between the peripheral apparatus and the central apparatus.

Therefore, under the respective constraints, the data processing system can effectively utilize the characteristics of communication or functions of the OS (or satisfy constraints), and cause a plurality of apparatuses to link and operate more effectively.

In addition, the communication system configured in the above way exchanges data between a plurality of devices.

Furthermore, the communication system is configured so as to register the transmission destination of each other between the devices performing communication.

In addition, the communication system performs a predetermined communication procedure that communicates predetermined information and transitions to a communication connection state establishing a mutual communication connection, performs intermittent periodic communication every predetermined interval in the communication connection state, and while the periodic communication is maintained, the communication connection state is maintained, and this communication connection state is released in the case of this periodic communication being broken, and in a state in which the communication connection state is released, controls the allowance of transitioning to the communication connection state again according to the change state of the contents of predetermined information sent upon transitioning to the communication connection state and the existence of a recorded transmission destination.

Therefore, under the respective constraints, the communication system can effectively utilize the characteristics of communication or functions of the OS (or satisfy constraints), and cause a plurality of apparatuses to link and operate more effectively.

In addition, with the communication system, one device detects the advertising signal of another device, and controls the existence of a connection according to the state of registering of a transmission destination between devices and the change state of the device name included in this advertising signal.

Therefore, under the respective constraints, the communication system can effectively utilize the characteristics of communication or functions of the OS (or satisfy constraints), and cause a plurality of apparatuses to link and operate more effectively.

In addition, the communication system is configured to operate so that data transfer is possible with an application in the background.

In addition, the communication system, during data transfer from one device to another device, launches an application having performed data transfer from this one device to this other device every time the data transfer operation in the background of the application in this other device is interrupted according to the control of the OS (Operating System), thereby restarting the interrupted data transfer.

Therefore, under the respective constraints, the communication system can effectively utilize the characteristics of communication or functions of the OS (or satisfy constraints), and cause a plurality of apparatuses to link and operate more effectively.

In addition, the communication system monitors the communication connection state at a predetermined timing.

Furthermore, the communication system causes the interval time of monitoring of the communication connection state to change depending on the power source of the device performing monitoring being the ON state or OFF state.

Therefore, under the respective constraints, the communication system can effectively utilize the characteristics of communication or functions of the OS (or satisfy constraints), and cause a plurality of apparatuses to link and operate more effectively.

In addition, the communication system, in a state of transmission destinations between devices being registered, in the case of a communication event occurring in one device, turns ON the power source of this one device under the condition of having been an intentional request from another device.

Therefore, under the respective constraints, the communication system can effectively utilize the characteristics of communication or functions of the OS (or satisfy constraints), and cause a plurality of apparatuses to link and operate more effectively.

In addition, the communication system is configured so as to perform communication by a plurality of different communication methods.

Furthermore, by causing to link with the first communication method and the second communication method which is a different communication method from the first communication method, the communication system performs predetermined control of one device and another device by an operation from a partner-side device.

Therefore, under the respective constraints, the communication system can effectively utilize the characteristics of communication or functions of the OS (or satisfy constraints), and cause a plurality of apparatuses to link and operate more effectively.

In addition, the communication system exchanges image sending requests using communication of the second communication method, and performs image sending using communication of the first communication method.

Therefore, under the respective constraints, the communication system can effectively utilize the characteristics of communication or functions of the OS (or satisfy constraints), and cause a plurality of apparatuses to link and operate more effectively.

In addition, the communication system prohibits a settings change of communication in the first communication method, in a state in which the transmission destination of communication by the second communication method is registered.

Therefore, under the respective constraints, the communication system can effectively utilize the characteristics of communication or functions of the OS (or satisfy constraints), and cause a plurality of apparatuses to link and operate more effectively.

The communication device configured in the above way includes a pairing means, a communication means and a control means.

The communication control unit 51 (pairing means) registers the communication partner.

In addition, the communication control unit 51 (communication means) transitions to a communication connection state establishing a communication connection with the registered communication partner by way of a predetermined communication procedure that communicates predetermined information, and in the communication connection state, performs intermittent periodic communication every predetermined interval, and while the periodic communication is being maintained, the communication connection state is maintained, and in the case of the periodic communication being broken, controls the first communication unit 20-1 so as to perform communication so that the communication connection state is released.

In addition, the communication control unit 51 (control means), in a state of the communication connection state being released, controls the allowance of a communication connection again according to the change state of the contents of predetermined information sent upon transitioning to the communication connection state, and the presence of a registered transmission destination.

Therefore, with the communication system under the respective constraints, the imaging device 1 (communication device) can effectively utilize the characteristics of communication or functions of the OS (or satisfy constraints), and cause a plurality of apparatuses to link and operate more effectively.

It should be noted that there are the following such conditions as prerequisites of the aforementioned embodiment.

In Wi-Fi communication, a plurality of partners capable of a communication connection simultaneously at one apparatus is possible, and a plurality of apps utilizes Wi-Fi communication while sharing. For example, it is possible to reference an image of the imaging device 1 that is a camera simultaneously connecting with eight portable terminals 2, which are PCs or smartphones, to the AP of the imaging device 1 that is the camera.

It should be noted that, in the present embodiment, the AP (imaging device 1 that is a camera) that can simultaneously be connected from the portable terminal 2 that is a smartphone is configured as only one device.

In Wi-Fi communication, it is not guaranteed that data communication connection is maintained while each app is executed in the background.

In contrast, with BLE communication, it is possible for there to be a plurality of partners capable of communication connection simultaneously at one apparatus. In detail, it is configured so that, although the central can connect with a plurality of peripherals, the peripheral can only connect with one central.

In addition, with BLE communication, each app can monopolize its own dedicated communication connection. In other words, the physical connection of BLE is one, and it is possible to monopolize an independent logical connection by sharing this physical connection.

In addition, with BLE communication, each app can maintain a communication connection in a predetermined condition, even if executed in the background.

Predetermined condition is the matter of an intermittent communication performed every predetermined time interval continuing in order to maintain the communication connection.

As a case of no longer satisfying this condition, for example, there is a case of the radio wave status worsening due to the distance between apparatuses increasing, etc., a case of interrupting an application performing BLE communication in the background forcefully in order to free up CPU power or memory space in another app by the iOS, and the like. In other words, in the case of the distance increasing, the physical connection is broken; however, in the case of the operation of the app being interrupted, the physical connection is maintained, and data communication by the logical connection is interrupted.

The portable terminal 2 that is a smartphone can execute a plurality of types of application software including application software not relevant to the present embodiment.

When the portable terminal 2 that is a smartphone starts Wi-Fi communication with another app unrelated to the present embodiment in the foreground, during execution of Wi-Fi communication with the app related to the present embodiment in the background, the Wi-Fi communication of the app relevant to the present embodiment may be interrupted. It should be noted that, during execution of Wi-Fi communication (data communication) with an application in the background, in the case of starting Wi-Fi communication with another app in the foreground, the Wi-Fi communication of the app in the background will not necessarily always be interrupted, and it is configured to be able to continue data communication in the background so long as within a time limit in the case of iOS, for example.

In the case of performing BLE communication with a partner for which pairing was made, with the application relevant to the present embodiment in the background, the portable terminal 2 that is a smartphone can also be configured so as not to start BLE communication with another partner with another application irrelevant to the present embodiment in the foreground. It should be noted that it is configured to allow unrelated applications to make BLE communication.

Normal connectability of BLE communication in a case comparing with Wi-Fi communication referred to in the present embodiment has two meanings.

One is the meanings of the communication connection being maintained even in a low electric power consumption state while satisfying the predetermined condition.

The other one is the meaning of being able to reconnect easily with the same partner, unless changing the connection partner (concept slightly different from pairing?), even in a case of the communication connection being broken due to no longer satisfying the predetermined condition.

It should be noted that, although general BLE pairing indicates the establishment of a BLE connection, in addition to the establishment of a BLE connection, the pairing of the imaging device 1 that is a camera includes the matters of an application of the portable terminal 2 that is a smartphone recording the BD address of the camera, and the matter of one time establishing a Wi-Fi connection (in the case of iOS, registering the Wi-Fi profile). By the application of the portable terminal 2 that is a smartphone storing the BD address, it becomes possible to connect with a camera with which it was connected previously during reconnection after BLE disconnection.

The OS of the portable terminal 2 that is a smartphone operates under the aforementioned restrictions, e.g., is equipped with version 8 of iOS.

Since the present embodiment makes the aforementioned such assumptions, it is possible to configure so as not to be able to register (pairing) in a fixed manner the communication partners in advance by Wi-Fi communication, and it is possible to configure so as to register (pairing) in a fixed manner the communication partners in advance in BLE communication. It should be noted that, in a case not considering electric power consumption, it is possible to configure so as to cause Wi-Fi to constantly connect, and it is possible to configure so as to store the partner for Wi-Fi connecting in an application.

The merit of BLE use is being able to simplify the user operations during Wi-Fi connection, and with the input of SSID and PW made unnecessary, it is possible to make a Wi-Fi connection by an operation on either one of the imaging device 1 that is a camera and the portable terminal 2 that is a smartphone.

In the embodiment configured as above, as an operation for enabling communication of low electric power consumption, BLE communication starts a connection by the central (portable terminal 2 that is a smartphone) detecting the advertising signal of the peripheral (imaging device 1 that is a camera), and after starting the connection, performs intermittent communication while repeatedly turn ON and OFF the electric power source for communication every predetermined time interval.

As such a protocol (restriction) of BLE communication, the communication connection state is maintained while communication continues every predetermined time interval, and in the case of communication every predetermined time interval no longer being possible for any reason, the communication connection state is released. In the case of the communication connection state being released, it is necessary to begin from the advertising of the peripheral (imaging device 1 that is a camera) and the scanning of central (portable terminal 2 that is a smartphone) again in order to reconnect.

Any reason referred to herein, for example, includes the radio wave weakening from the distance between apparatuses increasing, a cause due to limitations of the OS (operating system) of an apparatus, etc.

Among restrictions of the OS, in the case of iOS, for example, each app can communicate with a BLE device by background execution; however, in order to allow shared use of CPU power and memory with other apps, the time for which continued operation is possible is limited, and connection will be interrupted even if during execution of BLE communication.

For this reason, the aforementioned embodiment, for example, in the case of assuming iOS, has an object of enabling more effective linked operation to be performed using a plurality of types of application software, when causing to operate by a plurality of apparatuses linking.

In addition, the aforementioned embodiment, for example, in the case of assuming BLE, has the object of enabling more effective linked operation to be performed using communication of low electric power consumption, when causing to operate by a plurality of apparatuses linking.

More specifically, the aforementioned embodiment performs activation and control simply by an operation on one to the other, from the imaging device 1 that is a camera to the portable terminal 2 that is a smartphone, or from the portable terminal 2 that is a smartphone to the imaging device 1 that is a camera, by way of causing to link by BLE and Wi-Fi.

In addition, the aforementioned embodiment exchanges an image sending request using BLE communication, and performs actual image sending using Wi-Fi communication.

In addition, the aforementioned embodiment, in the case of automatically registering a captured image in a cloud album via the portable terminal 2 that is a smartphone by simply photographing with the imaging device 1 that is a camera, causes the operation of the app to change according to the OS type of the portable terminal 2 that is a smartphone.

In addition, the aforementioned embodiment, in the case of automatically registering a captured image in a cloud album via the portable terminal 2 that is a smartphone by simply photographing with the imaging device 1 that is a camera, can automatically register in the cloud album under the condition of having been set on the side of the portable terminal 2 that is the smartphone in advance.

In addition, with the aforementioned embodiment, the portable terminal 2 that is a smartphone launches another app by BLE via the imaging device 1 that is the camera, since the app active in the background cannot link with the other app.

In addition, the aforementioned embodiment selects an album in which to register in advance, and stores this selection information in the portable terminal 2 that is a smartphone, in the case of automatically registering a captured image in a cloud album via the portable terminal 2 that is a smartphone by simply photographing with the imaging device 1 that is a camera.

Furthermore, in the aforementioned embodiment, the portable terminal 2 that is a smartphone controls the existence of a connection according to the pairing state and a change state of the device name included in the advertising signal, in the case of performing BLE connection (reconnection) by detecting the advertising signal of the imaging device 1 that is a camera.

In addition, the aforementioned embodiment restarts data transfer that was interrupted, by launching an application again by BLE from the imaging device 1 that is a camera, every time background operation of the application is interrupted according to the control of the iOS, during data transfer from the imaging device 1 that is a camera to the portable terminal 2 that is a smartphone.

In addition, with the aforementioned embodiment, the imaging device 1 that is a camera causes the time interval for BLE connection monitoring to change according to its own electric power source being in the ON state or OFF state.

Moreover, with the aforementioned embodiment, the imaging device 1 that is a camera prohibits a Wi-Fi settings change in a state in which BLE pairing has been established.

Furthermore, with the aforementioned embodiment, in the case of a BLE event occurring in a state in which BLE pairing has been established, the imaging device 1 that is a camera turns ON the electric power source of the imaging device 1 that is a camera under the condition of being an intentional request from the portable terminal 2 that is smartphone.

It should be noted that the present invention is not to be limited to the aforementioned embodiments, and that modifications, improvements, etc. within a scope that can achieve the objects of the present invention are also included in the present invention.

In addition, in the aforementioned embodiment, an external apparatus is explained as the portable terminal 2 configured as a smartphone; however, it is not limited thereto, and may be an electronic device such as a tablet terminal, PC (Personal Computer), another digital camera, or a server. Furthermore, the communication method may be wireless communication of NFC (Near Field Communication) for short distance communication, or other wireless communication such as a public network, or further, may be wired, and the transmission destinations may be plural and through a network such as the Internet.

Moreover, although an explanation has been provided with an example of the imaging device 1 to which the present invention is applied as a digital camera and the portable terminal 2 as a smartphone in the aforementioned embodiment, it is not particularly limited thereto.

For example, the present invention can be applied to general purpose electronic devices having the aforementioned processing functions. More specifically, for example, the present invention is applicable to notebook-type personal computers, printers, television sets, video cameras, portable navigation devices, portable telephones, smartphones, portable game devices, etc.

In a case in which the processing sequence is executed by software, the program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 of FIG. 3 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. In addition, the storage medium supplied to the user in a state incorporated in the device main body in advance is constituted by, for example, ROM 12 of FIG. 3 in which the program is recorded or a hard disk, etc. included in the storage unit 19 of FIG. 3.

It should be noted that, in the present specification, the steps defining the program recorded in the storage medium include not only the processing executed in a time series following this order, but also processing executed in parallel or individually, which is not necessarily executed in a time series.

In addition, in the present specification, the terminology of system has the meaning of the overall equipment configured by a plurality of devices, a plurality of means, etc.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

In addition, the aforementioned embodiment configures the image capture unit, input unit, output unit, storage unit, first communication unit, second communication unit, etc. by electronic circuits, and realizes the photography control unit, communication control unit, application management unit, pairing state judgment unit, advertising signal generation unit, etc. by software (by executing programs stored in RAM or ROM by the CPU).

However, it may be adapted so as to realize a part or all of the various functions constituted by electronic circuits with software, or configure a part or all of the various functions realized by software with electronic circuits.

What is claimed is:

1. A data processing system comprising a peripheral apparatus which provides a predetermined function and a central apparatus which utilizes the function provided by the peripheral apparatus, wherein the data processing system executes predetermined data processing through the peripheral apparatus and the central apparatus, wherein the peripheral apparatus comprises:
first communication circuitry which, in a case of not establishing a communication connection with any central apparatus, (i) sends an advertising signal that notifies other apparatuses of its own existence and its own function by way of broadcast communication, (ii) establishes a communication connection with a central apparatus that responds to the advertising signal, and (iii) performs communication control by way of a first communication method that maintains a communication connection by performing communication periodically with the central apparatus having established the communication connection; and
a CPU that executes the predetermined data processing by linking with the central apparatus,
wherein the central apparatus comprises:
first communication circuitry which (i) detects an advertising signal sent by the peripheral apparatus, (ii) establishes a communication connection by way of the first communication method with the peripheral apparatus in a case in which the function indicated by the advertising signal is a desired function, and (iii) performs communication control by way of the first communication method to maintain a communication connection by performing communication periodically with the peripheral apparatus having established the communication connection; and
a CPU which executes the predetermined data processing by linking with the peripheral apparatus,
wherein the first communication circuitry of the peripheral apparatus and the first communication circuitry of the central apparatus maintain a communication connection by performing communication periodically, even in a case in which the peripheral apparatus and the central apparatus are not in a predetermined operation state capable of executing the predetermined data processing,
wherein in the case of not being in the predetermined operation state,
the central apparatus starts an application program, from a state of not running the application program, by receiving predetermined signals via the first communication circuitry from the peripheral apparatus, the application program having a function which causes the peripheral apparatus and the central apparatus to be in the predetermined operation state,
the CPU of the peripheral apparatus and the CPU of the central apparatus cause the peripheral apparatus and the central apparatus to link to each other, and
the CPU of the peripheral apparatus and the CPU of the central apparatus cause execution of the predetermined data processing to start, after causing the transition to the predetermined operation state by operation of the application program,
wherein the peripheral apparatus is an imaging device having an image capture function,
wherein the central apparatus is an information terminal having an image management function, and
wherein the predetermined data processing is processing to send an image captured by the imaging device to the information terminal, and causing the image sent to be managed in the information terminal,
wherein the CPU of the information terminal:
causes an image management program required in execution of the predetermined data processing to transition to an execution stop state of temporarily stopping execution, while maintaining a communication connection by the first communication circuitry,
causes the image management program that is in the execution stop state to transition to an execution state, in a case of receiving a predetermined signal from the imaging device via the first communication circuitry, and
executes processing to receive and manage an image sent from the imaging device, according to the image management program having transitioned to the execution state
wherein the CPU of the information terminal causes the image management program to execute in the background while maintaining a communication connection by the first communication circuitry, and in a case of exceeding an time limit for background execute defined by an operating system and continuously executing the image management program, causes the image management program to transition to an execution stop state, and
wherein the CPU of the imaging device sends a predetermined signal via the first communication circuitry to cause the image management program that is in the execution stop state to transition to the execution state, every time execution of the predetermined data processing is interrupted due to the information terminal causing the image management program to transition to the execution stop state due to a time limit of background execution according to the operating system, and then causes execution of the predetermined data processing that is interrupted to restart.

2. The data processing system according to claim 1, wherein the CPU of the peripheral apparatus and the CPU of the central apparatus, in a case in which either one of the peripheral apparatus and the central apparatus is not in the predetermined operation state, cause the apparatus not in the predetermined operation state to transition to the predetermined operation state, by transmitting from the apparatus in the predetermined operation state a predetermined signal via the first communication circuitry thereof to the apparatus not in the predetermined operation state.

3. The data processing system according to claim 1, wherein the CPU of the peripheral apparatus and the CPU of the central apparatus:

cause any peripheral apparatus and any central apparatus to transition to a pairing state that is a state combining with each other;

cause a communication connection to be established by way of the first communication circuitries between the peripheral apparatus and the central apparatus having transitioned to the pairing state; and execute the predetermined data processing by causing the peripheral apparatus and the central apparatus having transitioned to the pairing state to link.

4. The data processing system according to claim 3, wherein the CPU of the peripheral apparatus and the CPU of the central apparatus, in a case of establishing a communication connection between the peripheral apparatus and the central apparatus that are not in the pairing state, control the first communication circuitries so as to establish a communication connection under a condition that a user operation for causing the two apparatuses to newly transition to the pairing state has been performed, and in a case of establishing a communication connection between the peripheral apparatus and the central apparatus that are in the pairing state, control the first communication circuitries so as to establish a communication connection automatically without a user operation being performed.

5. The data processing system according to claim 3, wherein the CPU of the peripheral apparatus and the CPU of the central apparatus, in a case of establishing a communication connection between the peripheral apparatus and the central apparatus, determine whether or not to cause a communication connection to be established by referencing a pairing state of the two apparatuses, and a pairing state of a combination with another peripheral apparatus or another central apparatus.

6. The data processing system according to claim 5, wherein the CPU of the peripheral apparatus controls the first communication circuitry so as to cause a state of a part of the advertising signal to change according to the pairing state, upon sending the advertising signal, and wherein the CPU of the central apparatus controls the first communication unit so as to decide whether or not to establish a communication connection with a peripheral apparatus according to the pairing state and a change state of the part of the advertising signal received from the peripheral apparatus.

7. The data processing system according to claim 6, wherein the CPU of the peripheral apparatus controls the first communication circuitry, upon sending the advertising signal, so as to send a first advertising signal in a case of not being in the pairing state with any central apparatus; and to send a second advertising signal in which a part of the advertising signal is a second state differing from the first state, in a case of being in the pairing state with any central apparatus; and wherein the CPU of the central apparatus:
in a case of having received the first advertising signal from a peripheral apparatus not in the pairing state, controls the first communication circuitry so as to establish a communication connection with the peripheral apparatus, in a case of having received the second advertising signal from a peripheral apparatus not in the pairing state, controls the first communication circuitry so as not to establish a communication connection with the peripheral apparatus, in a case of having received the first advertising signal from a peripheral apparatus that is in the pairing state, controls the first communication circuitry so as not to establish a communication connection with the peripheral apparatus, and in a case of having received the second advertising signal from a peripheral apparatus that is in the pairing state, controls the first communication circuitry so as to establish a communication connection with the peripheral apparatus.

8. The data processing system according to claim 1, wherein the CPU of the peripheral apparatus and the CPU of the central apparatus, in a case in which a communication connection by way of the first communication circuitry is broken during execution of the predetermined data processing, control the first communication circuitries so as to automatically re-establish a communication connection without a user operation being performed.

9. The data processing system according to claim 1,
wherein the CPU of the peripheral apparatus controls the first communication circuitry so as to send a second advertising signal changing a part of the advertising signal, in a case of re-establishing a communication connection, and wherein the CPU of the central apparatus, in a case of re-establishing a communication connection, controls the first communication circuitry so as to establish a communication connection under a condition of receiving the second advertising signal.

10. The data processing system according to claim 1,
wherein the CPU of the imaging device executes processing to:
send a predetermined signal to the information terminal via the first communication circuitry, in a case of automatic sending mode being set upon performing photography, and send a captured image to the information terminal automatically after the information terminal causes the image management program to transition to the execution state.

11. The data processing system according to claim 1,
wherein the peripheral apparatus is an imaging device having an image capture function;
wherein the central apparatus is an information terminal having an operable function and display function; and
wherein the predetermined data processing is processing to remotely operate the image capture function of the imaging device according to an operation on the information terminal.

12. The data processing system according to claim 11,
wherein the CPU of the imaging device:
causes an electric power source to transition to an OFF state while maintaining a communication connection by the first communication circuitry;
causes the electric power source to transition to an ON state in a case of having received a predetermined signal from the information terminal via the first communication circuitry; and
executes processing related to the image capture function according to remote operation from the information terminal, while the electric power source is transitioned to the ON state.

13. The data processing system according to claim 12,
wherein the CPU of the information terminal:
sends a predetermined signal to the imaging device via the first communication circuitry, in a case in which there is a user operation while a remote operation mode is set, and executes processing to remotely operate the image capture function of the imaging device after causing the electric power source of the imaging device to transition to the ON state.

14. The data processing system according to claim 12, wherein the CPU of the information terminal sends a predetermined signal designating an operation mode during activation to the imaging device via the first communication circuitry, and
wherein the CPU of the imaging device causes the electric power source to transition to the ON state and causes to transition to an operation mode designated, in a case of having received a predetermined signal designating an operation mode during activation from the information terminal via the first communication circuitry.

15. The data processing system according to claim 12, wherein the CPU of the imaging device, in a case of having received a signal via the first communication circuitry, causes the electric power source to transition to the ON state under a condition that the signal is an intentional activation request signal from the information terminal that is in a pairing state.

16. The data processing system according to claim 1, wherein the peripheral apparatus and the central apparatus further comprise:
a second communication circuitry that performs communication control according to a second communication method by which faster data communication than the first communication method can be performed, but communication is not possible in a case in which the peripheral apparatus and the central apparatus are not in the predetermined operation state, and
wherein the predetermined data processing is processing to perform data communication by way of the second communication method between the peripheral apparatus and the central apparatus via the second communication circuitry.

17. The data processing system according to claim 16, wherein the first communication circuitry has lower electric power consumption for maintaining a communication connection than the second communication circuitry.

18. The data processing system according to claim 16, wherein the CPU of the peripheral apparatus and the CPU of the central apparatus cause an apparatus that is not in an operation state capable of data communication by the second communication circuitry, among the peripheral apparatus and the central apparatus, to transition to an operation state capable of data communication by the second communication circuitry by sending a predetermined signal thereto via the first communication circuitry, and then cause data communication by way of the second communication circuitry to start between the peripheral apparatus and the central apparatus.

19. The data processing system according to claim 16, wherein the second communication method sets communication information required in order to establish a communication connection with any apparatus, and causes a communication connection to be established using the connection information thus set, and
wherein the CPU of the peripheral apparatus prohibits a setting change of the connection information while establishing the communication connection by the first communication circuitry.

20. The data processing system according to claim 16, wherein the second communication circuitry has the application program.

21. The data processing system according to claim 1, wherein the CPU of the peripheral apparatus and the CPU of the central apparatus, in a case in which execution of the predetermined data processing is interrupted due to either one of the peripheral apparatus and the central apparatus no longer being in the predetermined operation state during execution of the predetermined data processing, cause the apparatus not in the predetermined operation state to transition to the predetermined operation state, and then cause execution of the predetermined data processing that is interrupted to restart, by sending a predetermined signal to the apparatus that is no longer in the predetermined operation state from the apparatus that is in the predetermined operation state via the first communication circuitry.

22. The data processing system according to claim 1, wherein the predetermined operation state is a state in which an electric power source is ON, and a state in which a program for executing the predetermined data processing is operating, and communication according to a second communication method by second communication circuitry is possible.

23. The data processing system according to claim 1, wherein the peripheral apparatus causes an interval time for monitoring whether or not a communication connection by the first communication circuitry is being maintained to change according to whether an electric power source of the peripheral apparatus is in the ON state or OFF state.

24. The data processing system according to claim 1, wherein the first communication method is wireless communication based on the BLE (Bluetooth Low Energy) standard.

25. The data processing system according to claim 1, wherein the application program starts when the central apparatus receives a connect indication signal to transit the predetermined operation state.

26. A data processing method executed by a data processing system which executes predetermined data processing by a peripheral apparatus that is an apparatus providing a predetermined function and a central apparatus that is an apparatus utilizing the function provided by the peripheral apparatus, the method comprising:
sending, by the peripheral apparatus, an advertising signal that is a signal notifying another apparatus of its own existence and its own provided function, in a state not establishing a communication connection with any central apparatus, establishing a communication connection with a central apparatus having responded to the advertising signal, and performing communication control by way of a first communication method to maintain the communication connection by performing communication periodically with the central apparatus having established the communication connection; and
executing, by the peripheral apparatus, the predetermined data processing by linking with the central apparatus;
detecting, by the central apparatus, an advertising signal sent by the peripheral apparatus, establishing a communication connection by way of the first communication method with the peripheral apparatus in a case of the function indicated by the advertising signal being a desired function thereof, and performing communication control by way of the first communication method to maintain the communication connection by performing communication periodically with the peripheral apparatus having established the communication connection; and executing, by the central apparatus, the predetermined data processing by linking with the peripheral apparatus, maintaining the communication connection by performing communication periodically, even in a case in which the peripheral apparatus and the central apparatus are not in a predetermined operation state capable of executing the predetermined data processing, and in a case in which the peripheral apparatus and the central apparatus are not in the predetermined operation state, starting an application program, by the central apparatus, from a state of not running the application program, by receiving predetermined signals via the first communication circuitry from the peripheral apparatus, the application program having a function which causes the peripheral apparatus and the central apparatus to be in the predetermined operation state, and causing execution of the predetermined data processing to start by causing the peripheral apparatus and the central apparatus to link, wherein the peripheral apparatus is an imaging device having an image capture function, wherein the central apparatus is an information terminal having an image management function, and wherein the predetermined data processing is processing to send an image captured by the imaging device to the information terminal, and causing the image sent to be managed in the information terminal, wherein the method further comprises:

causing, by the information terminal, an image management program required in execution of the predetermined data processing to transition to an execution stop state of temporarily stopping execution, while maintaining a communication connection by the first communication method, causing, by the information terminal, the image management program that is in the execution stop state to transition to an execution state, in a case of receiving a predetermined signal from the imaging device via the first communication method, and executing, by the information terminal, processing to receive and manage an image sent from the imaging device, according to the image management program having transitioned to the execution state, causing, by the information terminal, the image management program to execute in the background while maintaining a communication connection by the first communication method, and in a case of exceeding an time limit for background execute defined by an operating system and continuously executing the image management program, causing the image management program to transition to an execution stop state, and sending, by the imaging device, a predetermined signal via the first communication method to cause the image management program that is in the execution stop state to transition to the execution state, every time execution of the predetermined data processing is interrupted due to the information terminal causing the image management program to transition to the execution stop state due to a time limit of background execution according to the operating system, and then causing execution of the predetermined data processing that is interrupted to restart.

27. A non-transitory recording medium encoded with a program for controlling a data processing system which executes predetermined data processing by a peripheral apparatus that is an apparatus providing a predetermined function and a central apparatus that is an apparatus utilizing the function provided by the peripheral apparatus, to execute operations comprising:

sending, by the peripheral apparatus, an advertising signal that is a signal notifying another apparatus of its own existence and its own provided function, in a state not establishing a communication connection with any central apparatus, establishing a communication connection with a central apparatus having responded to the advertising signal, and performing communication control by way of a first communication method to maintain the communication connection by performing communication periodically with the central apparatus having established the communication connection; and executing, by the peripheral apparatus, the predetermined data processing by linking with the central apparatus;

detecting, by the central apparatus, an advertising signal sent by the peripheral apparatus, establishing a communication connection by way of the first communication method with the peripheral apparatus in a case of the function indicated by the advertising signal being a desired function thereof, and performing communication control by way of the first communication method to maintain the communication connection by performing communication periodically with the peripheral apparatus having established the communication connection; and executing, by the central apparatus, the predetermined data processing by linking with the peripheral apparatus, maintaining the communication connection by performing communication periodically, even in a case in which the peripheral apparatus and the central apparatus are not in a predetermined operation state capable of executing the predetermined data processing, and in a case in which the peripheral apparatus and the central apparatus are not in the predetermined operation state, starting an application program, by the central apparatus, from a state of not running the application program, by receiving predetermined signals via the first communication circuitry from the peripheral apparatus, the application program having a function which causes the peripheral apparatus and the central apparatus to be in the predetermined operation state, and causing execution of the predetermined data processing to start by causing the peripheral apparatus and the central apparatus to link, wherein the peripheral apparatus is an imaging device having an image capture function, wherein the central apparatus is an information terminal having an image management function, and wherein the predetermined data processing is processing to send an image captured by the imaging device to the information terminal, and causing the image sent to be managed in the information terminal, wherein the program further controls the data processing system to execute operations comprising:

causing, by the information terminal, an image management program required in execution of the predetermined data processing to transition to an execution stop state of temporarily stopping execution, while maintaining a communication connection by the first communication method, causing, by the information terminal, the image management program that is in the execution stop state to transition to an execution state, in a case of receiving a predetermined signal from the imaging device via the first communication method, and executing, by the information terminal, processing to receive and manage an image sent from the imaging device, according to the image management program having transitioned to the execution state, causing, by the information terminal, the image management program to execute in the background while maintaining a communication connection by the first communication method, and in a case of exceeding an time limit for background execute defined by an operating system and continuously executing the image management program, causing the image management program to transition to an execution stop state, and sending, by the imaging device, a predetermined signal via the first communication method to cause the image management program that is in the execution stop state to transition to the execution state, every time execution of the predetermined data processing is interrupted due to the information terminal causing the image management program to transition to the execution stop state due to a time limit of background execution according to the operating system, and then causing execution of the predetermined data processing that is interrupted to restart.

* * * * *